United States Patent
Fisher

(10) Patent No.: US 9,478,083 B2
(45) Date of Patent: *Oct. 25, 2016

(54) ELECTRONIC KEY LOCKOUT CONTROL IN LOCKBOX SYSTEM

(71) Applicant: SentriLock, LLC, Cincinnati, OH (US)

(72) Inventor: Scott R. Fisher, West Chester, OH (US)

(73) Assignee: SentriLock, LLC, Cincinnati, OH (US)

(*) Notice: Subject to any disclaimer, the term of this patent is extended or adjusted under 35 U.S.C. 154(b) by 127 days.

This patent is subject to a terminal disclaimer.

(21) Appl. No.: 14/563,165

(22) Filed: Dec. 8, 2014

(65) Prior Publication Data

US 2015/0091696 A1  Apr. 2, 2015

Related U.S. Application Data

(63) Continuation of application No. 13/790,605, filed on Mar. 8, 2013, now Pat. No. 8,912,884, which is a continuation-in-part of application No. 12/883,628, filed on Sep. 16, 2010, now Pat. No. 8,593,252.

(51) Int. Cl.
*G07C 9/00* (2006.01)
*G05B 1/00* (2006.01)

(52) U.S. Cl.
CPC ............ *G07C 9/00111* (2013.01); *G05B 1/00* (2013.01); *G07C 9/00571* (2013.01); *G07C 9/00896* (2013.01); *G07C 2009/00793* (2013.01)

(58) Field of Classification Search
CPC .............. E05B 19/0005; E05B 41/00; E05B 2047/0094; G07C 9/0069; G07C 9/00896; G07C 9/00023; G07C 2209/08
See application file for complete search history.

(56) References Cited

U.S. PATENT DOCUMENTS

| | | | |
|---|---|---|---|
| 5,705,991 A * | 1/1998 | Kniffin | G07C 9/00023 340/12.5 |
| 6,822,553 B1 | 11/2004 | Henderson | |
| 6,989,732 B2 | 1/2006 | Fisher | |
| 7,880,584 B2 | 2/2011 | Larson | |
| 7,999,656 B2 * | 8/2011 | Fisher | G07C 9/00103 340/5.73 |
| 8,451,088 B2 * | 5/2013 | Fisher | A47G 29/10 340/5.73 |
| 2003/0179075 A1 * | 9/2003 | Greenman | E05B 19/0005 340/5.54 |
| 2005/0165612 A1 * | 7/2005 | Van Rysselberghe | A47G 29/141 705/26.1 |
| 2007/0090921 A1 * | 4/2007 | Fisher | G07C 9/00103 340/5.73 |

(Continued)

OTHER PUBLICATIONS

International Search Report, PCT/US2013/072656; 7 pages (Feb. 28, 2014).

*Primary Examiner* — Fekadeselassie Girma
(74) *Attorney, Agent, or Firm* — Frederick H. Gribbell

(57) ABSTRACT

An electronic lockbox system includes a wireless portable transponder that communicates with an electronic lockbox using a low power radio link. The portable transponder includes: a wide area network radio to communicate to a central clearinghouse computer, a motion sensor to activate its wide area network radio, and a connector to communicate with a secure memory device. The electronic lockbox sends a hail message that is intercepted by the portable transponder; the hail message includes identification information. The portable transponder responds with a message that includes a time sensitive encryption key; the lockbox authenticates this response message using its own time sensitive encryption key. If an electronic key is used to access the lockbox, the improved system effectively disables the electronic key during a showing, so that the electronic key cannot be used to access another lockbox until the correct dwelling key has been placed back into the lockbox.

8 Claims, 19 Drawing Sheets

(56) References Cited

U.S. PATENT DOCUMENTS

| | | | | |
|---|---|---|---|---|
| 2007/0296545 A1* | 12/2007 | Clare | ................. | E05B 67/00 340/5.64 |
| 2008/0246587 A1* | 10/2008 | Fisher | ................. | A47G 29/10 340/5.73 |
| 2009/0153291 A1 | 6/2009 | Larson | | |
| 2010/0283361 A1* | 11/2010 | Sato | ................. | G07C 9/00896 312/222 |
| 2011/0130134 A1* | 6/2011 | Van Rysselberghe | ................. | A47G 29/141 455/422.1 |
| 2013/0127594 A1* | 5/2013 | Sato | ................. | A47G 29/10 340/5.73 |

* cited by examiner

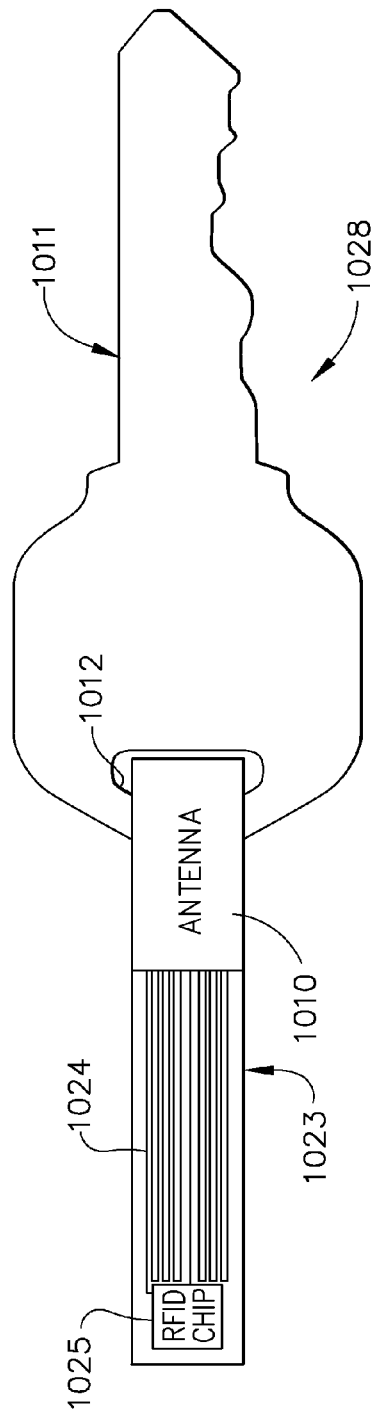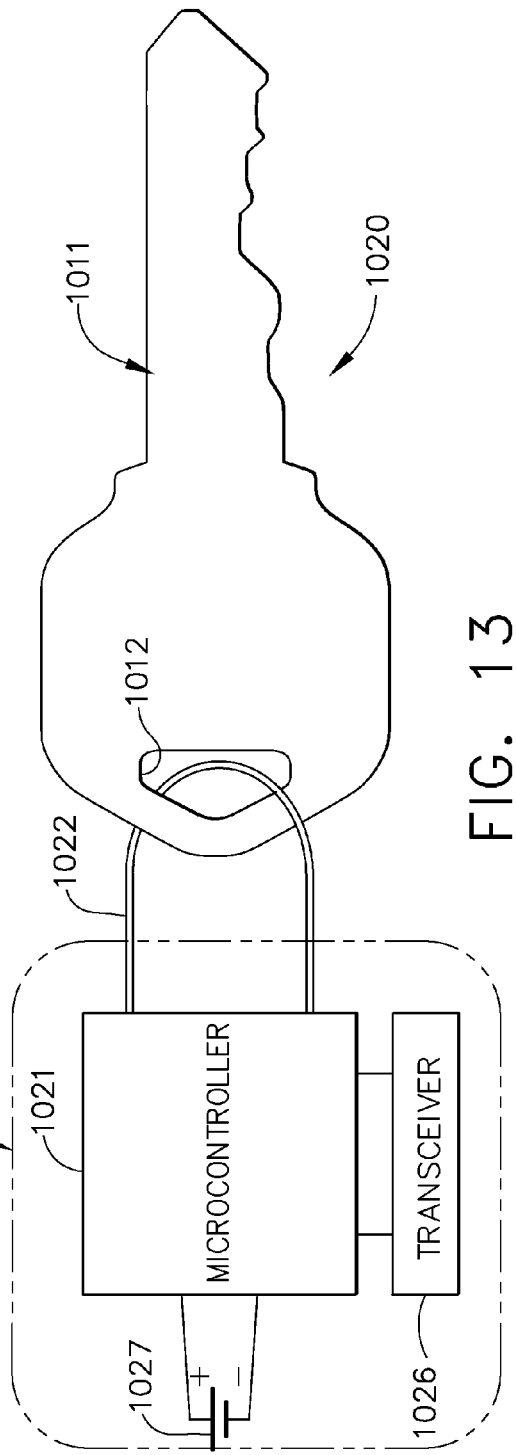

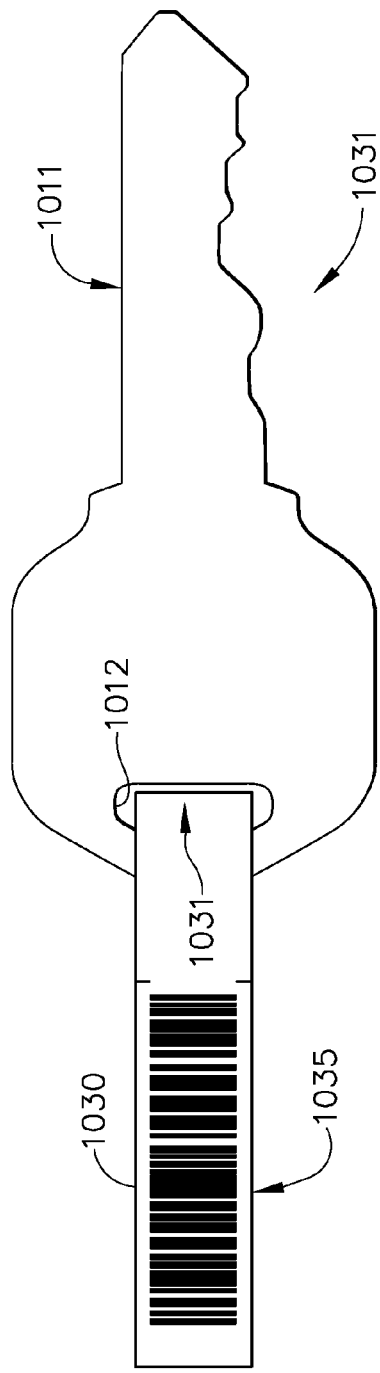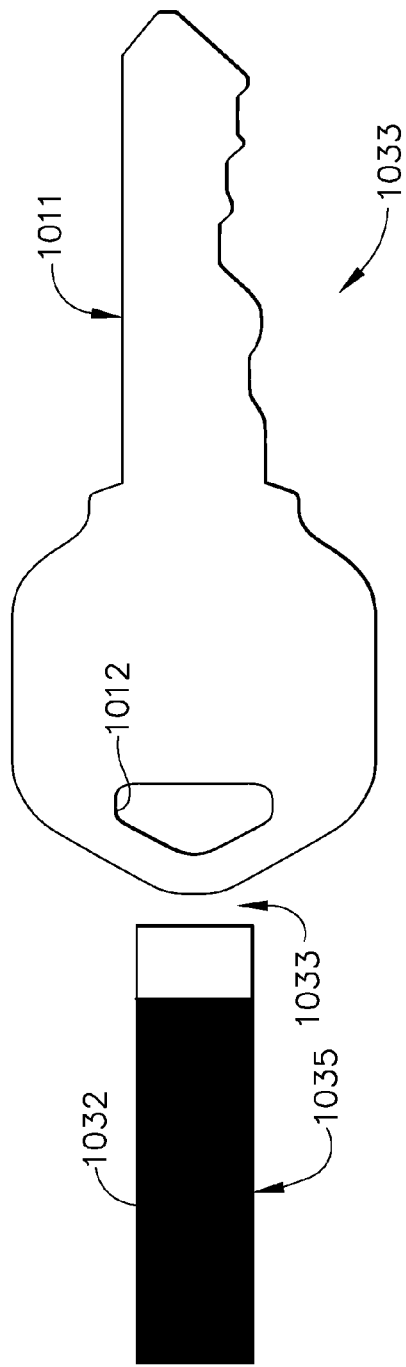
FIG. 15
FIG. 16

ELECTRONIC KEY LOCKOUT CONTROL IN LOCKBOX SYSTEM

CROSS-REFERENCE TO RELATED APPLICATIONS

The present application is a continuation of Ser. No. 13/790,605, filed on Mar. 8, 2013, titled ELECTRONIC KEY LOCKOUT CONTROL IN LOCKBOX SYSTEM, which is a continuation-in-part to application Ser. No. 12/883,628, filed on Sep. 16, 2010, now U.S. Pat. No. 8,593,252, titled "ELECTRONIC LOCK BOX PROXIMITY ACCESS CONTROL."

TECHNICAL FIELD

The technology disclosed herein relates generally to electronic lockbox systems and is particularly directed to a system of the type that includes a portable transponder that communicates with an electronic lockbox using a low power radio link. Embodiments are specifically disclosed as a portable transponder that includes both a low power radio to communicate to the lockbox and a wide area network radio to communicate to a central clearinghouse computer; a portable transponder that includes a motion sensor to activate its wide area network radio; and a portable transponder that includes a smart card connector to communicate with a secure memory device. A further embodiment is disclosed that includes a portable transponder that communicates to an electronic lockbox using a low power radio, and communicates to a central clearinghouse computer using a wide area network radio, and also provides a secondary computer to receive messages from the clearinghouse computer over the wide area network.

Embodiments are also disclosed as a system having an electronic lockbox that sends a hail message using a low power radio that is intercepted by a wireless portable transponder, in which the hail message includes identification information corresponding to the lockbox and a user identifier; the portable transponder responds with an encrypted message that includes a time sensitive encryption key; the lockbox then authenticates this response message using its own time sensitive encryption key. If the messages are authenticated, the lockbox sends an access event record to the portable transponder using the low power radio, and this access event record is stored in a secure memory device of the portable transponder. If a wide area network is available, the portable transponder sends the access event record to the central clearinghouse computer using the wide area network radio.

Another embodiment is disclosed as an electronic lockbox system that tracks the visitation time of a property being accessed. Once the secure compartment of the lockbox has been opened, the lockbox begins to periodically transmit a PROMPT message, and if a portable transponder is in range (both using low power radios), an acknowledgement ("ACK") message is returned to the lockbox. This periodic set of messages continues until the two devices are out of range to properly receive the other's message, and the duration time of this access event is tracked by storing information in memory regarding these periodic transmissions and receptions.

Yet another embodiment is disclosed as an electronic lockbox system that enhances the security of a dwelling key at a showing of a property. When the lockbox is accessed and the dwelling key is removed from the secure compartment, the electronic key (or secure memory card) used to exchange identification information with the (first) lockbox is set into a mode to become disabled, unless that particular (first) dwelling key is properly placed back into the secure compartment of that same first lockbox, at the end of the showing. If that same electronic key (or secure memory card) is moved to a second lockbox and is used in an attempt to access its (second) dwelling key, but the first dwelling key was not properly reinstalled into the first lockbox, then the electronic key becomes disabled to the extent that it cannot be used in the attempt to obtain access to the secure compartment of the second lockbox. Various variations in control logic can be used to perform this function, as disclosed below.

STATEMENT REGARDING FEDERALLY SPONSORED RESEARCH OR DEVELOPMENT

None.

BACKGROUND

Previous electronic lockbox systems that have had a portable electronic key to wirelessly communicate with the system lockboxes have required a constant battery drain at the lockbox itself, due to the requirement that the lockbox always be "listening" for a radio or light beam message that might be received at any time from the electronic key. Such lockbox systems accordingly tend to have a limited battery lifetime, and as such, the replacement of the lockbox batteries becomes a significant expense and a "nuisance" to the user, who must swap out the battery, or send the lockbox back to a dealer so that the dealer can swap out the battery. The more often a battery must be replaced, the more "down time" the user will experience per lockbox, and thus the greater the number of lockboxes that are needed by a user to maintain a specific number of operable lockboxes in the field.

In addition, previous electronic keys that have included a capability to wirelessly communicate directly with the system's central clearinghouse computer also tend to have a significant battery drain, especially those electronic keys that use cellular telephone systems as the communications link between the central computer and the electronic key. Although the batteries in the electronic keys might (typically) be rechargeable, it still can be an inconvenience for the user to have the key's battery go dead in the field, just when a lockbox is to be opened at a property site. Unless the user carries a spare (charged) battery, the user would not be able to use the electronic key to open the lockbox, thereby spoiling the showing of that property. In the conventional electronic lockbox systems, there is no backup plan to obtain access to the lockbox's secure compartment if the electronic key becomes inoperable.

SUMMARY

Accordingly, it is an advantage to provide an electronic lockbox system that includes a wireless portable transponder, in which an electronic lockbox to be accessed sends a hail message by a low power radio, and the portable transponder that is within range of the radio message will receive the hail message, and will respond with an encrypted message back to the lockbox; the lockbox hail message includes encrypted data that identifies the lockbox and the user's identification number.

It is another advantage to provide an electronic lockbox system in which a portable transponder responds to a hail message from an electronic lockbox, in which the response includes a time sensitive encryption key.

It is yet another advantage to provide an electronic lockbox system in which the electronic lockbox receives a message from a portable transponder and authenticates the received message using the lockbox's own time sensitive encryption key.

It is still another advantage to provide an electronic lockbox system in which, after an authorized access has occurred, the electronic lockbox sends an access event record to a portable transponder using a low power radio, and the portable transponder stores that access event record in a secure memory device.

It is a further advantage to provide an electronic lockbox system in which a portable transponder which has received an access event record from an electronic lockbox will now check for the availability for a wide area network, and if it is available, the portable transponder sends a message to a central clearinghouse computer in real time; and if the WAN is not available, the portable transponder queues the access event record in its memory for later transmission to a central clearinghouse computer.

It is yet a further advantage to provide an electronic lockbox system that includes a portable transponder with a motion sensor that is used to activate the wide area network radio of the portable transponder, when needed.

It is still a further advantage to provide an electronic lockbox system that includes a portable transponder, and after the transponder has been activated by a motion sensor, the transponder determines whether or not it needs to send a message to a central clearinghouse computer.

It is another advantage to provide an electronic lockbox system in which a central clearinghouse computer receives data from a portable transponder, including an access event record after one of the system lockboxes has been accessed by an authorized user, and then the central clearinghouse computer initiates a real time data push to send important information to the user of the portable transponder, either directly to the transponder, or to a secondary device, or perhaps to an e-mail server.

It is yet another advantage to provide an electronic lockbox system in which, during an authorized access event, the electronic lockbox periodically sends timed interrogation prompt messages that are acknowledged by a portable transponder that is within communication range and, so long as the two devices continue to exchange data on a periodic basis (using their low power radios), the event timing continues to advance; once the communication loop ceases, typically due to the portable transponder moving out of communication range of the lockbox, then both the lockbox and the portable transponder will record in their respective memories the duration of the event.

Yet another advantage is to cause an electronic key to be effectively disabled every time a dwelling key is accessed from a first electronic lockbox, which is designed to prevent the electronic key from being used with other lockboxes until the dwelling key has been properly re-installed into the secure compartment of the first lockbox.

Additional advantages and other novel features will be set forth in part in the description that follows and in part will become apparent to those skilled in the art upon examination of the following or may be learned with the practice of the technology disclosed herein.

To achieve the foregoing and other advantages, and in accordance with one aspect, a method for operating an electronic lockbox system is provided, in which the method comprises the following steps: (a) providing a plurality of electronic lockboxes and a plurality of electronic keys; (b) of the plurality of electronic lockboxes, providing a first electronic lockbox having: a first processing circuit, a first memory circuit, a first short range wireless communications device, a first secure compartment having a first movable opening element that is under the control of the first processing circuit, and a first sensor for detecting whether a predetermined dwelling key security apparatus is present within the first secure compartment; (c) of the plurality of electronic keys, providing a portable first electronic key having a second processing circuit, a second memory circuit, a data entry device, a display, and a second short range wireless communications device; and (d) initiating a data exchange between the first electronic lockbox and the first electronic key, using the first and second short range wireless communications devices; (i) at the first electronic lockbox, receiving a first data message from the first electronic key, the first data message containing at least one of: (A) identity information for the first electronic key, and (B) personal ID data regarding a specific human user; (ii) if a user is attempting to access the first secure compartment, then allowing access if the first electronic key's identity information and the specific user's personal ID data are authorized to access the first secure compartment, so that the predetermined dwelling key security apparatus can be removed from the first secure compartment; and (iii) temporarily disabling effective operation of the first electronic key from accessing any other of the plurality of electronic lockboxes except the first electronic lockbox, until the predetermined dwelling key security apparatus is returned to the first secure compartment, as determined by the first sensor.

In accordance with another aspect, an electronic lockbox system is provided, which comprises: (a) a plurality of electronic lockboxes and a plurality of electronic keys; (b) of the plurality of electronic lockboxes, a first electronic lockbox having: a first processing circuit, a first memory circuit, a first short range wireless communications device, a first secure compartment having a first movable opening element that is under the control of the first processing circuit, and a first sensor for detecting whether a predetermined dwelling key security apparatus is present within the first secure compartment; and (c) of the plurality of electronic keys, a portable first electronic key having a second processing circuit, a second memory circuit, a data entry device, a display, and a second short range wireless communications device; wherein the first and second processing circuits are configured: (d) to initiate a data exchange between the first electronic lockbox and the first electronic key, using the first and second short range wireless communications devices; (i) at the first electronic lockbox, to receive a first data message from the first electronic key, the first data message containing at least one of: (A) identity information for the first electronic key, and (B) personal ID data regarding a specific human user; (ii) if a user is attempting to access the first secure compartment, then to allow access if the first electronic key's identity information and the specific user's personal ID data are authorized to access the first secure compartment, so that the predetermined dwelling key security apparatus can be removed from the first secure compartment; and (iii) to temporarily disable effective operation of the first electronic key from accessing any other of the plurality of electronic lockboxes except the first electronic lockbox, until the predetermined dwelling key security apparatus is returned to the first secure compartment, as determined by the first sensor.

In accordance with yet another aspect, a method for operating an electronic lockbox system is provided, in which the method comprises the following steps: (a) providing a plurality of electronic lockboxes and a plurality of electronic keys; (b) of the plurality of electronic lockboxes, providing a first electronic lockbox having: a first processing circuit, a first memory circuit, a first short range wireless communications device, a first secure compartment having a first movable opening element that is under the control of the first processing circuit, and a first sensor for detecting whether a predetermined dwelling key security apparatus is present within the first secure compartment; (c) of the plurality of electronic keys, providing a portable first electronic key having a second processing circuit, a second memory circuit, a data entry device, a display, and a second short range wireless communications device; (d) initiating a first data exchange between the first electronic lockbox and the first electronic key, using the first and second short range wireless communications devices; (i) at the first electronic key, receiving a first data message from the first electronic lockbox, the first data message at least containing a first identity designator for the first electronic lockbox; and (ii) storing the first identity designator in the second memory circuit; (e) at the first electronic key, beginning an elapsed time counter; (f) waiting for a second data exchange between one of the plurality of electronic lockboxes and the first electronic key, and if the elapsed time counter equals or exceeds a predetermined time value, then under the control of the second processing circuit, disabling the first electronic key; and (g) waiting for a second data exchange between one of the plurality of electronic lockboxes and the first electronic key, and if the elapsed time counter does not equal or exceed the predetermined time value, then allow the first electronic key to continue normal functions; (i) upon initiating the second data exchange between one of the plurality of electronic lockboxes and the first electronic key; (ii) at the first electronic key, receiving a second data message from one of the plurality of electronic lockboxes, the second data message at least containing a second identity designator for an electronic lockbox; and (iii) determining if the second identity designator is equal to the first identity designator, and: (A) if so, then under the control of the second processing circuit, allowing the first electronic key to continue normal functions; (B) if not, then under the control of the second processing circuit, disabling the first electronic key.

In accordance with still another aspect, a method for operating an electronic lockbox system is provided, in which the method comprises the following steps: (a) providing a plurality of electronic lockboxes and a plurality of secure memory cards; (b) of the plurality of electronic lockboxes, providing a first electronic lockbox having: a first processing circuit, a first memory circuit, a data entry device, a first card reader circuit, a first secure compartment having a first movable opening element that is under the control of the first processing circuit, and a first sensor for detecting whether a predetermined dwelling key security apparatus is present within the first secure compartment; (c) of the plurality of secure memory cards, providing a portable first secure memory card having a second memory circuit, and a card reader interface; (d) initiating a data exchange between the first electronic lockbox and the first secure memory card, using the card reader circuit and the card reader interface; (i) at the first electronic lockbox, retrieving first data from the first secure memory card, the data containing at least one of: (A) identity information for the first electronic key, and (B) personal ID data regarding a specific human user; (ii) if a user is attempting to access the first secure compartment, then allowing access if the first secure memory card's identity information and the specific user's personal ID data are authorized to access the first secure compartment, so that the predetermined dwelling key security apparatus can be removed from the first secure compartment; and (iii) temporarily disabling effective operation of the first secure memory card from accessing any other of the plurality of electronic lockboxes except the first electronic lockbox, until the predetermined dwelling key security apparatus is returned to the first secure compartment, as determined by the sensor.

Still other advantages will become apparent to those skilled in this art from the following description and drawings wherein there is described and shown a preferred embodiment in one of the best modes contemplated for carrying out the technology. As will be realized, the technology disclosed herein is capable of other different embodiments, and its several details are capable of modification in various, obvious aspects all without departing from its principles. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the technology disclosed herein, and together with the description and claims serve to explain the principles of the technology. In the drawings:

FIG. 12 is a side view of a mechanical key for use with an electronic lockbox, as constructed according to the principles of the technology disclosed herein, in which the key has a security tag that includes a RFID chip.

FIG. 13 is a side view of a mechanical key for use with an electronic lockbox, as constructed according to the principles of the technology disclosed herein, in which the key has a security tag that includes an electronic security circuit with a sense loop.

FIG. 15 is a side view of a mechanical key for use with an electronic lockbox, as constructed according to the principles of the technology disclosed herein, in which the key has a bar code security tag, which can be read by a bar code scanning device, and thereby forms something of an "optical sense loop" to increase security.

FIG. 16 is a side view of the mechanical key of FIG. 15, in which the bar code has been rendered unreadable by action of a dye or ink that is activated by the removal of the bar code security tag from the key.

DETAILED DESCRIPTION

Figure 1:
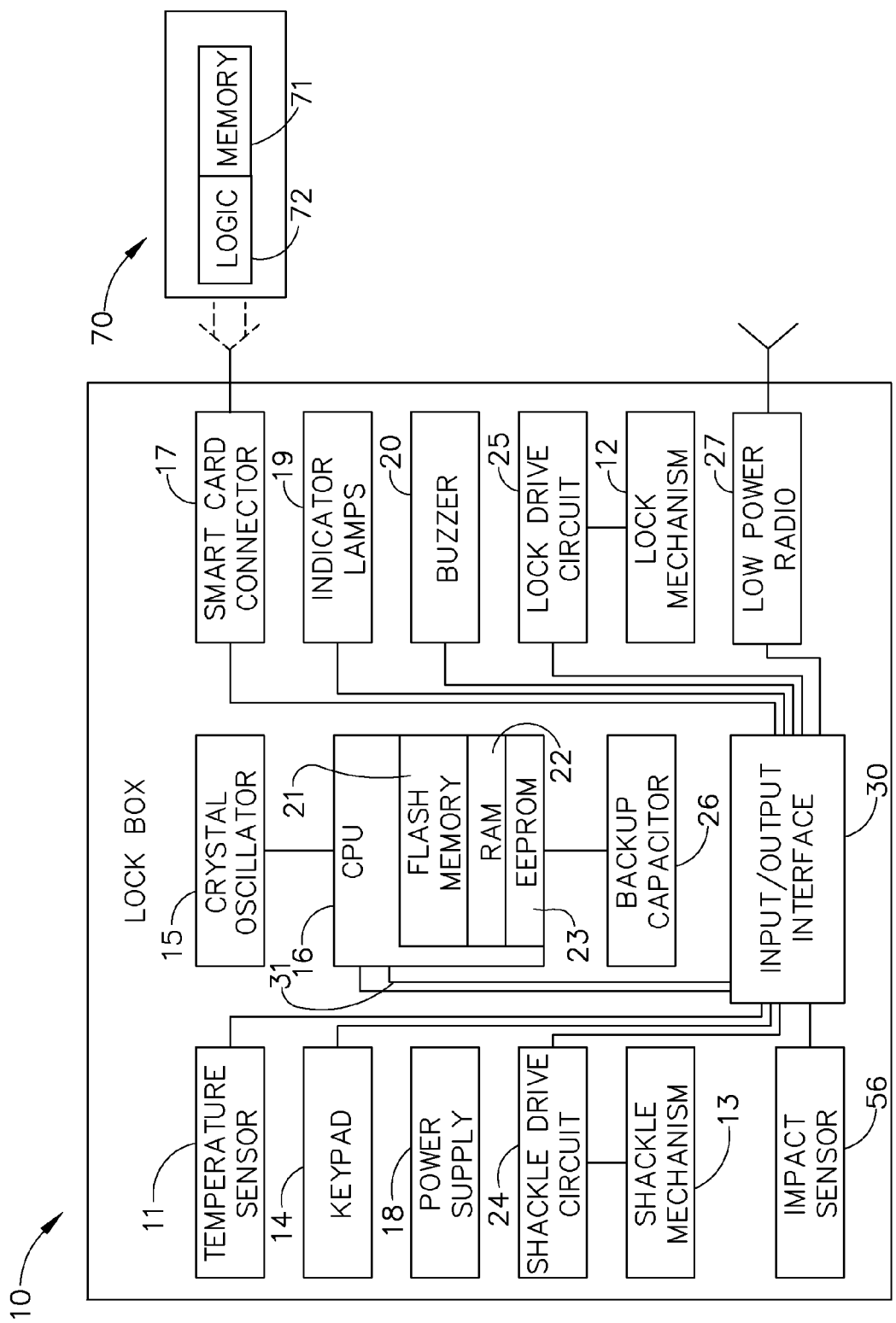
FIG. 1 is a schematic block diagram of the electrical components of an electronic lockbox, as constructed according to the principles of the technology disclosed herein.

Reference will now be made in detail to the present preferred embodiment, an example of which is illustrated in the accompanying drawings, wherein like numerals indicate the same elements throughout the views.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

In addition, it should be understood that embodiments disclosed herein include both hardware and electronic components or modules that, for purposes of discussion, may be illustrated and described as if the majority of the components were implemented solely in hardware.

However, one of ordinary skill in the art, and based on a reading of this detailed description, would recognize that, in at least one embodiment, the electronic based aspects of the technology disclosed herein may be implemented in software. As such, it should be noted that a plurality of hardware and software-based devices, as well as a plurality of different structural components may be utilized to implement the technology disclosed herein.

It will be understood that the term "circuit" as used herein can represent an actual electronic circuit, such as an integrated circuit chip (or a portion thereof), or it can represent a function that is performed by a processing device, such as a microprocessor or an ASIC that includes a logic state machine or another form of processing element (including a sequential processing device). A specific type of circuit could be an analog circuit or a digital circuit of some type, although such a circuit possibly could be implemented in software by a logic state machine or a sequential processor. In other words, if a processing circuit is used to perform a desired function used in the technology disclosed herein (such as a demodulation function), then there might not be a specific "circuit" that could be called a "demodulation circuit;" however, there would be a demodulation "function" that is performed by the software. All of these possibilities are contemplated by the inventors, and are within the principles of the technology when discussing a "circuit."

Referring now to the drawings, FIG. 1 illustrates an exemplary embodiment of an electronic lockbox generally designated by the reference numeral 10, which is suitable for use with the technology disclosed herein. Lockbox 10 has an outer housing, which includes a keypad 14 (see FIG. 2), and the housing includes a movable key compartment door 32 (see FIG. 2). The upper housing of lockbox 10 includes two receptacles (not shown) that receive a shackle 40 (see FIG. 2). The shackle 40 has an upper portion 46 and two shackle extensions (not visible in FIG. 2) that fit through the receptacles. It should be noted that the keypad 14 may also be referred to as a "data input device," in which a human user may press one or more of the keys to enter data, such as numeric information.

The electronic circuitry of electronic lockbox 10 is illustrated in block diagram form in FIG. 1. In this illustrated embodiment, electronic lockbox 10 includes a microprocessor (CPU) 16, FLASH memory 21, random access memory (RAM) 22, EEPROM (electrically erasable programmable read only memory) 23, a battery (or other electrical power supply) 18, a memory backup capacitor 26, an ISO-7816 smart card connector 17, indicator LED lamps 19, a piezo buzzer 20, a crystal oscillator 15, a digital temperature sensor 11 (these last two devices can be combined into a single chip), a shackle drive circuit 24, a shackle release mechanism 13, a key compartment mechanism drive circuit 25, a key compartment lock/release mechanism 12, and a membrane style keypad 14 for user data entry. An impact sensor 56 can also be included in electronic lockbox 10, to detect abnormal mechanical forces that might be applied to the device.

An input/output (I/O) interface circuit 30 is included to provide signal conditioning as needed between the CPU 16 and other components that typically use voltage and/or current levels that are not typically able to hook up directly to a processing device, such as sensors and output device driver circuits. Each appropriate I/O signal is directed through a separate channel of the I/O interface circuit 30, unless perhaps more than one signal of a particular voltage and current rating can be multiplexed, in which case a multiplexer circuit can be included in the I/O interface circuit 30. The data signals between I/O circuit 30 and the CPU 16 run through a low voltage signal bus 31.

A data interface in the form of a low power radio 27 is included in this embodiment so that the CPU 16 is able to communicate with other external devices, such as a separate portable transponder 100 (see FIG. 2) that uses a compatible wireless data link. (The portable transponder can also be referred to as an "electronic key" or a "smart phone" in some embodiments of this technology.) The portable transponder 100 also includes a low power radio 127, which communicates with radio 27 using a protocol that could be proprietary, if desired. However, the radios 27 and 127 could use any number of various communications protocols, such as BlueTooth, although the data structure in the messages between radios 27 and 127 certainly could be encrypted, or otherwise formatted in a proprietary manner. Radios 27 and 127 further could comprise other types of wireless communications devices that may not operate on a strictly radio principle, including types of wireless communications devices that have not been invented as of yet. In this description, such wireless communications devices will typically be referred to as "radios;" however, in this patent document they may also be referred to as a "short range wireless communications device," or a "low power wireless communications device."

Microprocessor 16 controls the operation of the electronic lockbox 10 according to programmed instructions (electronic lockbox control software) stored in a memory device, such as in FLASH memory 21. RAM memory 22 is typically used to store various data elements such as counters, software variables and other informational data. EEPROM memory 23 is typically used to store more permanent electronic lockbox data such as serial number, configuration information, and other important data. It will be understood that many different types of microprocessors or microcontrollers could be used in the electronic lockbox system 10, and that many different types of memory devices could be used to store data in both volatile and non-volatile form, without departing from the principles disclosed herein. In one mode of an exemplary embodiment, the electronic lockbox CPU 16 is an 8-bit Atmel Mega8 microcontroller that incorporates RAM 22, FLASH memory 21 and EEPROM memory 23 internally (as on-board memory).

Battery 18 provides the operating electrical power for the electronic lockbox. Capacitor 26 is used to provide temporary memory retention power during replacement of battery 18. It will be understood that an alternative electrical power supply could be used if desired, such as a solar panel with the memory backup capacitor.

As noted above, electronic lockbox 10 includes a shackle 40 that is typically used to attach the box 10 to a door handle or other fixed object. Electronic lockbox 10 also includes a key compartment which typically holds a dwelling key (not shown), and which can be accessed via the key access door 32 (which is also referred to herein as a "controlled access member").

The key compartment lock and release mechanism 12 uses a gear motor mechanism (not shown) that is controlled by drive circuit 25 that in turn is controlled by CPU 16. Shackle release mechanism 13 also uses a gear motor, which is controlled by drive circuit 24 that in turn is controlled by CPU 16. It will be understood that the release or locking mechanisms used for the shackle 40 and key compartment 32 can be constructed of many different types of mechanical or electromechanical devices without departing from the principles disclosed herein.

The crystal oscillator 15 provides a steady or near-constant frequency (e.g., at 32.768 kHz) clock signal to CPU 16's asynchronous timer logic circuit. The ISO-7816 smart card connector 17 connects to electrical contacts on a "smart card" 70 to allow the exchange of data between the electronic lockbox's CPU 26 and memory devices 71 in the smart card 70 (discussed below in greater detail). The smart card 70 itself typically will include some control logic circuits 72, to prevent "easy" or unauthorized access to the memory elements 71 on-board the card 70.

It should be noted that an electronic key (such as that described above) could be used as a type of secure memory device for the element at reference numeral 70, rather that a classic "smart card." Such an electronic key would also contain memory elements 71, and perhaps would contain some control logic circuits 72, although the control logic circuits might be optional, depending on the type of electronic key device that is used. With regard to FIG. 1, if an electronic key is used, it could be interfaced to the CPU circuit 16 of the electronic lockbox 10 is many different ways, including via an electrical circuit that makes contact between the lockbox 10 and the electronic key 70 (similar to that depicted on FIG. 1), or perhaps via an electromagnetic signal such as a short range radio wave, or an optical signal. As used herein, the term "electronic key" can have a meaning to include a relatively simple device, such as a secure memory card (or a "smart card"), and it can have a meaning to include a sophisticated device, such as a laptop computer or a smart phone that has a wireless communications circuit to send and receive messages from other devices, including an electronic lockbox and/or a central clearinghouse computer. A "typical" electronic key will generally be a more sophisticated device.

In one embodiment, the digital temperature sensor 11 is read at regular intervals by the electronic lockbox CPU 16 to determine the ambient temperature. Crystal oscillator 15 may exhibit a small change in oscillating characteristics as its ambient temperature changes. In one type of crystal oscillator device, the oscillation frequency drift follows a known parabolic curve around a 25 degrees C. center. The temperature measurements are used by CPU 16 in calculating the drift of crystal 15 and thus compensating for the drift and allowing precise timing measurement regardless of electronic lockbox operating environment temperature. As noted above, a single chip can be used to replace the combination of crystal oscillator 15 and temperature sensor 11, such as a part number DS32KHZ manufactured by Dallas Semiconductor.

The LED indicator lamps 19 and piezo buzzer 20 are included to provide both an audible and a visual feedback of operational status of the electronic lockbox 10. Their specific uses are described in detail in other patent documents by the same inventor, as noted below.

The impact sensor 56 can be used to notify an external device, in case of an attempted removal or other type of damage being done to the lockbox 10, including intentional damage. Such an external device could comprise a "base station" as described in detail in other patent documents by the same inventor, or it could comprise the portable transponder 100 that is described herein.

Backup capacitor 26 is charged by battery 18 (or perhaps by another power source) during normal operation. Capacitor 26 serves two functions, the first of which is to maintain adequate voltage to CPU 16 during either shackle drive circuit activation, or lock drive circuit activation. In an exemplary embodiment, capacitor 26 is charged from the regulated side of voltage regulator in power supply 18, whereas all electromechanical drive current is derived from the unregulated side of power supply 18. Capacitor 26 also maintains a stable voltage to CPU 16 during periods of high current drain on power supply 18. The second function of capacitor 26 is to maintain CPU 16 operation and RAM memory 22 during a period when the battery 18 is replaced.

Figure 2:
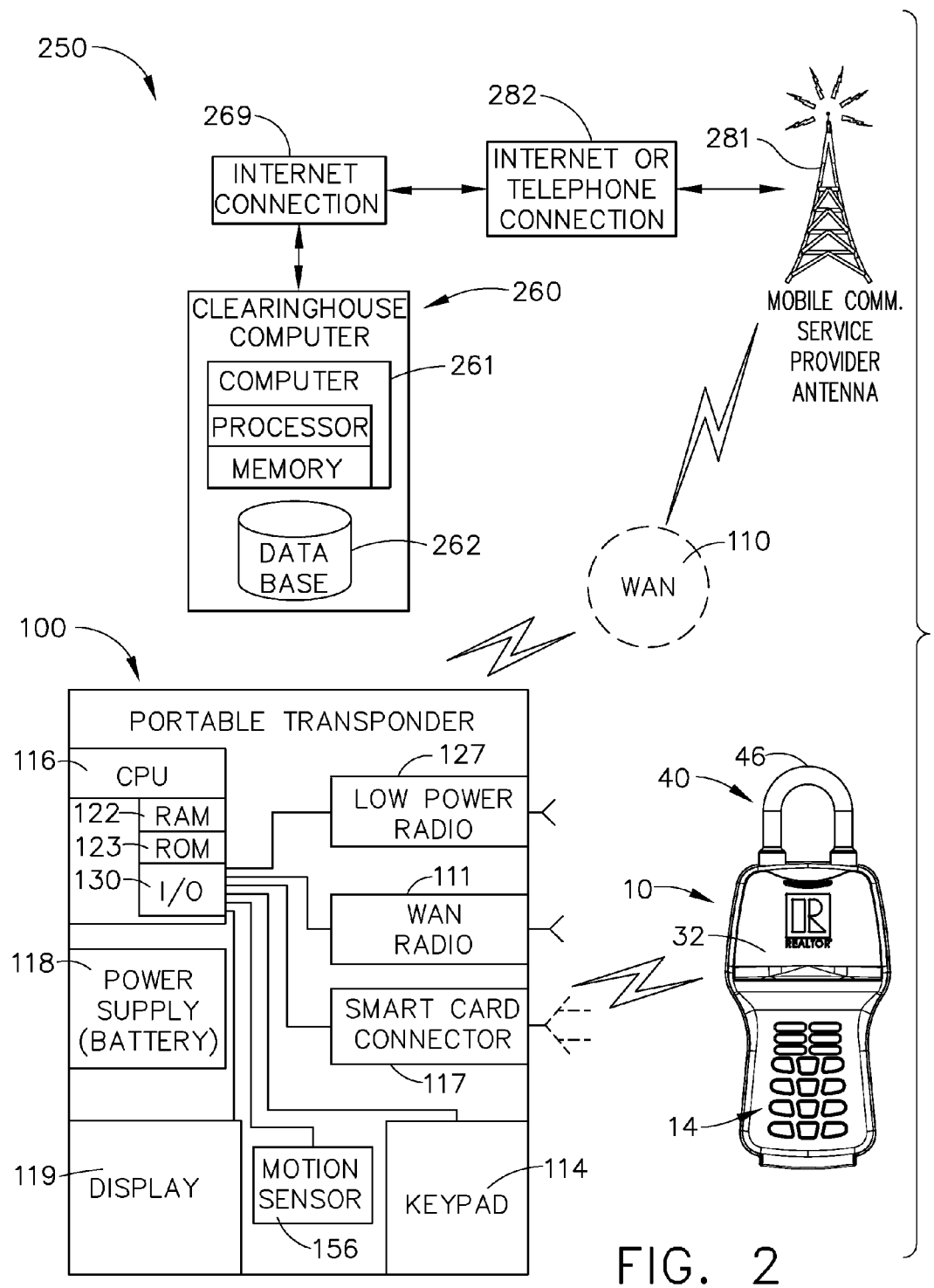
FIG. 2 is a diagrammatic view of the major components of a first embodiment of an electronic lockbox security system, including a central computer station, a wireless portable transponder device, and a portable electronic lockbox apparatus such as that depicted in FIG. 1.

Referring now to FIG. 2, a first embodiment electronic lockbox system, generally designated by the reference numeral 250, is depicted. The system 250 includes one or more electronic lockboxes 10, perhaps one or more secure memory cards (not shown on FIG. 2), portable transponder devices 100, a central clearinghouse computer system 260 (also sometimes referred to herein as a "CCC"), and a wireless data communications system, represented by Internet® connections 269 and 282, and a mobile phone provider 281. The central clearinghouse computer 260 typically will include a database 262 which contains a repository of electronic lockbox identification and attribute information, and also contains a repository of information about real estate agents. A computer 261 controls the database 262, and includes a processing circuit and a memory circuit (in addition to any bulk memory storage devices that contain the database 262).

Referring now to FIG. 2, an electronic lockbox system of a first embodiment is depicted in a diagrammatic view. An electronic lockbox 10 is depicted in the lower-right corner of FIG. 2, and is shown communicating to a portable transponder 100. As discussed above, portable transponder 100 includes a low power radio 127 that can communicate data to and from the low power radio 27 of the electronic lockbox 10. Some of the other components of the portable transponder 100 are depicted on FIG. 2.

In this embodiment, portable transponder 100 includes a microprocessor (CPU) 116, random access memory (RAM) 122, read only memory (ROM) 123, and an input/output interface circuit 130. There are several devices that are in communication with the input/output (I/O) circuit 130, as discussed immediately below.

The low power radio 127 communicates data to and from the CPU 116, via the I/O circuit 130. A wide area network (WAN) radio 111 is provided, and it also communicates data to and from the CPU 116, via the I/O interface circuit 130. Portable transponder 100 also includes a smart card connector 117, which is essentially identical to the smart card connector 17 that is provided on the electronic lockbox 10. Portable transponder 100 also includes a display 119, a keypad 114, a power supply 118 (typically a battery), and a motion sensor 156. The motion sensor 156 provides additional capability for the portable transponder 100, as discussed in greater detail below.

Because of its wide area network radio 111, portable transponder 100 is able to communicate to the clearinghouse computer 260 over a wide area network (WAN), which is generally designated by the reference numeral 110. Assuming that the mobile communications service provider 281 is a cellular telephone system, the portable transponder 100 will have the capability of essentially immediate communications with the clearinghouse computer 260 from many, many locations, including most locations where an electronic lockbox 10 has been situated. On the other hand, if a particular electronic lockbox 10 is located in a very remote area, where there is no cellular telephone connection coverage, then the wide area network 110 therefore would not reach that location, and the portable transponder 100 would not be in immediate communication with the clearinghouse computer 260. This situation will be discussed below in greater detail.

The wide area network radio 111 further could comprise other types of wireless communications devices that may not operate on a strictly radio principle, including types of wireless communications devices that have not been invented as of yet. In this description, such wireless communications devices are sometimes referred to as "radios;" however, in this patent document they may also be referred to as a "wide area network wireless communications device," or as a "medium range wireless communications device."

In a preferred mode of the first embodiment depicted on FIG. 2, the portable transponder 100 includes a connector 117 that is capable of accepting a secure memory card (such as a "smart card"), so that a user who typically connects his or her secure memory card directly to an electronic lockbox 10 will also be able to connect the same secure memory card to the portable transponder 100, and have much the same results. This will be described in greater detail below. Note that the smart card connector can also be referred to as a "data interface" that communicates with a "secure memory device"—a "smart card" is an example of a secure memory device.

The first radio circuit of the portable transponder is the low power radio 127 such as Atmel's AT86RF23x series that uses a low power radio frequency signal. The portable transponder also includes a second radio circuit which is capable of longer range communications for wide area network connectivity, such as Wavecom's WISMO22x series. In a preferred embodiment, the CPU 116 will comprise a low power microcontroller, and a relatively low power visual display 119 will be provided to allow indication of operating status. The motion sensor 156 is to be included as an internal motion sensor that is coupled to the microcontroller (CPU 116). Its capability and use is described below.

The low power communications circuit in the lockbox (e.g. low power radio 27) provides sufficient range to enable proximal communications with a portable transponder 100 that is carried by the lockbox system user. The built in wide area communication radio of the transponder (e.g., WAN radio 111), such as radios used by a cellular carrier, enables a host of other system features. One desirable feature of this arrangement is for individuals who access an electronic lockbox to be unencumbered with other devices. For example, real estate agents often have their hands full when approaching a lockbox, and such an agent that is equipped with a portable transponder 100 can enter a personal identification code on the keypad 114 of the portable transponder 100. It should be noted that the keypad 114 may also be referred to as a "data input device," in which a user (e.g., "agent") may press one or more of the keys to enter data, such as numeric information.

Such an agent could initially use the portable transponder and its keypad while remaining in a vehicle, for example, and inserting their secure memory card into the connector 117 of the portable transponder 100. In this mode, the agent can prepare his or her portable transponder to be ready to communicate his or her personal identification code from the transponder 100 to the lockbox 10 over the low power radio link (between radios 127 and 27), and the electronic lockbox will interpret that radio signal to allow access to the key compartment door 32. In this manner, the lockbox radio system retrieves data from the portable transponder 100 to facilitate access to the dwelling key that is contained within the secure compartment of the electronic lockbox 10.

In another operating mode, a secure memory card that is connected to smart card connector 117 of the portable transponder 100 can have data read from the memory elements of the secure memory card 70 that is connected to the portable transponder 100, and have that data sent to the electronic lockbox over the low power radio link, thereby having the secure memory card's data "read" by the electronic lockbox CPU 16. Furthermore, if it is desirable to write data onto the memory elements 71 of a secure memory card 70, that function can occur while the secure memory card is connected to the smart card connector 117 of the portable transponder 100, by having the low power radio 27 of the electronic lockbox 10 transfer data to the portable transponder 100, and the CPU 116 can then write data onto the secure memory card, via the smart card connector 117. This could be accomplished to write the same types of data that would otherwise be written directly by the lockbox 10 to the secure memory card 70 as it is connected into the smart card connector 17 of the lockbox itself.

The use of secure memory cards offer many advantages with the electronic lockbox system for access to the lockbox, which is well documented in previous patents and patent applications filed by the same inventor of this patent document. To further enhance security, the lockbox can use data that the portable transponder 100 has retrieved over its wide area radio system (i.e., the WAN 110), such as the current (real time) decryption key for use with the secure memory card. If the portable transponder loses contact with the central clearinghouse computer system 260, or if the secure memory card is either lost or stolen, the decryption key update credentials of the portable transponder can be revoked at the central clearinghouse computer, thereby disabling further access to lockboxes by that secure memory card.

Figure 3:
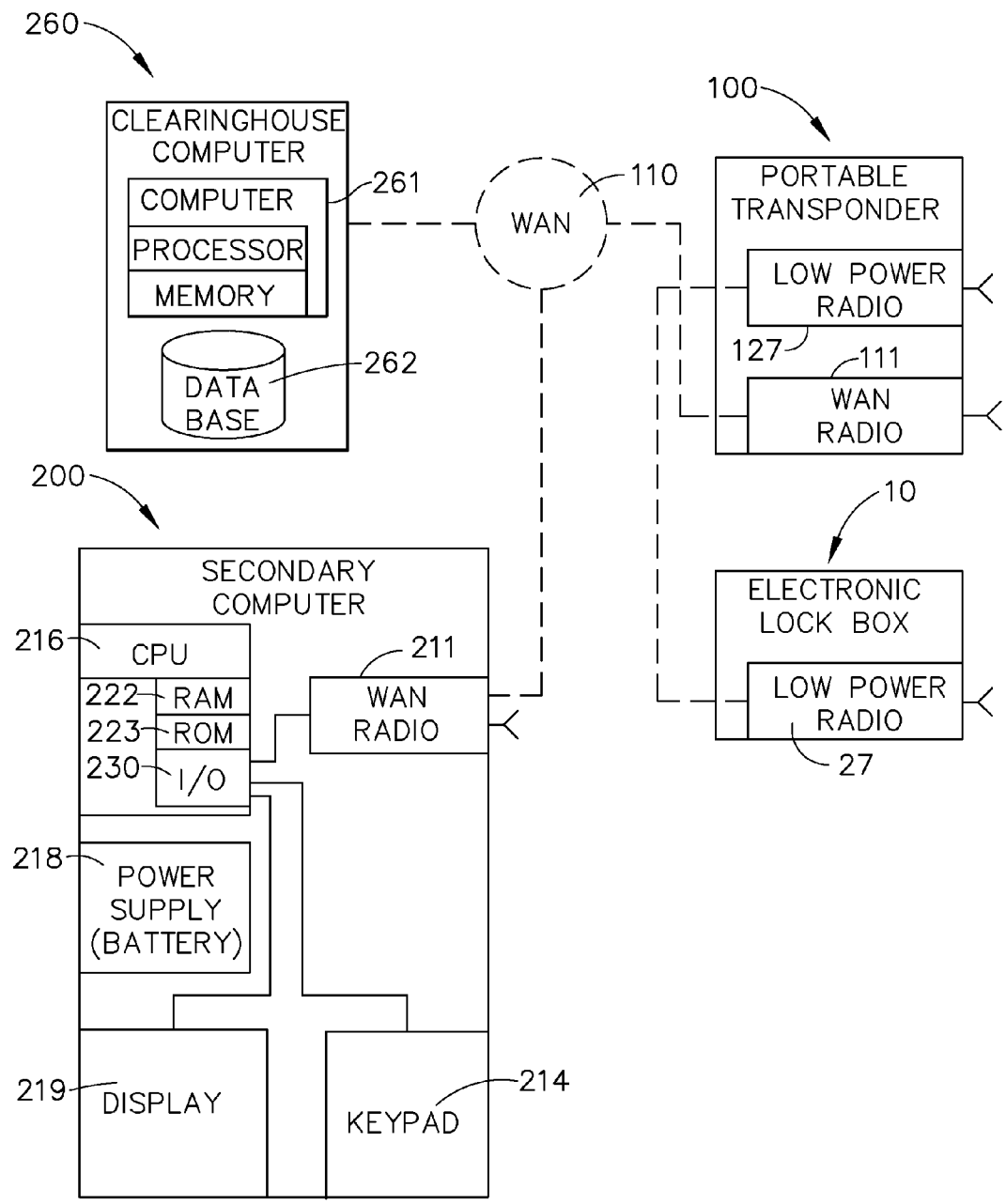
FIG. 3 is a diagrammatic view of the major components of a second embodiment of an electronic lockbox security system, including a central computer station, a wireless portable transponder device, a wireless portable secondary computer, and a portable electronic lockbox apparatus such as that depicted in FIG. 1.

FIG. 3 illustrates a second embodiment of an electronic lockbox system that includes the central clearinghouse computer 260, one or more portable transponders 100, and one or more electronic lockboxes 10. The system of FIG. 3 also includes a wide area network 110 that could use a standard cellular telephone service, if desired.

The clearinghouse computer 260 includes a computer 261 with a processor and memory, and also includes a database 262 to hold access event data as well as a myriad of other types of information used by the electronic lockbox system. The portable transponder 100 again includes a low power radio 127 and a wide area network radio 111. The electronic lockbox 10 again includes a low power radio 27, which communicates with the transponder's low power radio 127.

The second embodiment system of FIG. 3 includes an additional component, which is listed thereon as "secondary computer" 200. Secondary computer 200 includes a microprocessor (CPU) 216, and this computer (or processing circuit) also is coupled to random access memory 222, read only memory 223, and an input/output interface circuit 230. The secondary computer 200 also includes a display 219, a keypad 214, a power supply 218 (typically a battery), and a wide area network (WAN) radio 211. The WAN radio 211 can also be placed in communication with the wide area network 110, and therefore, can communicate with the clearinghouse computer 216 or the portable transponder 100 as desired.

As described above, the secondary computer 200 could be constructed as a standard commercial device, such as a wireless laptop computer, or an Internet-compatible cellular telephone (or "smart phone"), for example. The uses of the secondary computer 200 will be described below.

The configurations of the electronic lockbox systems depicted in FIGS. 2 and 3 offer new modes of operation and capabilities that were not previously available. Using the first embodiment system of FIG. 2, an access request routine is described in a flow chart depicted on FIG. 4. The routine begins at a step 300, and at a step 302 the user enters his or her personal identification number on the keypad 14 of an electronic lockbox 10. At the completion of this sequence, the electronic lockbox transmits a hail message to any portable transponders 100 that are in the area, at a step 304. This hail message comprises an encrypted data block that identifies the specific electronic lockbox and also the PIN of this user (which was just entered on the lockbox keypad). Compatible portable transponders that are in the vicinity and receive this hail request will retrieve the data that is present on the secure memory card that is plugged into their smart card connector 117 to compare the encrypted PIN data transmitted in the hail message with the data that has been stored on the secure memory card (in the smart card connector 117). This occurs on the flow chart of FIG. 4 at a decision step 310, where it is determined whether a portable transponder has received the hail. If not, then the logic flow is directed back to the beginning step 300 of this routine.

If the answer is YES at step 310, then a decision step 312 determines whether the portable transponder's stored data matches the encrypted data. If not, then the logic flow is directed back to the beginning step 300. Otherwise, the logic flow is directed a step 314.

Due to the number of combinations of PIN codes and the distributive nature of the electronic lockboxes in a typical system, the probability of matching more than one portable transponder is extremely remote. The particular user's portable transponder 100 which contains the secure memory card with a matching PIN code will acknowledge the lockbox hail request by transmitting back to the lockbox 10 a unique identifier, which occurs at a step 314.

A decision step 320 now determines whether or not the lockbox 10 has received the transponder's message. If the answer is NO, and this is determined by the portable transponder, then the transponder 100 will again try to send its unique identifier message to the lockbox more than once. The number of such attempts is determined by a step 316, which causes the step 314 to occur multiple times. On the other hand, if the lockbox 10 does receive the transponder message, then the logic flow will be directed to a step 322.

At step 322, the lockbox 10 instructs the portable transponder 100 to retrieve data from memory. In this instance, the portable transponder is instructed to retrieve one or more data elements from the secure memory card 70 that is connected at the smart card connector 117. For enhanced security, data messages between the lockbox 10 and the portable transponder 100 are encrypted with the most recent time-sensitive encryption key that has been received by the portable transponder over the wide area radio communications link (WAN network 110). This message sent by the portable transponder 100 occurs at a step 324 on the flow chart of FIG. 4. The electronic lockbox 10 attempts to authenticate the transponder message, using the lockbox's internally generated time sensitive encryption key, at a step 326.

A decision step 330 determines whether or not the authentication attempt by the lockbox 10 accomplishes a match. If not, the logic flow is directed to a step 332 which determines that the portable transponder 100 needs an updated encryption key. In this situation, access is not granted at a step 334, and the logic flow is directed to the end of this routine at a step 344. In essence, access to the secure memory card data is not being granted due to a mismatch between the portable transponder's encryption key data and the encryption key data that is provided by the electronic lockbox itself. This occurs because the portable transponder 100 has not retrieved the most recently updated decryption key from the central clearinghouse computer 260, and therefore, access to the lockbox 10 must be denied.

On the other hand, if an authentication match occurs at decision step 330, then access is granted at a step 340. In this situation the portable transponder 100 will allow the electronic lockbox 10 to use the low power communication link (between the low power radios 27 and 127) to communicate through the portable transponder to read and write data to and from the memory elements 71 of the secure memory card 70, at a step 342. This reading and writing data involving the secure memory card memory elements 71 will occur, just as if the secure memory card 70 was physically connected to the electronic lockbox 10 using the lockbox's on-board smart card connector 17. However, this now occurs using the portable transponder's smart card connector 117.

This new method for obtaining access to the lockbox's secure compartment has occurred under a "hands free" situation, which provides maximum convenience for the user. The user can manipulate the keypad data entry and install his or her secure memory card on the portable transponder 100, while remaining in a vehicle, if desired. The user can then easily carry the transponder in a pocket or purse, while approaching the lockbox 10. The user enters his or her PIN code on the keypad 14 of the electronic lockbox and then can physically access the secure compartment to obtain the dwelling key for entry onto the premises. The lockbox 10 will automatically send a hail message, and the portable transponder 100 will automatically answer that hail message, without the user further manipulating the portable transponder while at the lockbox. This represents the "hands free" attribute of the access request routine of FIG. 4

After the lockbox has written and read data to and from the memory connected to the portable transponder, the logic flow is directed to the end of the access request routine, at decision step 344.

Figure 5:
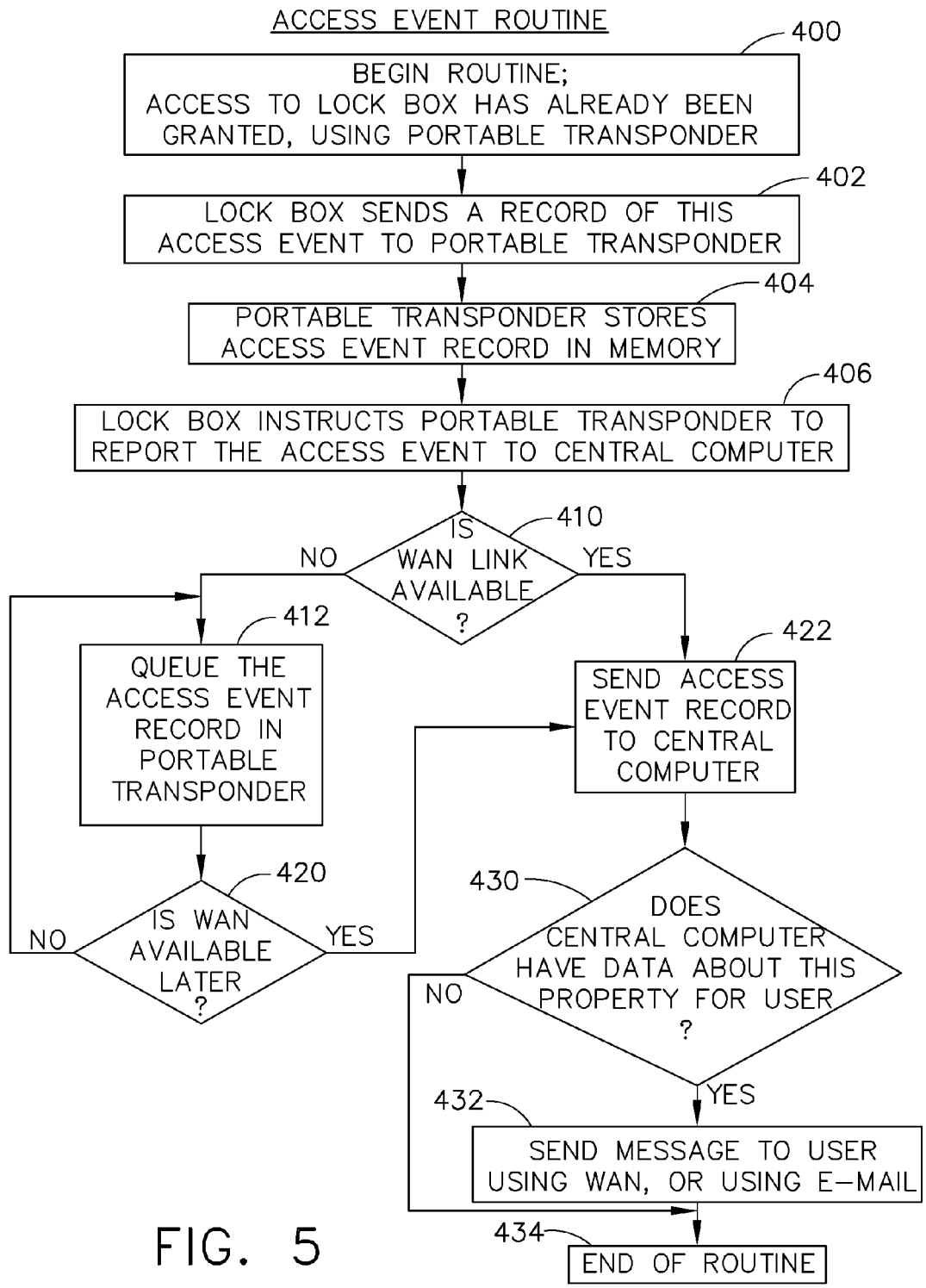
FIG. 5 is a flow chart of the steps performed by an access event routine, as used by the electronic lockbox security system of FIG. 2 or FIG. 3.

Referring now to FIG. 5, a flow chart is provided for an access event routine which occurs during an access event by a user of one of the system electronic lockboxes. The routine begins at a step 400, in which access to the specific lockbox has already been granted using a portable transponder 100. The particular electronic lockbox 10 now sends a record of this access event to the portable transponder, using the low power radios 27 and 127 of the respective system components. The data record is to be stored on a secure memory card 70 that is attached to the portable transponder (at the smart card connector 117), and this occurs at a step 404 on FIG. 5. The particular lockbox now instructs the portable transponder to report this access event to the central computer 260, at a step 406. This is to occur using the wide area network 110, in which the portable transponder sends the message using its WAN radio 111, which will eventually reach the clearinghouse computer 260.

Before the access event is actually received at the central clearinghouse computer 260, a decision step 410 first determines whether or not the WAN link is available. If not, then the logic flow is directed to a step 412 in which the access event record is queued in the portable transponder's memory. The WAN link could be unavailable due to low battery power, or perhaps the portable transponder is presently out of range of one of the cellular service areas, for example. Therefore, the access event data is queued for future transmission by the portable transponder 100.

Once the access event record has been queued in the portable transponder 100, a decision step 420 will be executed, in which the portable transponder will continue to determine whether or not the wide area network is available at a later time. If not, then the logic flow is directed back to step 412 where the access event record remains queued in the transponder's memory. When the WAN later does become available, then the logic flow is directed to a step 422.

If the WAN link was available at decision step 410, or later becomes available at decision step 420, then step 422 will send the access event record to the central computer 260 over the wide area network 110. The type of information that is sent to the central clearinghouse computer at step 422 includes the serial number of the lockbox that has been accessed, the user identification number that has accessed that lockbox, and a time and date stamp that indicates when the access event occurred.

Once this access event record is received at the central computer, a decision step 430 determines whether or not the central computer currently has data about this particular property for this specific user. If not, then the logic flow is directed to a step 434, which is the end of this access event routine. However, if the central computer does have data for this user and this specific property, then a step 432 sends a message from the central computer to the user, either using the wide area network, or perhaps using electronic mail.

The type of data that is sent to the user from the central clearinghouse computer at step 432 can include a text message about certain property information including the price of the property and various information regarding showing activity of that property. After this message has been sent to the user, the logic flow reaches the end of routine step 434.

The additional data that may be stored at the central computer and is the subject of steps 430 and 432 of FIG. 5 is an enhancement to the lockbox system, in which the central clearinghouse computer 260 can "push" such data either to the portable transponder 100, or perhaps to a secondary wireless device such as a smart phone that is also carried by the user. This secondary wireless device is represented as the "secondary computer" 200 in FIG. 3. This enhanced data can contain pertinent information about the property, such as recent access activity or sales-related activity, relative frequency of access to the property, secondary alarm system codes that may be needed to enter the property, and other types of important data. The enhanced data is thereby delivered in near real-time over at least one of the various wireless communication links, just after the portable transponder has sent the access event record to the central clearinghouse computer at step 422 of the flow chart on FIG. 5.

To significantly extend battery life, a relatively sensitive motion sensor is used in the portable transponder to detect activity by its user. This is reference to the motion sensor 156 of the portable transponder 100. One suitable motion sensor is the SignalQuest model SQ-SEN-200. Typically the only time it is desirable to communicate over the wide area radio communication link is when the user is actively engaged in accessing one of the lockboxes in the system. To save power, the portable transponder's microcontroller (e.g., CPU 116) keeps the radios off until the motion is sensed. Most wide area communication radios draw substantial current to maintain connectivity with the wide area network, even when the device is essentially inactive with regard to supporting a desired communication functionality. In the portable transponder 100, the motion sensor 156 is used to wake the device to see if the portable transponder should enter a period of more active communication with the central clearinghouse computer 260.

Figure 6:
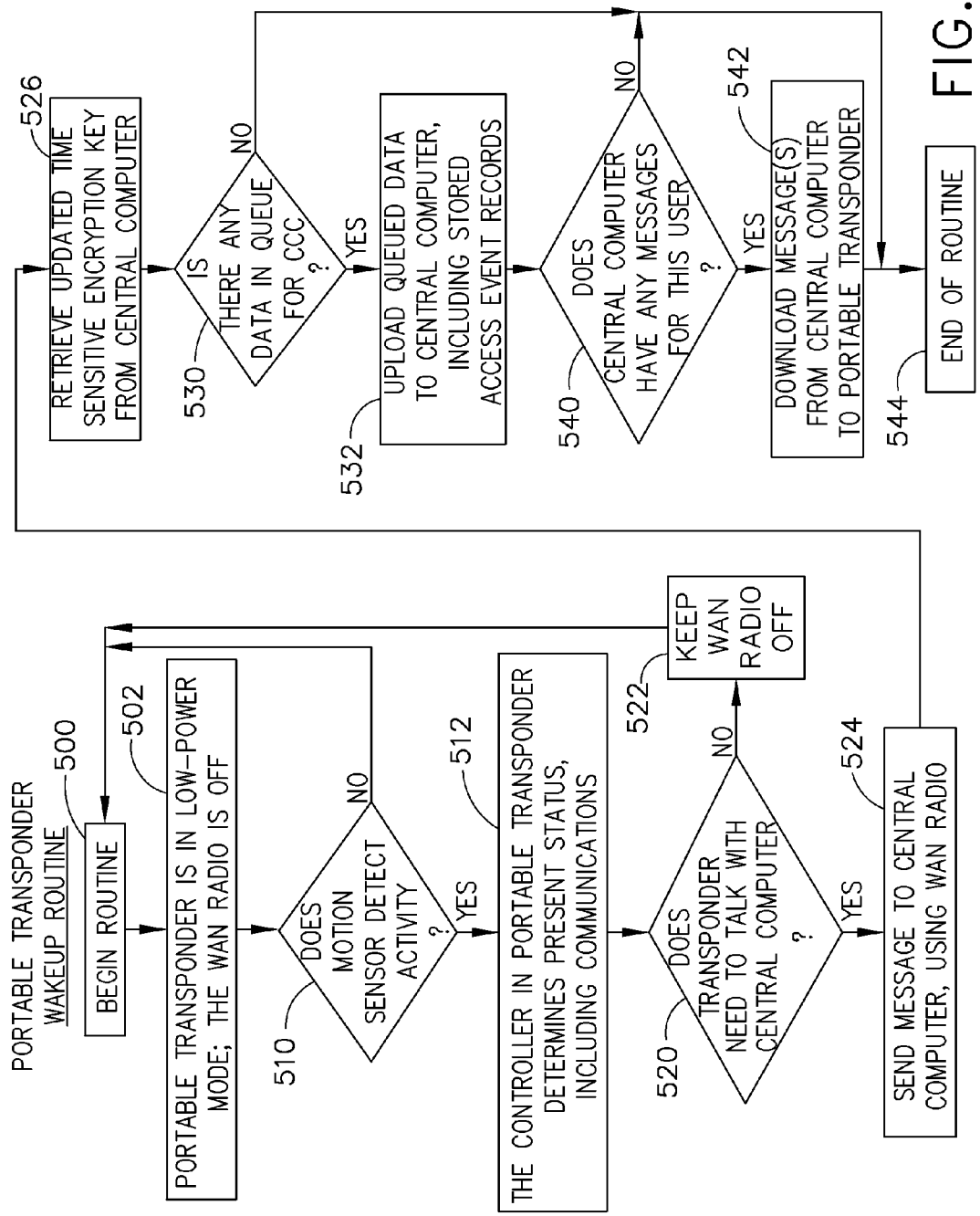
FIG. 6 is a flow chart of the steps performed by a portable transponder wakeup routine, as used by the electronic lockbox security system of FIG. 2 or FIG. 3.

A portable transponder wakeup routine is provided as a flow chart on FIG. 6. The routine begins at a step 500, and a step 502 begins with the portable transponder in its low-power or "sleep" mode, with the wide area network radio off. During step 502, the microcontroller of the portable transponder is generally in its "sleep mode." In addition, the modem that communicates with the WAN radio also is in its "sleep mode." When active, the modem and WAN radio transmitter typically draw about one Ampere. So it can be seen that the sleep mode saves a great deal of power.

It should be noted that there could be more than one way of causing a "sleep mode" for the portable transponder's radio; for example, electrical power to the radio's transmitter stage could be interrupted by a solid state switch or an electromechanical switch (or relay), or the electrical power to the entire radio could be interrupted, if desired. In addition, except for a low power timing circuit, it also is possible to place the entire electrical circuit of the portable transponder into a "sleep mode" if desired, and periodically wake the processing circuit for a very short time period to inspect its inputs and determine if it should then perform additional functions, or immediately go back into its sleep mode. The same is true for the electrical circuits of the electronic lockbox 10—this methodology can save a major amount of battery power for these remotely-used portable devices.

A decision step 510 determines whether or not the motion sensor detects activity. If not, then the logic directed back to the Begin Routine step 500. In reality, nothing substantial has occurred because the microcontroller has kept the wide area network radio off and the motion sensor has not detected any activity to require a different status of the device.

If the motion sensor has detected activity at step 510, then a step 512 requires the controller in the portable transponder 100 to determine the present status, including its communication status. Upon "waking" in response to the motion induced by the user, a decision step 520 determines whether the transponder needs to talk with the central clearinghouse computer 260. If not, then a step 522 keeps the WAN radio off, and the logic flow is directed back to the beginning of the routine at step 500.

In decision step 520, some of the information that is inspected to make this determination is as follows: (a) determine the current epoch time (b) determine if an update is required for the secure memory card that is connected to the portable transponder at the smart card connector 117; (c) determine if any data needs to be sent to the central clearinghouse computer; and (d) if either part (b) or (c) is true, activate the modem and connect wirelessly to the central clearinghouse computer to send a message establishing contact with the central computer (at step 524).

On the other hand, if the transponder does have a need to communicate with the central computer, then a step 524 sends a message to the central computer, using the wide area network radio 111, in order to retrieve an updated time sensitive encryption key if the portable transponder is within communication range of the wide area network 110. A step 526 retrieves the updated time sensitive encryption key, which is in a message sent from the central computer 260 to the portable transponder 100 over the wide area network 110.

In addition to the above, if there is any pending data at the portable transponder 100 that should be exchanged with the central clearinghouse computer 260 because of previous lockbox activity while the portable transponder was out of range of a receiver on the wide area network, that data can now be uploaded to the central clearinghouse computer. A decision step 530 determines whether or not there is any such data in the queue that should be delivered to the central clearinghouse computer. If there is no such data, then the logic flow is directed to a step 544, which is the end of the wakeup routine for the portable transponder. On the other hand, if there is data that has been queued for the clearinghouse computer, then a step 532 uploads the queued data to the central computer, including stored access event records.

A decision step 540 determines whether or not the central computer 260 has any messages for this particular user. If not, then the logic flow is directed to the end of routine, at step 544. If there are any messages for the user, then a step 542 will download such messages from the central computer to this portable transponder. After that has occurred, the end of the wakeup routine has been reached at step 544.

If desired, an additional switch could be added to the portable transponder 100 to activate the microcontroller. This could be a separate "wake-up" switch, which could be connected in parallel to the motion sensor 156. Furthermore, if the user presses any of the keys on the keypad 114, that could also be used as an indication to activate the CPU 116 of the portable transponder 100.

By using the motion sensor, additional power savings are enabled since this configuration avoids having the portable transponder continue to try and periodically connect to the wide area network 110, unless the portable transponder has been physically handled (or moved) by the user. One event that could be programmed into the CPU 116 to activate the WAN radio 111 could be if the user pressed any of the keys of the keypad 114. This could be an additional condition that could be used even if the motion sensor 156 had not detected a sufficient amount of motion to activate the WAN radio. It should be noted that the CPU 116 of the portable transponder 100 would need to be periodically activated and then quickly de-activated, so that the logical operations of the flow chart of FIG. 6 can be executed. For example, the CPU 116 could be activated once per second, just for a sufficient amount of time to see if any of its interrupt lines have been activated at that moment. If not, then the CPU could be quickly de-activated, thereby saving battery power. This type of feature is already built into the electronic lockboxes sold by SentriLock LLC.

Another advantage of the lockbox system of FIGS. 1, 2, and 3 is the flexibility of the removable secure memory card, also referred to herein as the "smart card." In the event that the portable transponder's battery 118 becomes depleted, the user can remove the secure memory card from the smart card connector 117 of the portable transponder 100, and then insert that same secure memory card into the smart card connector 17 of an electronic lockbox 10. This allows a user to immediately gain access to the lockbox, even if the user is many miles from his or her home location. And this access can occur without a lengthy round trip to replenish the battery of the portable transponder, in this "emergency" situation. Of course, the user would likely replenish the transponder's battery at the next opportunity.

Figure 7:
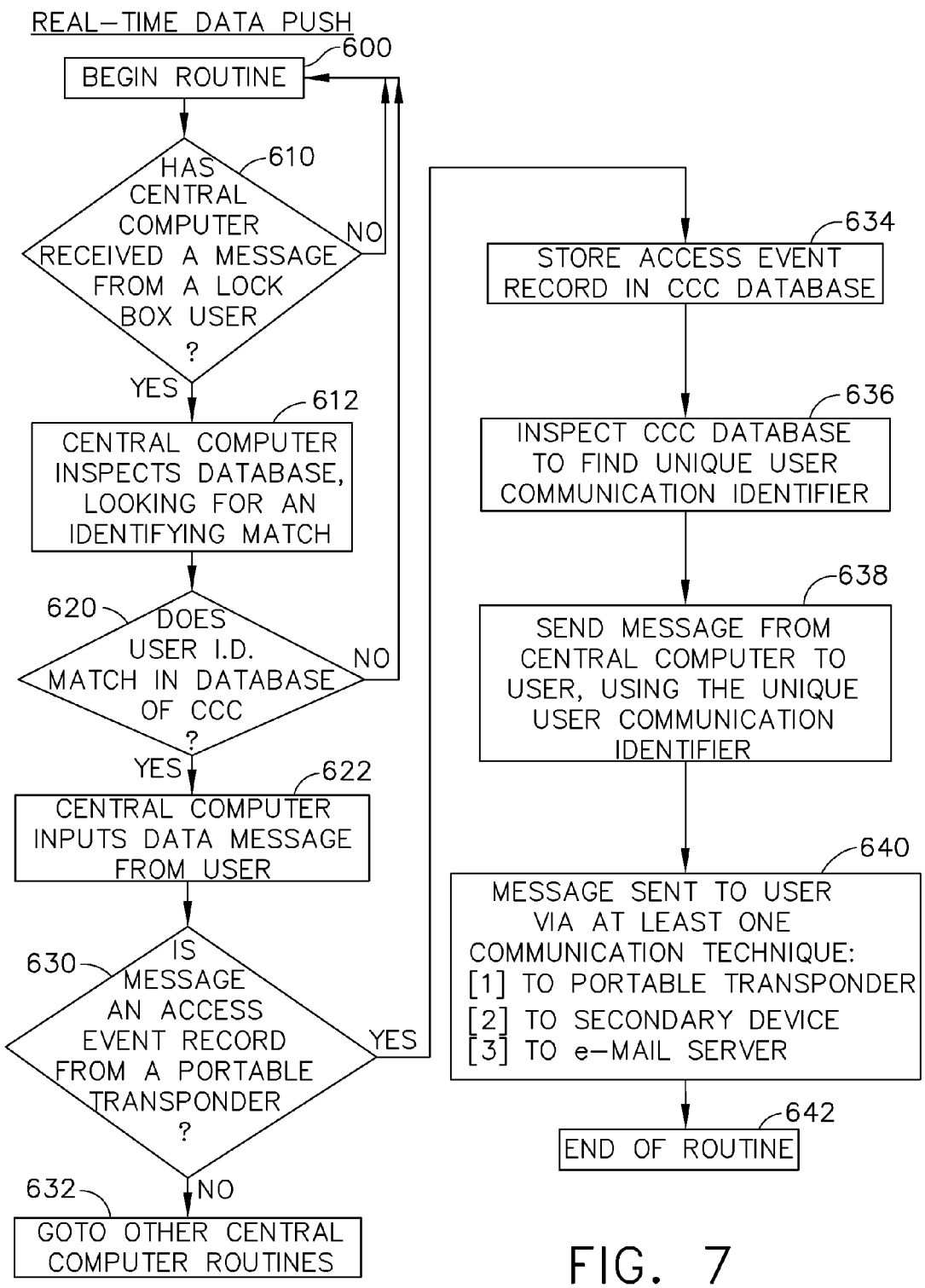
FIG. 7 is a flow chart of the steps performed by a real-time data push routine, as used by the electronic lockbox security system of FIG. 2 or FIG. 3.

Another feature of the electronic lockbox system of FIGS. 1, 2, and 3 is the possibility for a user to receive near real-time information updates while the user is present at a lockbox 10. This can be a desirable feature, and is possible when using a "real-time data push" routine that is depicted in the flow chart of FIG. 7. The routine begins at a step 600 and a decision step 610 determines if the central computer 260 has received a message from a lockbox user. If not, then the logic is directed back to the beginning step 600. However, if the answer is YES then a step 612 causes the central computer to inspect its database 262, searching for an identifying match of the identity of the lockbox user that it has just received a message from. This user identifier would be a type of "mobile terminal identifier" such as a cell phone number, a mobile IP (Internet Protocol) address, or some other type of unique identifier that has been stored in the database of the central clearinghouse computer. It would be preferred for the mobile terminal identifier to be a number or alphanumeric string that is automatically sent by the portable transponder, in which this string is parsed out from the other portions of the transmission that has been sent to the central clearinghouse computer 260 by the portable transponder 100.

A decision step 620 now determines if the user identifier matches the mobile terminal identifier that has been stored in the database of the clearinghouse computer. If not, then the logic flow is directed back to the beginning of the routine at step 600. If the answer is YES at step 620, then a step 622 causes the central computer 260 to input the data message that is being received from this user. A decision step 630 determines if the incoming message to the clearinghouse computer 260 is an access event record from a portable transponder 100. If the answer is YES, then the logic flow is directed to a step 634. If not, then the clearinghouse computer 260 goes on to execute other central computer routines at a step 632 on FIG. 7.

Step 634 stores the access event record in the central clearinghouse computer's database 262. After that has occurred, a step 636 has the central clearinghouse computer 260 inspect its database to find the unique user communication identifier; a step 638 will prepare a message from the central computer 260 to the user, using the user's communication identifier information. This data could consist of local alarm system codes, property information such as its current price, statistical analysis of property showing activity in the area, comparative information about a visited property with others that are similarly geo-coded, medical information about an occupant in the property, special instructions for a caregiver at the property, and other pertinent information.

A step 640 now has the central clearinghouse computer 260 send a message to the user via at least one possible communication technique. This data is sent to the user's mobile terminal without intervention by the mobile user. The central clearinghouse computer can be programmed to send such message to the user's portable transponder, or to a secondary device, or to an electronic mail server. If desired, the central computer 260 could be programmed to send this message to all three of these communication channels, or to only two the three, or simply to just one of the three, as desired by the user's original set-up programming.

It should be noted that one type of information that might be sent to the portable transponder 100 and/or to the secondary device is a "feedback request," which is a survey tool (a questionnaire) that can be used by an electronic lockbox system 250 or 260 to gather more specific information about a property for sale from a "showing agent" who has visited that property with a potential customer. A "feedback response" message would be solicited by such a feedback request. The user (e.g., the showing agent) receives the feedback request message via e-mail, or through the wireless wide area network, and answers questions that are presented in the feedback questionnaire using a computer (possibly the portable transponder). Those answers are then sent to the central computer 260 as the feedback response message. This type of functionality of an electronic lockbox system is described in detail in a companion patent application, noted below, having a title, "ELECTRONIC LOCK BOX SYSTEM WITH INCENTIVIZED FEEDBACK."

The mobile terminal of step 640 could be the portable transponder 100 or a secondary portable computer 200, which is depicted in FIG. 3. Such a secondary portable computer would typically be carried by the user, in addition to also carrying the portable transponder 100. The advantage to using a secondary device is having a lowered power consumption at a portable transponder itself, as well as possibly having a simplified construction for the portable transponder, which can lower its cost.

As noted above, the secondary computer device would typically be a wireless device, such as a smart phone. It also could be a wireless laptop computer, if desired by the user.

Figure 8:
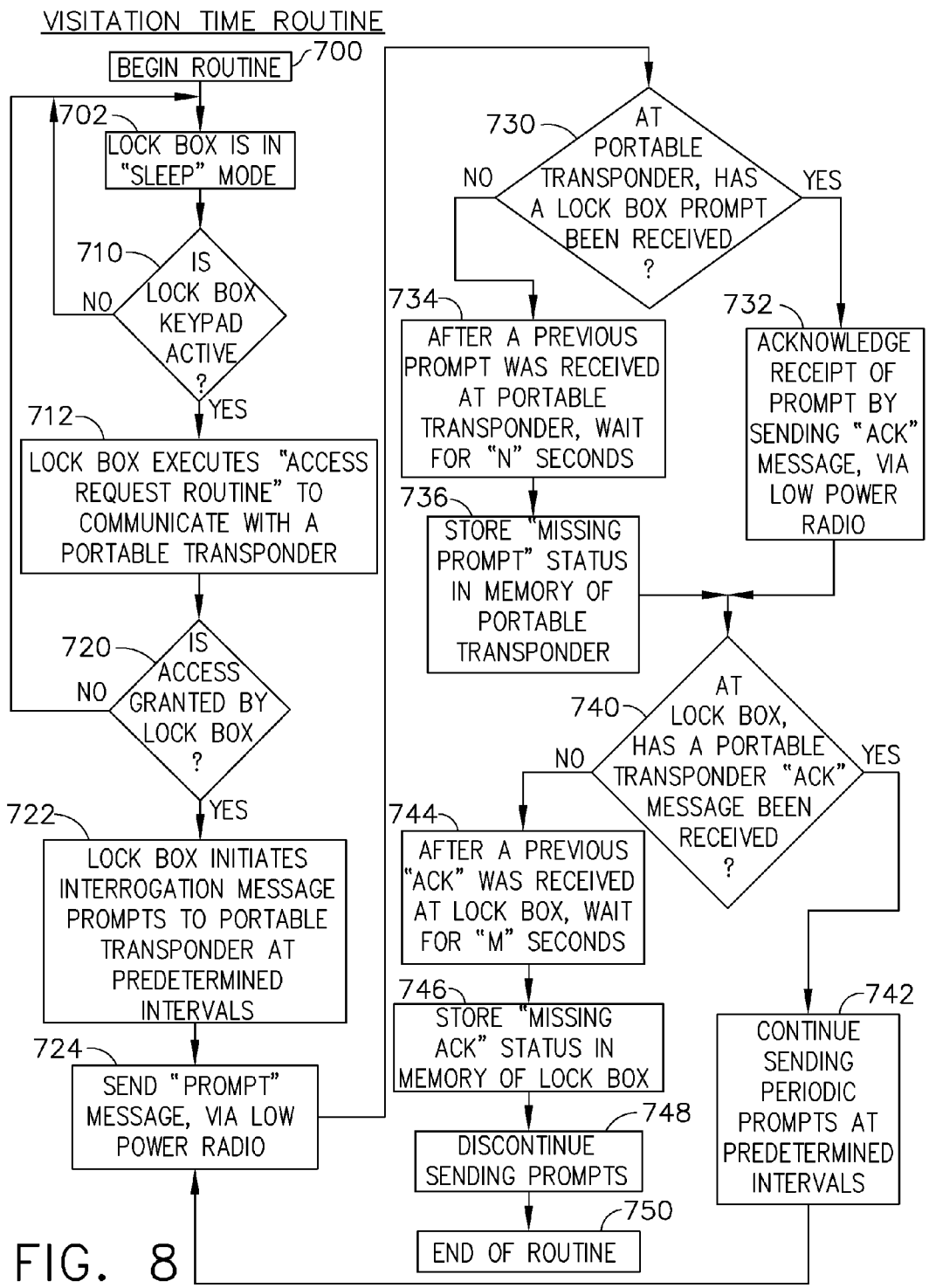
FIG. 8 is a flow chart of the steps performed by a visitation time routine, as used by the electronic lockbox security system of FIG. 2 or FIG. 3.

The capabilities of having a portable transponder as described herein allow additional features to be implemented in an electronic lockbox system. One advantageous feature is to provide the capability for tracking the approximate time in which a particular lockbox system user is present at the property that has been secured by a particular lockbox. Referring now to FIG. 8, a flow chart is provided to describe a "visitation time routine."

Upon activation of the electronic lockbox keypad 14, and then after a successful response by a portable transponder 100 to the hail request generated by the lockbox, the lockbox 10 will begin transmitting regularly timed interrogation messages to the portable transponder to determine if the transponder is still within range. This is accomplished on FIG. 8, starting at the beginning of the routine at a step 700, then arriving at a step 702 in which the lockbox is still in a "sleep" mode, by which the battery is in a low power state. This operating mode will change if the lockbox keypad is activated.

At a decision step 710, the lockbox device determines if its keypad is activated, by a user pressing one or more of its keys. If not, then the logic flow is directed back to step 702 and the lockbox remains in its dormant or "sleep" state. On the other hand, if one of the keys of the keypad 14 has been depressed, then the logic flow is directed to a step 712, and the lockbox then executes an "access request routine" to communicate with a portable transponder. This is a routine that is described in detail hereinabove, and is the subject of the flow chart of FIG. 4.

Figure 4:
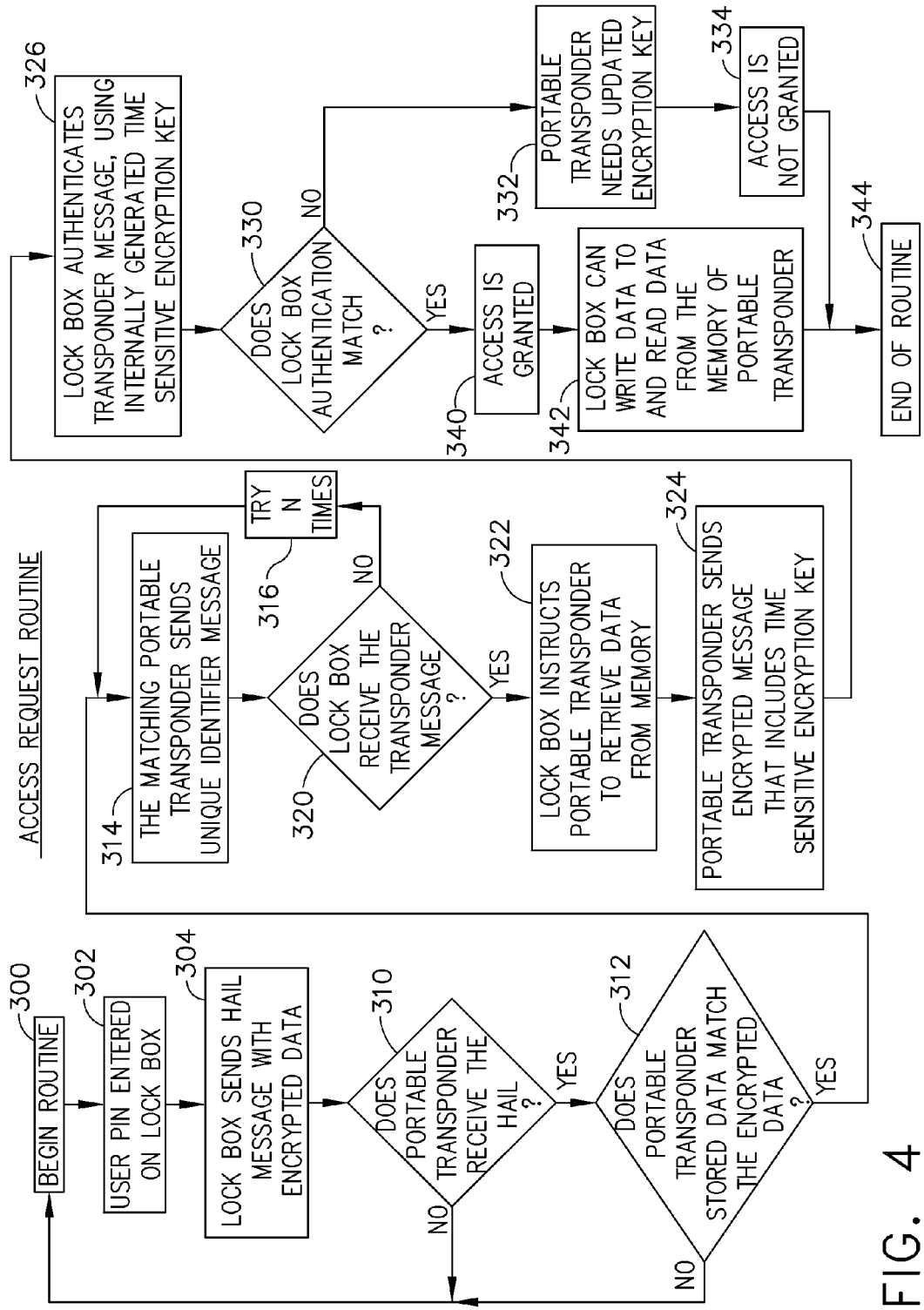
FIG. 4 is a flow chart of the steps performed by an access request routine, as used by the electronic lockbox security system of FIG. 2 or FIG. 3.

As part of the access request routine of FIG. 4, the system eventually determines whether or not access should be granted by the lockbox. On FIG. 8, this is depicted by a decision step 720, and if access is not to be granted by the lockbox, then the logic flow is directed back to step 702, and the lockbox goes back into its "sleep" mode until its keypad is once again activated. On the other hand, if access has been granted by the lockbox, then the logic flow is directed through the YES output from step 720, and reaches a step 722.

At step 722, the electronic lockbox initiates an interrogation message prompt (referred to herein as a "PROMPT message"), which is to be transmitted by its low power radio 27, and which will likely be received by a nearby portable transponder 100. Of course, this reception would occur only if the user who has been granted access to the lockbox actually is carrying a portable transponder that has been the subject of the access request routine that is involved with the flow chart of FIG. 4, as noted above. The PROMPT message preferably will be a brief data stream that contains a specific identifier code for this particular electronic lockbox 10, and/or a transaction code for this particular access event.

The first PROMPT message is followed by several more such PROMPT messages at predetermined time intervals. In general, it would be desired for periodic PROMPT messages to be sent by the lockbox, and received by the portable transponder. The time interval between each PROMPT message could be, for example, as much as once every sixty seconds, or if desired, it could be shorter, such as once every twenty or thirty seconds, for example. This could be an optional setting that can be changed by the system administrator for particular real estate board, if desired. The PROMPT message is sent at a step 724, via the low power radio of the electronic lockbox, as noted above.

If access had been granted for this particular electronic lockbox, this specific portable transponder would have been aware of that, due to the logical functions of the access request routine of FIG. 4. After the portable transponder has become aware that access had been granted, the portable transponder will then be expecting to receive the PROMPT message from the lockbox. A decision step 730 determines whether or not such a lockbox PROMPT message has been received at the portable transponder. If so, then a step 732 acknowledges receipt of this PROMPT message by having the portable transponder send an acknowledgement message (referred to herein as an "ACK message"), via its low power radio 127. The electronic lockbox will be expecting to receive this ACK message within a certain time period. The ACK message preferably will be a brief data stream that contains a specific identifier code for this specific portable transponder 100. Moreover, the ACK message could also contain an identifier code that was first created by the lockbox 10, which acts as a transaction code for this specific occurrence of an access event.

On the other hand, if the portable transponder has not yet received the lockbox PROMPT message at position step 730, then the logic flow is directed through its NO output to a step 734, where the portable transponder waits for a predetermined amount of time, referred to on FIG. 8 as "N" seconds. If the electronic lockbox sends out the PROMPT messages at predetermined intervals of thirty seconds, then the portable transponder can expect to receive such PROMPT messages about every thirty seconds, and the value for N could be set to just over thirty seconds. (However, if the interval timing is programmable by a systems administrator so that the value of N could be in the range of 20-60 seconds, for example, then the value for N at the portable transponder might be hard-coded for just over 60 seconds, so that every portable transponder will work in every lockbox system.)

If the portable transponder at decision step 730 has not yet received an PROMPT message from the lockbox, and this status continues for more than N seconds at step 734, then the logic flow is directed to a step 736, where the portable transponder stores a "missing PROMPT" status in the memory of the portable transponder device (e.g., in non-volatile memory that could be part of the ROM memory 123 (such as in EEPROM) of the portable transponder 100). On the other hand, if the PROMPT message was actually received by the portable transponder in less than N seconds, then the output from decision block 730 would only travel through the YES branch to the step 732, and there would be no storing of the "missing PROMPT" status at this time in step 736.

If step 736 has been reached and a "missing PROMPT" status is stored in the memory of the portable transponder, the portable transponder will calculate a number of intervals in which it had received the PROMPT messages, and the number of PROMPT messages that were received will be related to the amount of real time that the portable transponder was within range of this particular electronic lockbox. At part of step 736, this time calculation will be stored in the memory of the portable transponder, and it will be a close approximation to the amount of time for a "showing" of the property by a real estate agent (or the time of a "visitation" to the property by an authorized person, for other reasons).

It should be noted that an optional feature could be used in which the duration of the PROMPT message time intervals could be shortened under certain circumstances, to give more precision to the calculation of showing time, if desired. For example, the integral motion sensor of the portable transponder (i.e., motion sensor 156) could be used to validate that motion is occurring, and this information can be used by the portable transponder to generate its own interrogation message back to the lockbox at a shorter time interval during such motion events. This can help to define with greater precision when the portable transponder and electronic lockbox are within communication range, and when they first come out of communication range. This greater precision can then be used to more accurately determine the amount of time for the "showing" by the user of the property.

The logic flow from both steps 732 and 736 are directed to a decision step 740, which now determines at the lockbox whether or not a portable transponder ACK message has been received. If so, then a step 742 is executed, which causes the lockbox to continue sending the periodic PROMPT messages at the predetermined time interval. If that occurs, the logic flow is then directed to step 724 so that the lockbox will continue to send the PROMPT message, via its low power radio.

On the other hand, if the electronic lockbox 10 has not received an ACK message, then the logic flow from decision step 740 is directed through its NO output to a step 744, where the lockbox 10 waits for a predetermined amount of time, referred to on FIG. 8 an "M" seconds. In many circumstances, the value of M will be set equal to the value of N (from step 734), although it need not necessarily be set to be exactly equal. Once this status continues for at least M seconds, the electronic lockbox stores a "missing ACK" status in the memory of the lockbox at step 746. This will preferably be stored in nonvolatile memory, such as the EEPROM memory 23 (see FIG. 1). Once that occurs, a step 748 will cause the lockbox to discontinue sending the PROMPT messages, and the end of this routine will be reached at a step 750.

As part of the step 746 in which the lockbox stores the missing ACK status, the electronic lockbox will determine the approximate amount of time that occurred for the "showing" by the authorized user of this property to which the electronic lockbox has been attached. The lockbox 10 will keep track of the number of PROMPT messages that it has transmitted to the portable transponder during this specific access event, and since the lockbox will also know the amount of time between each PROMPT message transmission, it will have the information necessary to calculate the real time of the showing event, according to when the portable transponder and lockbox stopped communicating with each other. This calculated amount of time will be very close to the actual showing time spent by the user at the property. The user typically could be a real estate agent showing a property to a prospective buyer, or perhaps an authorized person visiting the property for another reason, such as a medical professional visiting a patient at the property.

In general, this system works to have the electronic lockbox periodically send timed interrogation message and such messages will be acknowledged by a portable transponder that is within communication range, using the low power radios (which are both transmitters and receivers) in both the electronic lockbox and the portable transponder. So long as the two devices continue to exchange data on a periodic basis, the event timing continues to advance. Once the communication loop ceases, typically due to the portable transponder moving out of communication range of the lockbox, then both the lockbox and the portable transponder will record in their respective memories the duration of the event during which the two devices were successful in exchanging the interrogation and acknowledgement messages. As noted above, the resolution of the timing (and thereby the accuracy of the system) can be affected by the interval of transmission of the interrogation messages, and if desired, this may be tuned by adjusting the interval period.

As an alternative, the electronic lockbox could track the epoch time for both the beginning of the access event and the end of this routine, to provide a different way of tracking the showing time. The electronic lockbox will know the epoch time when it began to send the PROMPT messages at step 722, and will also know the later epoch time when its step 740 determined that there has been no ACK message received within the appropriate time interval (as determined by step 744, by the value of M). These two epoch times could be subtracted from one another, and the difference value could be converted into real time minutes/seconds. The portable transponder could use a clock counter function in much the same manner, to provide its alternative way of tracking the showing time.

An optional, but perhaps necessary, feature of the visitation time routine of FIG. 8 will be to prevent adjacent lockboxes from affecting the timing of individual events at properties that are within close proximity to one another. To prevent this type of "crosstalk" between adjacent lockboxes, the optional function will cause a particular portable transponder to terminate an existing interrogation/acknowledgement loop from a first lockbox that was visited by a user, once the portable transponder receives a hail attempt by a different (second) lockbox. This will occur by the portable transponder refusing to acknowledge a further (existing) interrogation by the first lockbox, once the hail attempt has been received from the second lockbox. Once that occurs, then a new interrogation/acknowledgement loop will begin that involves the same portable transponder, but this time with the second lockbox, and not the first.

A variety of radio communications schemes can be employed to improve accuracy and reduce the chance of false events. Examples of such schemes include clear channel assessment before transmitting an interrogation or acknowledgment, burst transmissions of repetitive frames of data to overcome spurious noise, and analysis of received signal strength in determining a cutoff for reliable timing.

The visitation time for each authorized access event can thus be stored in the memory of both the electronic lockbox 10 and the portable transponder 100. This information can later be uploaded to a central computer (e.g., central clearinghouse computer 260) when a user communicates to such central computer at a later time, using the same transponder 100, or when a (perhaps different) user communicates to the central computer using a different portable transponder or a secondary computer 200, after the information was transferred from the particular lockbox 10 to that secondary computer 200 or portable transponder 10. Alternatively, this information could be transferred from the lockbox 10 to a secure memory device 70, and then later uploaded to the central computer when that memory device 70 has its memory contents read by the central computer.

It will be understood that the flow chart of FIG. 8 does not precisely represent the exact computer software executable code that typically would be used for these functions in the electronic lockbox 10 and the portable transponder 100. In the first place, each device will operate as an individual entity, and FIG. 8 is portraying the two devices working together, as if they are virtually communicating with each other's processors at every step; in reality, the two devices must communicate with each other using messages that are transmitted and received through their respective radios and I/O interfaces 30 and 130. Such messages are treated by their receiving devices with the proper decrypting and authenticating functions, so long as the messages are formatted correctly and contain the proper encrypted codings.

In the second place, most modern microprocessors are able to use multi-tasking software, or they can be interrupt driven, and thus able to perform portions of multiple functions out of a fixed sequence. In other words, one or more of their software routines could enter a "wait state" until certain conditions are satisfied, but their processors are not literally "stuck" once they reach a particular wait state, because their other "parallel" routines are still executing (as a multi-tasking processor should). Therefore, on FIG. 8, the control logic is not "stuck" at either step 734 or step 744 when no appropriate message has been immediately received.

Instead, if a new appropriate message (a "PROMPT" or an "ACK") is indeed received, then the logic flow immediately shifts to step 732 or step 742, to continue sending further ACK messages or PROMPT messages, respectively.

Figure 9:
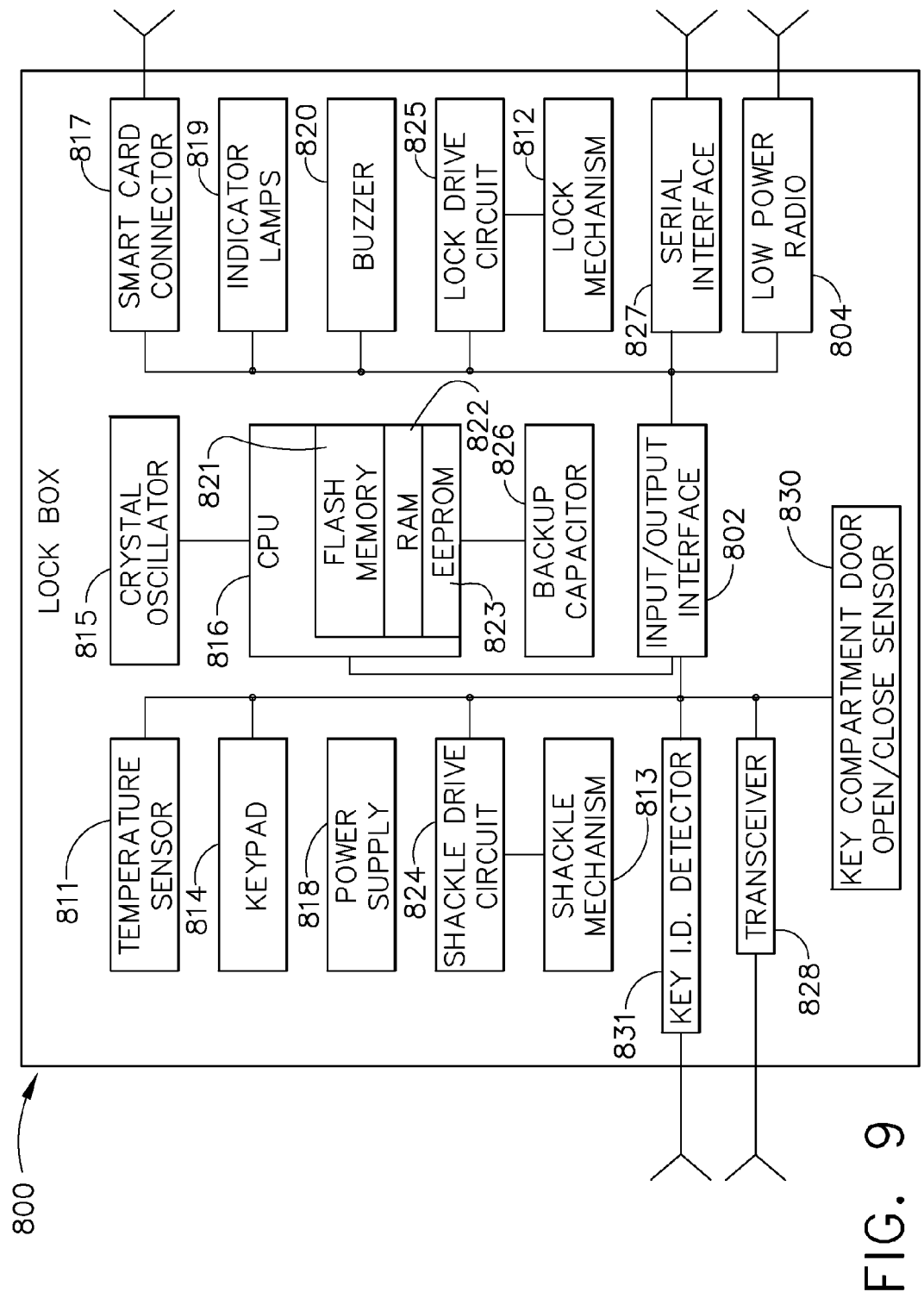
FIG. 9 is a block diagram showing some of the major hardware components of an electronic lockbox that communicates with a wireless portable electronic key, such as a "smart phone," and that also communicates with an identification device, such as an RFID transceiver circuit, as constructed according to the principles of the technology disclosed herein.

Lockbox with Wireless Communications to an Electronic Key:

An alternative lockbox design is provided in FIG. 9, which shows many of the major electronic components, generally designated by the reference numeral 800, in a block diagram. Most of the components listed in this block diagram are also found in the earlier versions of an electronic lockbox sold by SentriLock, LLC of Cincinnati, Ohio. A brief description of these components follows:

Electronic lockbox 800 includes a microprocessor (CPU) 816, FLASH memory 821, random access memory (RAM) 822, EEPROM (electrically erasable programmable read only memory) 823, a battery (or other electrical power supply) 818, a memory backup capacitor 826, an ISO-7816 smart card connector 817, indicator LED lamps 819, a piezo buzzer 820, a crystal oscillator 815, a digital temperature sensor 811 (these last two devices can be combined into a single chip) a shackle drive circuit 824, a shackle release mechanism 813, a key compartment mechanism drive circuit 825, a key compartment lock/release mechanism 812, and a membrane style keypad 814 for user data entry.

A serial interface 827 is also included so that the CPU 16 is able to communicate with other external devices, such as a separate portable computer in the form of a PDA (personal digital assistant) or other type of portable computing device that uses a serial data link. For example, serial interface 827 can comprise in infrared (IR) port that communicates with a standard IR port found on many PDAs; or it could use a different communications protocol, such as BlueTooth. A low power radio 804 is included for communications with a portable electronic key (not shown on FIG. 9). This radio 804 could have any number of types of communications protocols, including one that allows the lockbox 800 to exchange data with an electronic key in the form of a smart phone. A special software application program (an "APP") would run on the smart phone, to allow it to communicate with lockbox 800.

Microprocessor 816 controls the operation of the electronic lockbox 800 according to programmed instructions (electronic lockbox control software) stored in a memory device, such as in FLASH memory 821. RAM memory 822 is typically used to store various data elements such as counters, software variables and other informational data. EEPROM memory 823 is typically used to store more permanent electronic lockbox data such as serial number, configuration information, and other important data. It will be understood that many different types of microprocessors or microcontrollers could be used in the electronic lockbox 800, and that many different types of memory devices could be used to store data in both volatile and non-volatile form, without departing from the principles of this technology. In one mode of an exemplary embodiment, the electronic lockbox CPU 816 is an 8-bit Atmel Mega8 microcontroller that incorporates RAM 822, FLASH memory 821 and EEPROM memory 823 internally (as on-board memory).

Battery 818 provides the operating electrical power for the electronic lockbox. Capacitor 826 is used to provide temporary memory retention power during replacement of battery 818. It will be understood that an alternative electrical power supply could be used if desired, such as a solar panel with the memory backup capacitor.

An input/output (I/O) interface circuit 802 is provided so the microprocessor 816 can exchange data and operational signals with external devices, or with integral devices to the lockbox that require greater power than can be directly supplied by the microprocessor's pinouts. This puts the I/O circuit 802 in the pathway for virtually all signals that are used in the controlling of lockbox 800, including the data signals that are involved with the serial interface 827, the smart card connector 817, and the low power radio 804.

Electronic lockbox 800 generally includes a shackle (see item 946 on FIG. 10) that is typically used to attach the lockbox 800 to a door handle or other fixed object. However, it should be noted that stationary versions of these electronic lockboxes are now available that are permanently affixed to buildings, or other large object, and such stationary versions do not require shackles. One such stationary lockbox is illustrated in FIG. 11—see description below.

Figure 10:
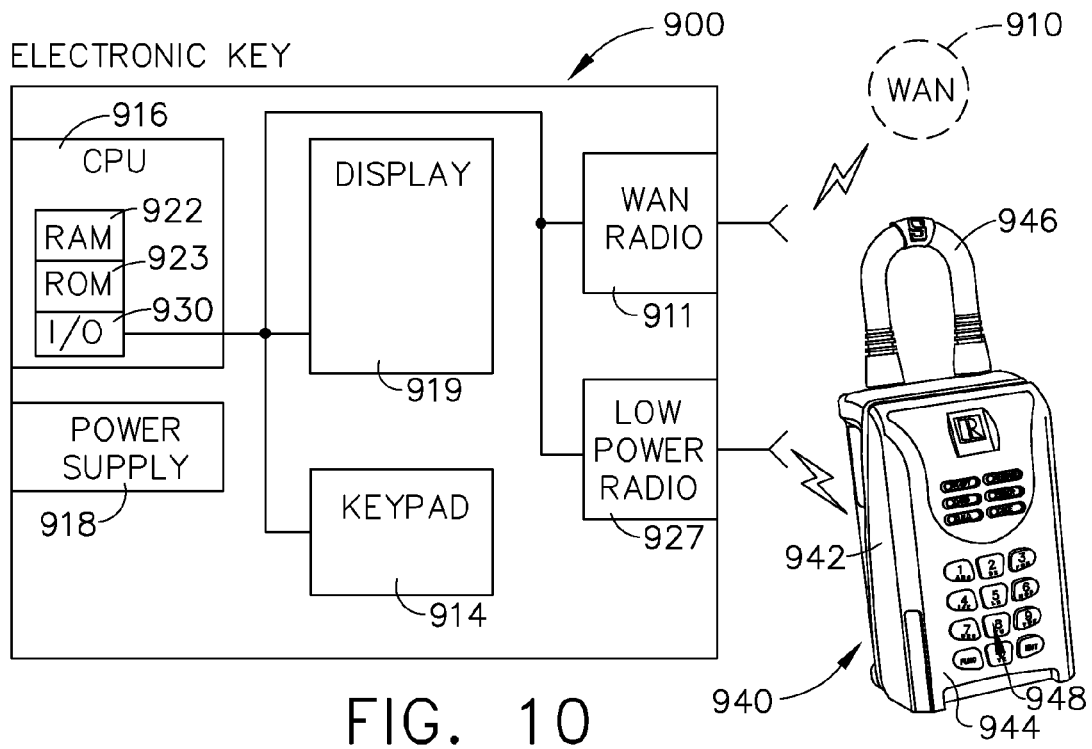
FIG. 10 is a block diagram showing some of the major hardware components of a portable electronic key that is capable of wireless communication with one of the electronic lockboxes of FIG. 1 or FIG. 9, for example, and that is capable of wireless communication with a wide area network, such as a cellular telephone system.
Figure 11:
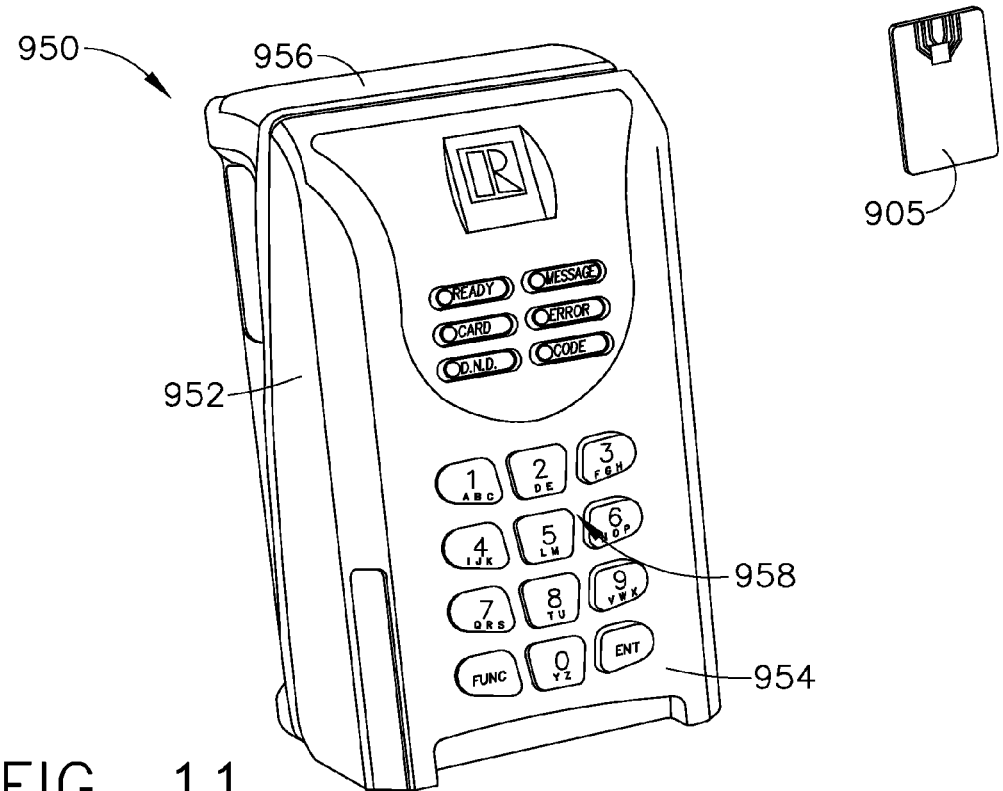
FIG. 11 is a perspective view of a stationary electronic lockbox, which includes the hardware components that are depicted in FIG. 1 or FIG. 9, for example.

Electronic lockbox 800 also includes a key compartment which typically holds a dwelling key (not shown), and which can be accessed via a key access door 32 (see FIG. 2), or a key access door 944 (see FIG. 10). Note that the structure called a "key access door" is also sometimes referred to herein as a "controlled access member." The key compartment's lock and release mechanism 812 uses a motor mechanism (not shown) that is controlled by drive circuit 825 that in turn is controlled by CPU 816. Shackle release mechanism 813 also uses a motor, which is controlled by drive circuit 824 that in turn is controlled by CPU 816. It will be understood that the release or locking mechanisms used for the shackle and key compartment can be constructed of many different types of mechanical or electromechanical devices without departing from the principles of the technology disclosed herein.

The crystal oscillator 815 provides a steady or near-constant frequency (e.g., at 32.768 kHz) clock signal to CPU 816's asynchronous timer logic circuit. The ISO-7816 smart card connector 817 connects to smart card contacts to allow the exchange of data between the electronic lockbox's CPU 816 and the memory devices in the smart card.

In one embodiment, the digital temperature sensor 811 is read at regular intervals by the electronic lockbox CPU 816 to determine the ambient temperature. Crystal oscillator 815 may exhibit a small change in oscillating characteristics as its ambient temperature changes. In one type of crystal oscillator device, the oscillation frequency drift follows a known parabolic curve around a 25 degrees C. center. The temperature measurements are used by CPU 16 in calculating the drift of crystal oscillator 815 and thus compensating for the drift and allowing precise timing measurement regardless of electronic lockbox operating environment temperature. As noted above, a single chip can be used to replace the combination of crystal oscillator 815 and temperature sensor 811, such as a part number DS32KHZ manufactured by Dallas Semiconductor.

LED indicator lamps 819 and a piezo buzzer 820 are included to provide both an audible and a visual feedback of operational status of the electronic lockbox 800. Their specific uses are described in detail in other patent documents by the same inventor. Backup capacitor 826 is charged by battery 818 (or perhaps by another power source) during normal operation.

Another sensor used in the present invention is the device that will detect the key security apparatus that is typically attached to a mechanical key 1011—see FIG. 12. This type of sensor is referred to on FIG. 9 as a key identification detector, generally designated by the reference numeral 831. The principle of operation of the key ID detector 831 would depend upon the type of key security apparatus that is being used with the mechanical key 1011. Referring now to FIG.

12, if the key security apparatus comprises an RFID chip 1025 with an antenna 1010, then the ID detector 831 would be a device that emits an electromagnet signal and can detect a return response signal. This would use a transceiver, such as the transceiver 828 depicted on FIG. 9. On the other hand, if the mechanical key 1011 is attached to a bar code tag 1035 (see FIG. 15), then the ID detector 831 would be some type of bar code reader, which typically involves a low-power laser beam and some type of photodiode or other type of photosensor device. Such photosensor and photoemitter devices could, in a sense, be considered a transceiver.

Electronic Key:

Referring now to FIG. 10, a block diagram is provided for showing many of the major electronic components of an electronic key, generally designated by the reference numeral 900. Part of FIG. 10 also diagrammatically shows certain other system components, such as a wide area network 910 and an electronic lockbox 940. This particular lockbox includes a housing 942, a movable door 944 that covers a secure compartment beneath its surface, a shackle 946, and a keypad 948 for entering data via a human user.

The electronic key 900 includes a microprocessor 916, which typically has on-board memory and interface components. On FIG. 10, the on-board memory circuit includes some RAM at 922, and ROM (or EEPROM) at 923. An input/output (I/O) interface circuit is depicted at 930. These on-board hardware components can be similar to those of the electronic lockbox, if desired. However, they are more likely to be part of a smart phone, which typically has very highly capable processing power and relatively large memory capacity.

Other hardware components of electronic key 900 include a power supply 918 (typically a battery), a display 919, a keypad 914 (which typically is part of a touch screen display, particularly if the electronic key is a smart phone and the display viewing area is large), a wide area network (WAN) radio circuit 911, and a low power radio circuit 927. The two radio circuits each have their own built-in antennas, as required for their broadcast and receive frequencies. The WAN radio 911 is designed to communicate with a wide area network, generally designated by the reference numeral 910; if electronic key 900 is a smart phone, for example, then the wide area network would generally be a cellular telephone network.

The low power radio circuit 927 is designed to communicate with one of the lockboxes of the overall security system. More specifically, the lower power radio 927 will exchange data messages with the low power radio circuit 804 of an electronic lockbox 800, as depicted on FIG. 9, or perhaps with the low power radio circuit 27 of an electronic lockbox 10, as depicted on FIG. 1. In the present technology disclosed herein, these low power radio circuits 927, 804, and perhaps 27, would comprise WiFi technology, particularly if the electronic key 900 is a smart phone. Of course, other communication protocols could be utilized without departing from the principles of the technology disclosed herein. As noted above, a special APP would run on the smart phone (as the electronic key 900), to allow it to communicate with a lockbox 800.

It should be noted that the electronic lockbox 940 can also be accessed by use of a standard SentriLock smart card, such as the secure memory card depicted at 905 on FIG. 10. Some of the "lockout" or "disable" functions that are discussed below are applicable to both smart cards (e.g., 905) and electronic keys (e.g., 900). These functions are discussed in detail below, with reference to flow charts such as FIGS. 21-23.

Another form of electronic lockbox is illustrated in FIG. 11. A stationary electronic lockbox is generally depicted at the reference numeral 950. Lockbox 950 has no shackle, and instead is designed to be permanently mounted to a building or other durable fixed structure, for lockbox security systems that can involve dwellings or other types of buildings used for human habitat, or for housing other items in which a protective secure access is desired. In this disclosure, lockboxes 940 and 950 will be said to contain a "dwelling key" in their secure compartments, whether the protected structure or physical area actually contains human occupants or not.

Lockbox 950 has similar structural elements as compared to lockbox 940. There is a housing 952, a movable door 954 that covers a secure compartment beneath its surface, and a keypad 958 for entering data via a human user. Lockbox 950 will include the same electronic components and control software as lockbox 940, sans the shackle latch members and the shackle itself. Lockbox 950 is designed to securely communicate with an electronic key 900 or with a smart card 905, just like lockbox 940.

Key Security Apparatus:

The technology disclosed herein offers other improvements to conventional electronic lockbox systems. Two main system components are used: the first main component is a specially designed "key security apparatus;" and the second main component provides additional sensors to the "standard" lockbox electronics, for communicating or retrieving data from the key security apparatus, as well as additional sensor elements to determine the key compartment's latching state.

This improvement provides a greater level of security by determining if the secured object (e.g., a mechanical key) has been properly returned to the lockbox. This is in response to complaints with older lockbox technology, in which dwelling keys sometimes are not replaced in the key compartment, either intentionally or accidentally, thus creating concern for the homeowner and inconvenience for real estate agents or contractors later attempting to access the key.

The key security apparatus can be as simple as a bar code decal on a key fob, or the key fob may contain electronic circuitry to provide a unique identification number, in the form of a signal for example, when communicating with the lockbox controller. This communication between the lockbox microcontroller and the key fob can be performed via, for example, an analog or digital RF (radio frequency) signal, an infrared link, a bar code detection scheme, a sense loop, or through an RFID-type communication system. To prevent tampering with the system, one of at least two methods can be employed to ensure that a fake key is not attached to the key security apparatus, and also to potentially identify if the key has possibly been copied.

A first method allows for a disposable key identification device in the form of passive electronics and an antenna that provide a unique response to an RF signal, in the form of inexpensive RFID (radio frequency identification) tags 1023 (see FIG. 12). The disposable key security apparatus 1023 is designed in such a way so that it will be rendered inoperable (in an unreadable state) if it is removed from the key (or other object) 1028 that it is attached to. This can be accomplished, for example, by utilizing an antenna wire 1022 that loops through the key ring hole 1012 (or other opening in the object; see FIG. 13), or perhaps using a fiber optic cable as the "antenna loop." The antenna loop could merely be a wire 1022 acting as an electrical conductor to complete an electrical circuit, or the antenna loop could indeed comprise an antenna 1010, such as an antenna used in an RFID tag. To remove the key (or other object) from the key security apparatus (e.g., on the key fob), the antenna loop must be cut or otherwise detached from the key, thus breaking the electrical circuit or otherwise rendering the communication link inoperable.

In the embodiment of FIG. 12, the key assembly generally designated by the reference numeral 1028 includes a tag subassembly 1023. This tag subassembly has an RFID chip 1025, with an antenna portion 1010 and electrically conductive foil paths 1024 that connect between the RFID chip 1025 and the antenna portion 1010. If the RFID tag subassembly 1023 is physically removed from the mechanical key 1011 of this total assembly 1028, it would have to be by clipping or otherwise cutting the antenna portion 1010, or breaking one portion of the antenna 1010 so that it can come free from the rest of the ID tag 1023 and therefore can be removed from the opening 1012 in the key 1011. By creating an open circuit by cutting or otherwise pulling apart the antenna portion 1010, the RFID tag subassembly 1023 will become non-operable, and the sensing circuitry will know that something untoward has happened to the key assembly 1028. In the embodiment of FIG. 12, the only way to remove the key security apparatus subassembly 1023 from the mechanical key 1011 is to cut or otherwise separate the antenna 1010, or to literally cut a slot in the mechanical key 1011 to allow the antenna to become separated physically from the key 1011. Of course, someone will eventually notice the destructive slot in the key 1011 and this will immediately bring suspicion onto the previous users of the electronic lockbox that accessed this particular key assembly 1028.

With respect to the embodiment of FIG. 13, the mechanical key assembly is generally designated by the reference numeral 1020, and includes a mechanical key 1011 that has an opening 1012. In this key assembly 1020, there is a key security apparatus subassembly 1015 that contains a microcontroller 1021 with an "antenna loop" 1022. A small battery 1027 powers the microcontroller 1021, and a transceiver circuit 1026 allows for external communications to and from microcontroller 1021, using the antenna loop 1022. In the embodiment of FIG. 13, the only way to remove the key security apparatus subassembly 1015 from the mechanical key 1011 is to cut or otherwise separate the antenna loop 1022, or to literally cut a slot in the mechanical key 1011 to allow the antenna loop 1022 to become separated physically from the key 1011. Of course, someone will eventually notice the destructive slot in the key 1011 and this will immediately bring suspicion onto the previous users of the electronic lockbox that accessed this particular key assembly 1020.

If the antenna 1022 is cut or otherwise mangled and separated at the microcontroller, then the transceiver 1026 will no longer be able to communicate with external devices, and the key assembly 1020 will no longer function properly. The electronic lockbox will notice this, when it tries to communicate with the key assembly 1020, and will act accordingly. In FIG. 13, the subassembly 1015 can be in the form of a "key fob," which contains other components therewithin, such as the microcontroller 1021 and transceiver 1026.

An alternative methodology could use a bar code label that is fabricated in such a way as to become unreadable upon peeling or cutting it off the key or object. For example, the bar code label could be made of a material that releases a dye or other chemical that alters the color of the label if the label is tampered with (e.g., if it is cut or torn from the key). The chemical could cause the white areas of a bar code label to turn black, for example, thereby making it impossible for the bar code to later be inspected by a bar code reader.

Figure 14:
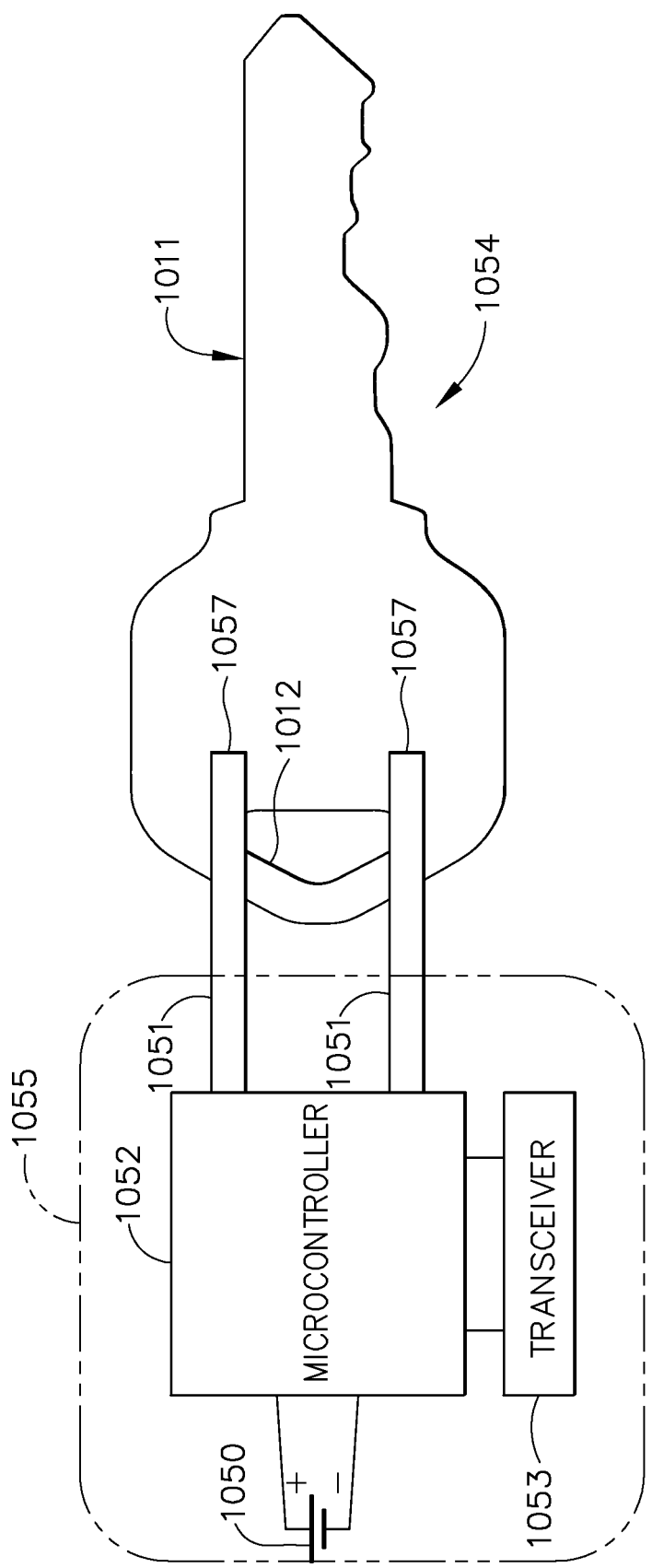
FIG. 14 is a side view of a mechanical key for use with an electronic lockbox, as constructed according to the principles of the technology disclosed herein, wherein the key has a security tag that includes an electrical circuit that makes electrical contact with the key, in which the electrical conductivity of the key completes an electrical "sense" circuit.

An example of this alternative methodology is illustrated in FIG. 14, by which there is a mechanical key assembly generally designated by the reference numeral 1054. The two major components of the assembly 1054 are a mechanical key 1011 and a key security apparatus subassembly 1055. In FIG. 14, the subassembly 1055 can be in the form of a "key fob," which contains other components therewithin. In the key assembly 1054, the key fob 1055 includes a microcontroller 1052 with a small battery 1050, and a transceiver circuit 1053 that allows the microcontroller to communicate to an external device; these components form an "identification member" of the security apparatus 1055.

Microcontroller 1052 has two electrically conductive leads 1051 that make electrical contact with the mechanical key 1011 at "clamping" regions 1057. The leads 1051 extend to the front side of the mechanical key 1011, as seen on FIG. 14, and moreover, a portion of the leads 1051 have a second component hidden in this view that makes contact on the opposite side of the mechanical key 1011 and thereby tends to grasp the key by a clamping or spring action (again at the region 1057, for example).

These leads form an "attachment member" of the security apparatus 1055. Assuming the mechanical key 1011 is made of an electrically conductive material, then if the mechanical key is removed from the electrical leads 1051, the microcontroller 1052 will sense a change of state in the electrical conductivity of the circuit path through the electrical leads 1051. This change of state may only be temporary, but the microcontroller will be programmed to note the change of state and store it in a memory location that preferably is non-volatile. Once this has occurred, the microcontroller can send a message using the transceiver 1053 to an electronic lockbox, or to an electronic key or other type of external device that can be in communication with the transceiver 1053, and by that methodology, it will become known that the mechanical key 1011 was removed from the electrical leads 1051. A time and date stamp can also be stored when the lockbox notices this new status, to further narrow the possibilities of which person may have done the key removal. This information can be transferred to a central clearinghouse computer, and the REALTOR® Board will then have knowledge of this key removal incident.

It will be understood that various types of mechanical and electrical connections can be made between a pair of electrical conductors such as those designated by the reference numeral 1051 on FIG. 14, and a mechanical key 1011. These interconnections can even be semi-permanent, such as a small tack weld at the areas 1057 on the electrical leads 1051, or the use of a screw; or perhaps the most useful interconnection would be some type of spring-loaded device that will provide a strong clamping action. A bend in the electrical leads 1051 to form a leaf spring effect would probably be the simplest and cheapest methodology for this mechanical/electrical interconnection.

Another alternative methodology is to provide a permanent re-codeable key security apparatus that senses its removal from the key or other object. Upon removing the key security apparatus from the key, an internal code changes or is rendered unreadable until refreshed or re-enabled through a process only available to the owner of the lockbox. One embodiment of this method is for the key security apparatus to use a metallic conductor, such as a screw, to complete an electrical circuit when the key is attached to the key security apparatus (e.g., to a key fob). In this embodiment, detaching the key security apparatus from the key would require removing the screw, which causes a circuit to be broken. When that occurs, the internal microcontroller in the key security apparatus will re-code its unique identification number, or it will otherwise disable the function of reading the identification code, until it later is re-enabled by action of the lockbox owner.

An example of this alternative methodology is depicted in FIGS. 15 and 16. In FIG. 15, a key assembly 1031 has two major components, a mechanical key 1011 and a bar code tag 1035. The bar code tag 1035 has a bar code label portion at 1030, and an extensible portion 1031 that wraps through the opening 1012 in the mechanical key 1011. So long as the extensible portion 1031 is not traumatically disturbed, the bar code label 1030 will remain visible. However, if the extensible portion 1031 is cut or torn, the result would be the embodiment generally designated by the reference numeral 1033 as seen in FIG. 16. The bar code tag 1035 still exists, however, an ink or dye has been released by the tearing action and obliterates the bar code label that was seen at 1032. The extensible portion that formerly went through the opening 1012 and the mechanical key 1011 has now been cut or torn at the area 1033 on FIG. 16. It will be understood that other methodologies for obliterating or deforming bar code labels or other visible indicia can be used without departing from the principles of the present invention.

The methods described above also allow the addition of a second security feature that inhibits the potential for covert mechanical copying of the key. The key security apparatus can be designed with sufficient "extra" material, such as plastic or metal, around the head of the key which prevents the entire key with its security apparatus from being inserted or clamped in a standard key duplicating machine. Such a structure would be difficult to remove without altering the key assembly to an extent that would raise suspicion if the altered key is later presented to a key duplicator.

With regard to the embodiment 1020 depicted in FIG. 13, an alternative sense loop could use a fiber optic cable that passes through the opening 1012 (e.g., a hole) in the key 1011. An LED emitter on one end of the cable could transmit pulses of light which are received at the other end by a photodetector. This optoelectronic assembly could be polled periodically by the microcontroller 1021, and an absence of a received pulse after a transmitted pulse could then be used to determine that the key had been detached.

Another possible embodiment would use a simple contact switch (e.g., an electromechanical limit switch) that changes state when the key is present within the secure compartment. The limit switch circuit could be periodically polled by a microcontroller, if desired, or if a digital input line is available, the limit switch circuit could be directly connected into such digital input and the microcontroller would be able to directly sense a change of state in the switch's contact.

The embodiments described in connection with FIGS. 12-14 represent different types of mechanical keys that could be used in an electronic lockbox found in many real estate sales situations, as discussed above. Although the actual keys described so far have been "mechanical" keys, such as the key 1011 in FIGS. 12-14, it will be understood that other types of dwelling keys could be used to open doors of a dwelling, and such other types of keys could be stored in the secure compartment of an electronic lockbox. Various types of non-mechanical keys will likely become popular in the future, and such keys could involve low-power radio transmitters such as the type used for unlocking automobile doors, for example, or other electromagnetic energy in the form of a low-powered light signal. See the description for FIGS. 17 and 18, below, for such newer types of radio keys.

If the key security apparatus comprises the electrical leads 1051 with spring-loaded contacts 1057, such as discussed above in reference to FIG. 14, then the ID detector 831 would work through the transceiver 828, which would communicate with the transceiver 1026 in the apparatus depicted in FIG. 13. Certainly other types of devices could be used for the "key security apparatus" that is used for being detected by the key ID detector 831 of the electronic lockbox in FIG. 9, without departing from the principles of the technology.

In addition to the "standard" components found in earlier electronic lockboxes by the same inventor, in the present invention an extra sensor or two is included to accomplish some of the principles of the present invention. On FIG. 9, a door open/close sensor 830 is included, which interfaces to the microcontroller circuit 816, via the I/O interface circuit 802. This sensor could be a simple contact switch.

A further possibility is to measure any change in inductance when the key security apparatus is attached to the key. A sensing coil could be placed near where the key attaches, and a signal passed through the coil could be used to measure the inductance, thereby indicating the presence or absence of the key.

Except for the directly-connected limit switch contact, the aforementioned embodiments might be preferred when it is necessary (or is at least desired) to electrically isolate the key from the key security apparatus. Much of today's CMOS-based control circuits are extremely sensitive to electrostatic discharge. Having metal contacts directly contacting the key might result in undesirable operation, and so the optoelectronic embodiment, the induction coil-sensing embodiment, and the other non-contact embodiments (e.g., the RFID tag, or bar code reader) would virtually eliminate that type of problem.

One methodology for implementing a key security apparatus is to equip the electronic lockbox 800 with a small radio frequency antenna that is positioned inside the key compartment portion of the lockbox, and this would be securely hidden behind the key compartment door 32. This situation would allow a mechanical key 1011 to be attached to a key fob type device that includes a radio frequency transceiver, such as the embodiment in FIG. 12, in which the assembly 1028 includes an RFID chip 1025 with an antenna 1010. Of course, this would also work with the embodiments of FIGS. 13 and 14, which also include a microcontroller and a transceiver circuit.

In any of these designs, the low-power radio frequency signal generated by the antenna inside the key compartment would not be able to easily escape through the metal enclosure of a standard electronic lockbox, as currently manufactured by SentriLock, LLC of Cincinnati, Ohio. Therefore, for the key to be properly detected, the key (along with its RF transceiver identification device) would have to be positioned within the secure compartment of the electronic lockbox 800. In this situation, the electronic lockbox 800 could directly determine whether or not the key assembly with its identifier tag or "key fob" is positioned within the key compartment (behind the key compartment door 32).

In one mode of the invention, the microcontroller 816 of the lockbox 800 could periodically send a short RF transmission, and if it receives the proper response, it could deduce that the key assembly was currently positioned within the lockbox key compartment. This periodic signal could be referred to as a "polling" signal, and if designed properly, the polling signal would only elicit an appropriate response from the "key fob" (i.e., the key identifier device) if the key fob was within range and could receive the polling signal, essentially by being within the lockbox secure compartment. If the electronic lockbox sends a polling signal and the key assembly has been removed, then generally there would not be a proper response. If an unscrupulous person attempted to fool the electronic lockbox by tearing off the key fob and leaving it inside the secure compartment, then because of the circuitry discussed above, there would still not be a proper response from the key security apparatus, such as the "key fob" apparatus 1023 of FIG. 12, the "key fob" apparatus 1015 of FIG. 13, or the "key fob" apparatus 1055 of FIG. 14. Since there are appropriate countermeasures in the design of the present invention, the unscrupulous person would be defeated in this attempt to fool the electronic lockbox.

Figure 17:
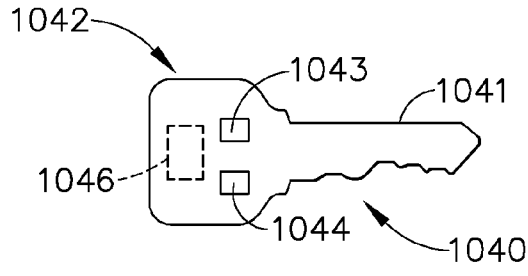
FIG. 17 is a side view of a modern automobile-type key for use with an electronic lockbox, as constructed according to the principles of the technology disclosed herein, in which the key has both mechanical surfaces for opening a mechanical lock of a dwelling or an automobile, and also has electrical pushbuttons for communicating with an electronic lock of a dwelling or an automobile.

Referring now to FIG. 17, a modern style automobile-type key is generally designated by the reference numeral 1040. Key 1040 has both a mechanical key component and an electronic key component. It has a standard key shape with mechanical lock-style keyed surfaces at 1041, and it has an electronic circuit portion on the opposite side of the key, at 1042 on FIG. 17. This type of key will typically have at least two pushbuttons, and on FIG. 17 they are depicted at 1043 and 1044. Such pushbuttons are generally for locking or unlocking the doors of a vehicle, such as an automobile. Many of these types of keys also have additional pushbuttons possibly for unlocking the trunk, or perhaps as an emergency alarm button. This type of key could also have an identifier built within the electronic circuit portion 1042. That identifier could be a standard RFID chip at 1046, for example, or some other type of identification device that uses a radio circuit.

Figure 18:
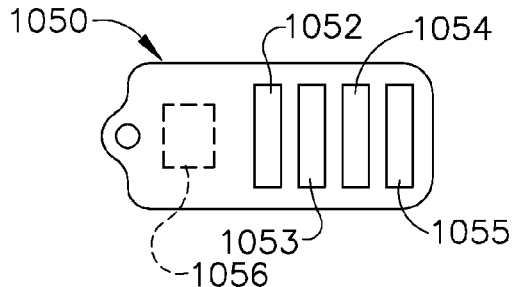
FIG. 18 is a side view of a newer automobile-type key for use with an electronic lockbox, as constructed according to the principles of the technology disclosed herein, in which the key has a built-in wireless identification device (such as an RFID tag) for opening an electronic lock of a dwelling or an automobile, and also has electrical pushbuttons for communicating with the same electronic lock of a dwelling or an automobile.

Referring now to FIG. 18, a yet newer style automobile-type key is depicted, generally designated by the reference numeral 1050. In this key 1050, there is no mechanical-type surface for unlocking any type of mechanical lock. Instead, this type of key is electrically operated only, and has an electronic circuit to communicate to an automotive-type vehicle. Such keys typically have four pushbuttons, and on FIG. 18 those pushbuttons are designated at 1052, 1053, 1054, and 1055. The key 1050 also has an RIFD chip at 1056, or some other type of electronic device used as an identifier, which could be some other type of radio operated circuit.

Both of these automotive-style keys in FIGS. 17 and 18 could be used with an electronic lockbox of the type generally depicted in FIG. 9. One of the pushbuttons could be used to open the door lock of a dwelling-style building, such as a house or an apartment. Another one of the pushbuttons could be used for locking such electronic lock of the dwelling. This type of technology might already be in place in some dwellings of newer construction.

All the above-discussed keys and/or key fobs can be generally described by the phrase, "dwelling key security apparatus." More specifically, such an apparatus will comprise a combination of a dwelling key and some type of specific identifier device that either is attached to, or contained within, the dwelling key. If a particular such apparatus is being discussed as having a relationship to a specific lockbox, that apparatus can be referred to as a "predetermined dwelling key security apparatus." In other words, if a predetermined dwelling key security apparatus came out of the secure compartment of "lockbox #1," then that same predetermined dwelling key security apparatus is later supposed to placed back into the secure compartment of "lockbox #1," not lockbox #2, and not to be carried off forever by a person either intentionally, or unwittingly. As such, the phrase "dwelling key security apparatus" is often used herein, including in the claims. The specific identifier device portion of this dwelling key security apparatus is of a type that can be detected by a sensor located on the lockbox; and more appropriately, the sensor would be able to detect that the predetermined dwelling key security apparatus is actually within the secure compartment of that lockbox.

Figure 19:
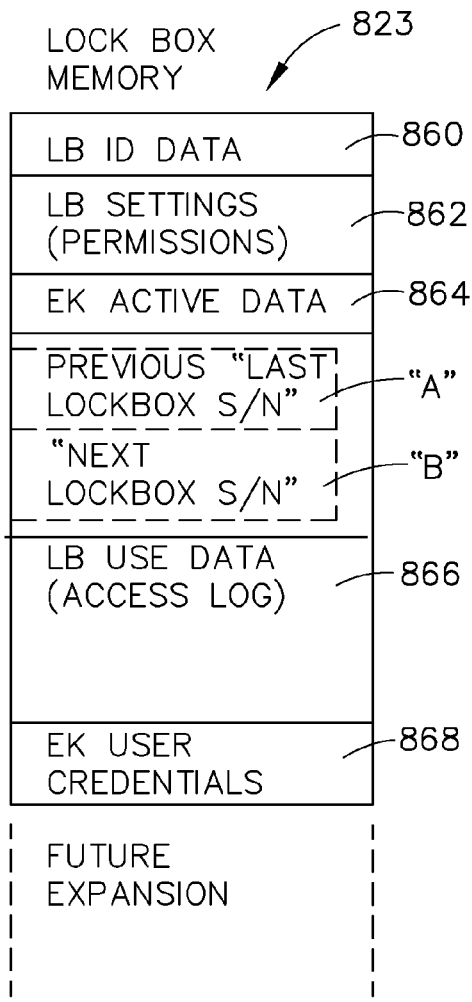
FIG. 19 is a generalized memory map of the memory circuit of an electronic lockbox, for use in the technology disclosed herein.

Referring now to FIG. 19, a generalized memory map of the memory circuit of a lockbox for use in the technology is depicted at the reference numeral 823. Every electronic lockbox has its own identification data stored in its memory circuit, and this is represented at reference numeral 860. In this technical disclosure, this type of lockbox identification data is also sometimes referred to as the lockbox serial number. Such identification data does not necessarily have to be strictly numeric, although that is a standard way of dealing with this type of identification data.

The lockbox also has a number of security settings, which are also sometimes referred to as "permissions." These are stored in the portion of the memory circuit designated at 862. This type of data includes the real estate Board, and other types of information pertaining to the options that lockboxes in a particular real estate Board will observe. One of those options would be whether or not the "lockout mode" is enabled in this realtor system or not. That setting has an impact on some of the logic diagrams discussed below.

The next portion of the memory map at 864 is for active data that involves electronic keys. The previous "last lockbox serial number" is stored in a memory location designated as "A". The "next lockbox serial number" is stored at a memory location designated as "B". The use of these variables is described below, mainly in reference to FIGS. 21 and 22, and also in later figures for an alternative embodiment.

The next large portion of the memory map is for lockbox use data, also sometimes referred to as access log information, and this is at the area designated by the reference numeral 866. The next set of memory at 868 is for electronic key user credentials, and that data is stored with regard to the electronic key that presently is attempting to access the secure compartment of this lockbox.

Figure 20:
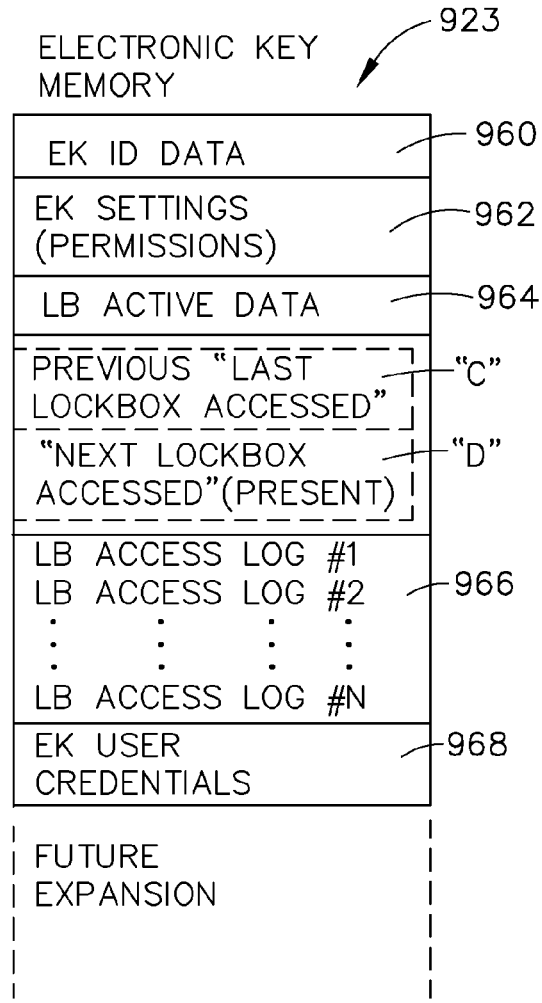
FIG. 20 is a generalized memory map of the memory circuit of a portable electronic key, for use in the technology disclosed herein.

Referring now to FIG. 20, a similar memory map generally designated by the reference numeral 923 is provided for an electronic key, for use in the technology, as generally depicted in FIG. 10. The identifying information for this particular electronic key is stored in a portion of the memory circuit at 960. This would include the serial number of a particular electronic key, including if this electronic key is actually a secure memory card of the type that has been used with SentriLock system lockboxes for years. If the electronic key is a smart phone, then the electronic key ID data will be of a different type of information—e.g., a different series of numbers.

The next portion of the memory circuit at 962 is for electronic key settings, also sometimes referred to as "permissions." As with lockboxes, electronic keys are designed to work within certain REALTOR boards, and that information is stored here.

The next portion of the memory circuit at 964 is for storing active data with respect to lockboxes that are accessed by this electronic key. The previous "last lockbox access" is stored in a portion of the memory that holds a variable called "C". The "next lockbox access" is stored in a portion of the memory that holds a variable called "D"—this information "D" pertains to the present lockbox that is being accessed.

The next large portion of memory in the electronic key is for storing access logs for many different lockbox access events. This portion of memory is in the memory map at 966. Finally, the electronic key's user credentials are stored at 968; and this information can be transferred to the electronic lockbox and stored at its memory locations at 868 on FIG. 19.

Control Logic for Electronic Key Disable Function:

When a real estate agent visits a dwelling and obtains possession of the dwelling key that is stored in the lockbox that has been placed at the dwelling, it is important that the dwelling key be returned to the lockbox secure compartment before the real estate agent leaves the premises. One way to help insure that this actually occurs would be to disable the electronic key (or a secure memory card) that is carried by the real estate agent during the lockbox transaction. In other words, if the real estate agent obtains possession of the dwelling key but does not return that dwelling key to the correct lockbox, then the real estate agent's electronic key will not operate to access any other lockboxes in that real estate Board system.

Figure 21:
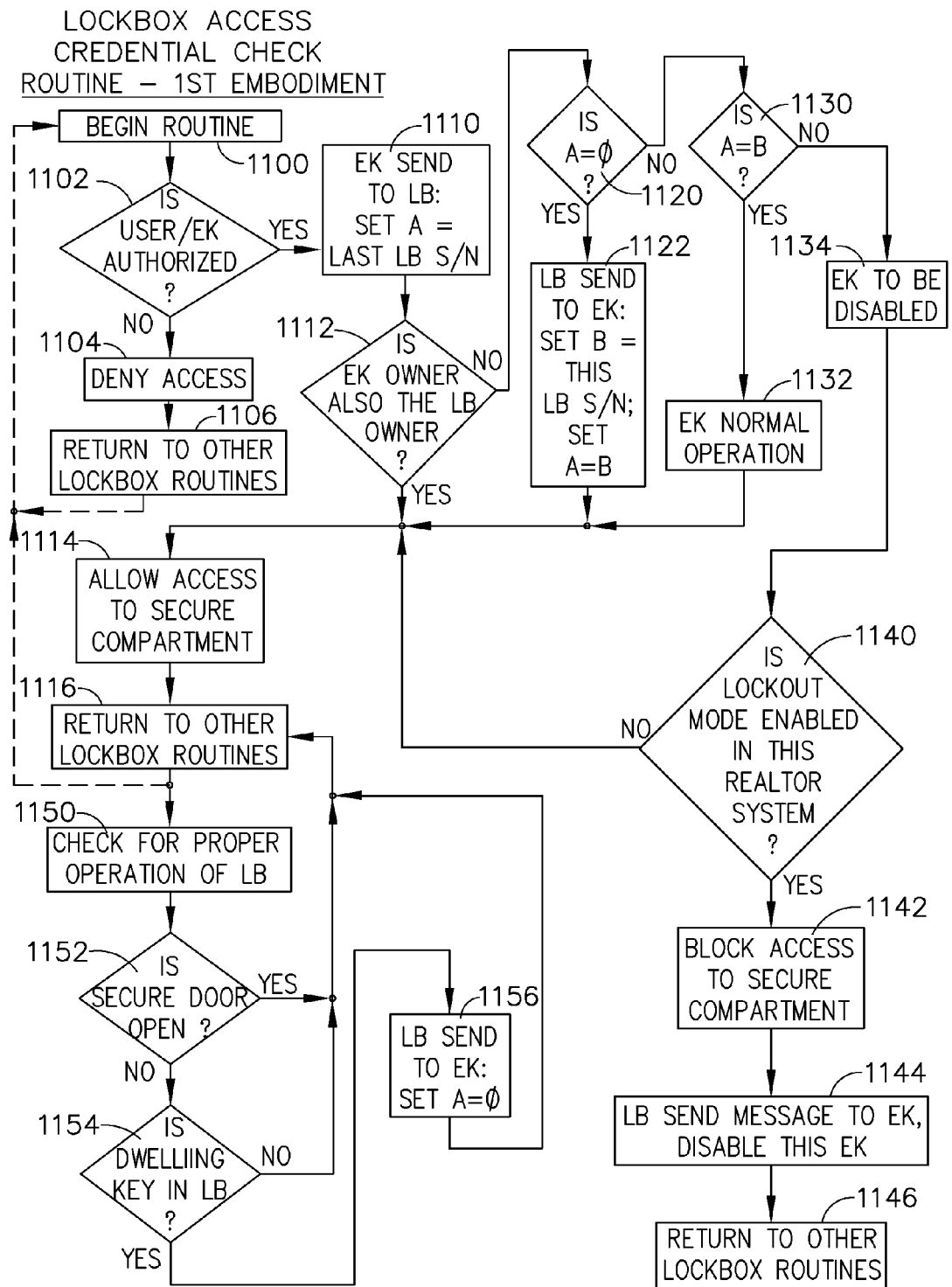
FIG. 21 is a flow chart of some of the steps executed by an electronic lockbox to perform a "Lockbox Access Credential Check" routine, for a first embodiment of logic control.

Referring now to FIG. 21, a flow chart is provided for a first embodiment of the logic control for when a lockbox is accessed by an electronic key, in which the electronic key will not work with other lockboxes until the dwelling key is returned to this first lockbox. FIG. 21 is called a "lockbox access credential check routine," and shows many of the operational steps performed by the controller of the lockbox itself. There are some stages of this control logic that pass data to an electronic key, or receive data from an electronic key, but the electronic key has its own operational logic which is described on a different flow chart.

Although the logic presented on FIG. 21 shows a system that expects to have a lockbox access transaction between an electronic lockbox and an "electronic key," most of this logic will also work in the same manner if there is a secure memory card instead of an electronic key. (In this sense, a secure memory card is a type of electronic key.) One other note: the real estate Board will have an option as to whether or not this "lock out mode" shall be enabled or not for the lockboxes in that particular Board's system. If the answer is YES, then all lockboxes in that particular real estate Board will operate in this manner. If the answer is NO, then none of the lockboxes in that particular real estate Board will have this mode enabled.

The credential check routine begins at a step 1100, and the first logic is performed at a decision step 1102, where the lockbox determines whether or not the user and the specific electronic key that is communicating with the lockbox are authorized to access the secure compartment. If the answer is NO, then access to the secure compartment will be denied at a step 1104. The logic flow will now return to other lockbox routines at a step 1106.

At decision step 1102, the answer could have been YES, but for that to occur, both the user's personal identification information has to be correct, and also the electronic key itself has to be correct with regard to its identification information. As a minimum, both the lockbox and the electronic key must have identifying data that shows they both belong to the same real estate Board. In addition, the electronic key has to be "up to date," meaning that it has been rejuvenated so that is working in the correct epoch time, such that the encrypted data that contains both the epoch time, the rejuvenation data, and the user's PIN have all been combined into the correct diversified numeric data by the hash routine, so that the lockbox will properly decrypt that information to come up with the correct user's PIN that will match the actual user's PIN data when it is entered on the keypad. This type of information will be required whether or not the electronic key is being used, or if a secure memory card is being used, because both devices will contain the same type of information. This all relates to the EK user credentials that are stored in the memory locations at 968 in the electronic key, and later in the lockbox memory at 868.

Once the lockbox has determined that both the user and the electronic key are authorized, a step 1100 is performed by which the electronic key sends (or already sent) a message to the lockbox. The last lockbox that was visited by this electronic key had a serial number, and that information is sent to the current lockbox from the electronic key in this step 1110; the information is placed into a variable that is referred to herein as "A". This variable A typically consists of a multi-digit numeric value, and each lockbox in the system will have a unique identifying number, which is often referred to as the "serial number" in this disclosure.

Before going farther in this flow chart, it must be understood that other functions occur in the lockbox and also in the electronic key, either in a true multi-tasking software environment, or in a sequential operating mode with each routine quickly coming to a point in its processing where it returns to the main routine to allow other operating routines to be executed. The lockbox itself has another routine that is illustrated on FIG. 21, and is called the "check for proper operation of lockbox" routine, at a step 1150. In this check for proper operation routine, a decision step 1152 is performed to determine if the secure door of the key compartment is open or not. Some type of sensor (e.g., a limit switch or proximity sensor) is used to determine this state of operation. If the answer is YES, then that is the end of this short routine and the logic flow returns to other lockbox routines at a step 1116. On the other hand, if the secure door is not open, then a decision step 1154 determines whether or not the correct dwelling key is in the lockbox. For this step to be performed properly, the dwelling key must have some type of security identifier, as discussed above with respect to the various security keys that are illustrated in FIGS. 12-18, for example. In other words, not just any mechanical dwelling key or some type of electronic dwelling key can be placed into the secure compartment; it must be the correct such key with the proper security identifying apparatus, and a sensor in the lockbox will detect that. If the answer is NO at step 1154, then the logic flow returns to other lockbox routines at step 1116.

On the other hand, if both of these decision steps are answered correctly, then the logic flow is directed to a step 1156 where the lockbox sends a message to the electronic key to set the value of A equal to zero. This can only occur if the secure compartment door has been closed (see step 1152) and if the correct dwelling key is contained within that secure compartment (see step 1154). This is the desired state of the lockbox at the end of a showing, and when the real estate agent walks away from that dwelling with the lockbox in that state, everything should be set back to its normal operating parameters. In the logic flow for this first embodiment, the way this is achieved is to essentially null out the lockbox serial number, and have zeros put into the value for the variable A. This will be important at other portions of this logic diagram in the flow chart of FIG. 21. Once A has been set to zero, the logic flow is directed to step 1116, where the logic returns to other lockbox routines.

Referring back to step 1110 on FIG. 21, the electronic key is sending the value of A to the lockbox. If the electronic key has had its value A set to zero by a previous visit to a different lockbox that has gone according to normal circumstances, then A will be equal to zero at this point. A decision step 1112 now determines whether or not the owner of the electronic key is also the owner of the lockbox. If YES, then the logic flow is directed to a step 1114 that allows access to the secure compartment. This will always be true for the real estate agent who also is the lockbox owner, once that user and his or her electronic key have been authorized at step 1102. The logic flow is now directed to return to other lockbox routines at step 1116.

Most real estate showings are not performed by the lockbox owner, but instead by other real estate agents. In that situation, the logic flow of decision step 1112 is directed out the NO output to a decision step 1120. At step 1120 the logic checks to see if the value of A is zero. If YES, then the lockbox sends a message to the electronic key to set a variable known as "B" to "this lockbox serial number." This function occurs at a step 1122. In this situation, "this" lockbox is the one attempting to be accessed right now, and that lockbox's serial number is placed into the variable B. This step 1122 also sets the numeric value of A to that same lockbox serial number. This message is transmitted to the electronic key, so that both variables A and B are set to the same numeric value at the electronic key as well. (At the electronic key, these variables are called "C" and "D.") After this has occurred, the logic flow is directed to the step 1114, and access is allowed to the secure compartment of the lockbox. This is the usual state of affairs at the beginning of a showing of a dwelling by a real estate agent. In this circumstance, the agent's electronic key initially had the value zero for its variable A, and after the lockbox was accessed, both the lockbox and the electronic key have had their variables A and B (or C and D) set to this lockbox's serial number. This information will be used later, typically at the end of the showing.

At the end of a typical showing, the logic flow travels from step 1102 through steps 1110, 1112, arriving at decision step 1120. Since the value of A is not equal to zero, the logic flow is directed to a decision step 1130 where it is determined whether or not the value of A is equal to the value of B. If the answer is YES, then the logic flow is directed to a step 1132 where the electronic key is allowed to continue normal operation, and access to the secure compartment is allowed at 1114. This is the desired scenario, and is the expected result so long as the particular electronic key has not had communication with a different lockbox in the meantime; however, if the electronic key had communicated with a different lockbox, then that lockbox's serial number would have been placed into the variable B, and thus A would not equal B for that different lockbox. In that situation, the logic flow at decision step 1130 would have been directed to a step 1134 where the electronic key will become disabled. Before that occurs, a decision step 1140 determines whether or not the lock out mode has been enabled for this realtor system. If not, then the user is allowed access to the secure compartment at step 1114.

Assuming the lock out mode has been enabled for this real estate Board, then the logic flow will be directed to a step 1142 in which the lockbox will block access to its secure compartment in this situation. After that occurs, the lockbox sends a message to the electronic key telling the electronic key to disable itself, at a step 1144. After that the logic flow returns to other lockbox routines at a step 1146.

Once the electronic key has become disabled, it will not be allowed to communicate with other lockboxes and obtain access to the secure compartment of those other lockboxes. In this first embodiment of FIG. 21 the electronic key will also be disabled from talking to the original lockbox, and the user will have to initiate a communication session with the central clearing house computer for this real estate board to have this electronic key reset from the disabled mode. That logic is discussed in reference to FIG. 23, discussed below.

The situation that this control logic is trying to prevent is simply allowing the real estate agent to walk away from the initial showing while still carrying the particular dwelling key for that first lockbox. Alternatively, the dwelling key could have been dropped and even perhaps lost, but the effect still would be that the correct dwelling key has not been returned to the secure compartment for this first lockbox. In that event, then there will be no second accessing the lockbox by the electronic key, and the values for variables A and B in that electronic key have been set to non-zero numbers that correspond to the lockbox serial number. This was for lockbox number one; when that same user with the same electronic key attempts to access a second lockbox, then the logic flow will begin at step 1100, go through step 1102, and at step 1110, the electronic key will send its current value for variable A to the lockbox. Variable A represents the "last lockbox serial number", which was lockbox number one. Now that the user is accessing lockbox number two, the logic flow will be directed through steps 1112, 1120, and arriving at decision step 1130. A will not be equal to B, because B is the value of the lockbox serial number for lockbox number two, and A is the value of the serial number for lockbox number one. The result will be that the logic flow is directed to step 1134 where it has been decided that the electronic key is to be disabled. The logic flow will then be directed through steps 1140, 1142, and 1144, at which time the lockbox sends a message to the electronic key telling the key that it should be disabled. This electronic key will now have to be reset by the routine of FIG. 23.

Figure 22:
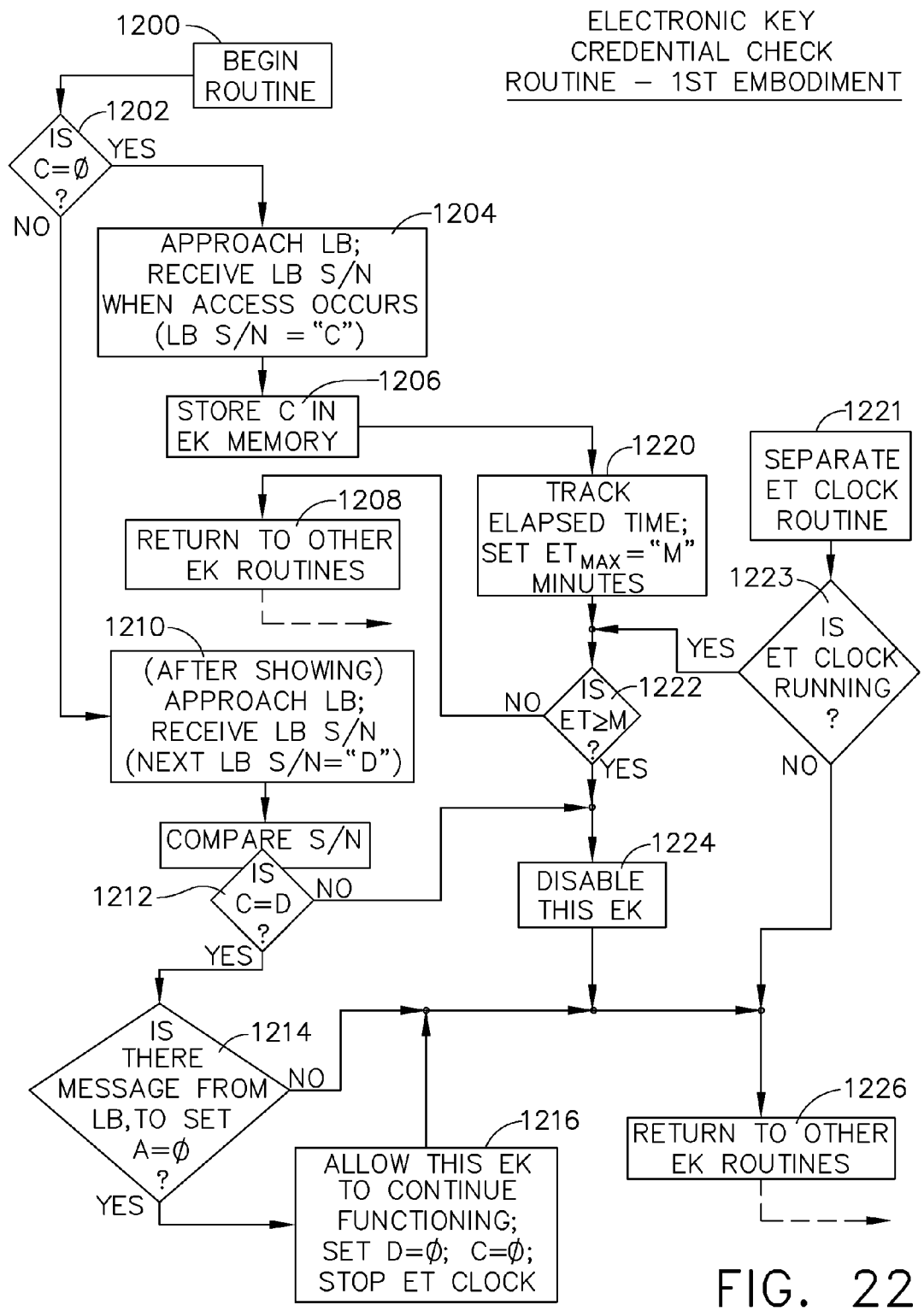
FIG. 22 is a flow chart of some of the steps executed by a portable electronic key to perform an "Electronic Key Credential Check" routine, for a first embodiment of logic control.

Referring now to FIG. 22, some of the operational steps of the logic for an electronic key used with the lockbox logic illustrated in FIG. 21 are depicted, and in FIG. 22 this is referred to as the electronic key credential check routine. Beginning at a step 1200, a decision step 1202 determines whether or not the value of a variable "C" is equal to zero. The answer to this question depends on what has happened previously in the history of this electronic key. If the electronic key is brand new, then the value of the variable C will already be set to zero. If the electronic key has previously been used with any lockbox, then the value of C will not be equal to zero during certain portions of the logic routine, but if the dwelling key has been correctly put back into the secure compartment of the previous lockbox, then a message from the lockbox should have been received by this electronic key that would have reset the value of C back to its original zero value.

Assuming the answer is YES at step 1202, a step 1204 occurs in which the electronic key approaches a lockbox and receives the lockbox serial number when access has occurred for this lockbox encounter. This lockbox's serial number is placed into the variable C at this time, at a step 1206. A step 1220 causes an elapsed time clock to begin running (or "counting"); see below for more details. The electronic key control logic now returns to other electronic key routines at a step 1208. Steps 1204, 1206, and 1208 typically occur at the beginning of a showing, when the electronic key has communicated to a lockbox and has attempted to obtain access to the secure compartment so that the user can temporarily gain possession of the dwelling key that is contained within the secure compartment. All of this presumably will have occurred by the time the step 1208 is reached in this control logic.

Later, usually at the end of a showing, the credential check routine begins again at step 1200, and this time at decision step 1202, the value for C will not be zero. Therefore the logic flow is directed to a step 1210, in which the lockbox is again approached by the electronic key and they communicate with one another, at this time the lockbox sends a serial number, and that is placed into a variable called "D", which represents the "next" lockbox's serial number. So long as the same lockbox is the one that has been communicating with the electronic key, both before and after the showing of the dwelling, then the values for C and D should be equal to one another. A decision step 1212 compares these two values to see if the value of C is actually equal to D, and if the answer is YES, then a decision step 1214 indirectly determines if the proper dwelling key has been placed back into the lockbox.

Decision step 1214 is part of the control logic for the electronic key, and its processing circuit really cannot directly determine whether or not the dwelling key is back in the lockbox's secure compartment, or whether the door of the lockbox's secure compartment is closed. But it can infer that information from a data message that the lockbox sends at step 1156 in the flow chart of FIG. 21. In step 1156, the lockbox tells the electronic key to set variable A to zero; that logic step only occurs if the "proper operation check" logic in steps 1150, 1152, and 1154 have determined that the dwelling key is back into a secure compartment, behind a closed door, of the lockbox. This message that A=0 is the result of this "proper operation" of the lockbox by its current user, and that information will eventually result in the variable C at the electronic key being reset to zero. But first, the lockbox's message must be received and analyzed by the electronic key, which occurs at decision step 1214.

If the answer is NO at decision step 1214, then the logic flow is directed to the "Return to Other EK Routines" step 1226, and the electronic key will keep operating (i.e., it will not be disabled), but its variables C and D will not be reset to zero, and the elapsed time clock will continue to operate (which means that the electronic key might become disabled because it runs out of time—see the discussion below). However, if the answer is YES at decision step 1214, then the logic flow is directed to a step 1216 allows this electronic key to continue functioning for all normal modes of operation. In step 1216, the variables C and D are both set to zero in the electronic key, thereby readying the electronic key for the next lockbox encounter. Additionally, the elapsed time counter (or clock) is stopped as part of step 1214. This elapsed time counter will be discussed next.

If the value for C was not equal to D at decision step 1212, then the logic flow is directed to a step 1224, and this electronic key will now disable itself. After that occurs, the logic flow is directed to a step 1226 in which the logic returns to other electronic key routines. However, many of the important electronic key routines will have been disabled, including the ability to communicate with lockboxes, and the ability to directly communicate with the central clearing house computer. In this circumstance, the electronic key will need to be reset. See FIG. 23.

If the real estate agent/user forgets to return the correct dwelling key to the lockbox secure compartment we do not wish to simply allow the user to walk away from the dwelling site without there being some consequences. One of the consequences is that the electronic key will not operate with the "next" lockbox, because the value of the variable C will not be zero, and therefore this electronic key is effectively disabled from communicating with any other lockbox. However, that still is not sufficient because the electronic key could be used for many other functions besides trying to communicate with a different lockbox. Therefore, it also would be desirable for this electronic key to eventually be disabled due to elapsed time.

One of the other electronic key routines begins at a step 1220, in which the elapsed time is "counted" or "tracked". At this step, the elapsed time maximum value, referred to herein as the variable "M" is set to a predetermined value in minutes. This will likely be a control variable that is set to the same value for all real estate agents working in this particular real estate Board system of lockboxes. For example, the value of M could be sixty minutes, ninety minutes, or even one hundred twenty minutes, if real estate agents typically take up to two hours to show a house.

In any event, once the value of M has been loaded into the elapsed counter, the elapsed timer begins counting the number of minutes that have actually elapsed since step 1206 has occurred. In other words, once the electronic key has accessed the lockbox to obtain the dwelling key, this routine 1220 begins and the elapsed time counter begins tracking the elapsed time.

A decision step 1222 now determines if the actual elapsed time has exceeded the value of M. If not, then the logic flow returns to other electronic key routines at step 1208. However, if the elapsed time does exceed the value of M, then the logic flow is directed a step 1224 that disables this electronic key. Once that occurs, electronic key operating system will return to other electronic key routines at a step 1226, but most of the routines will then have been disabled and the electronic key will need to be reset.

The electronic key spends most of its time doing nothing at all, or doing other functions besides those spelled out in the flow charts of this patent document. Because of that reality, a separate routine is included to keep tabs on the elapsed time clock. In other words, it is desired to have the elapsed time clock perform its disabling function as a "stand alone" function, not only when the electronic key's control logic has reached one of the flow chart steps of FIG. 22, such as step 1206 and then step 1220. Therefore, a separate elapsed time clock checking routine is provided, starting at a step 1221. This routine first determines whether or not the elapsed time clock is running, or is stopped, as a decision step 1223. If it is stopped, this routine quickly drops out by arriving at the return step 1226. This entire clock checking routine can be re-started at step 1221 one second later, or XX seconds later, if desired, under the control of the overall computer program that runs the electronic key's processing circuit.

If the elapsed time clock is running, then the logic flow is directed from step 1223 to the decision step 1222, which determines whether the elapsed time has reached the setpoint value M. If so, then this electronic key is disabled at step 1224. Therefore, the control logic of FIG. 22 has two routes by which the electronic key can be disabled due to elapsed time.

Figure 23:
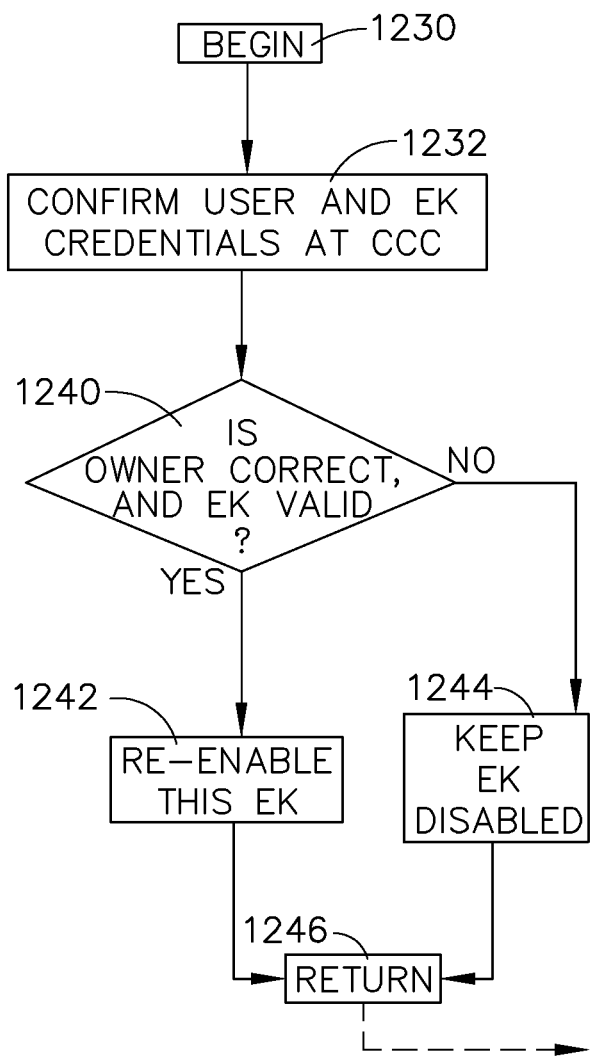
FIG. 23 is a flow chart of some of the steps performed by a central clearinghouse computer to execute a "Reset Disabled Electronic Key" routine.

Referring now to FIG. 23, if an electronic key has been disabled, it needs to be reset. This routine is referred to as the "reset disabled electronic key routine," and it begins at a step 1230. The user will have to initiate a communications session with the central clearinghouse computer, and a step 1232 confirms the user's credentials and the credentials of the electronic key at the central clearinghouse computer (CCC). A decision step 1240 determines whether or not the owner is correct and the electronic key is a valid key for that particular real estate Board. If either one of those checks fails, then a step 1244 will keep the electronic key disabled, and the logic flow will return to other CCC routines at a step 1246.

If the correct owner and a valid electronic key are authenticated by the clearinghouse computer at step 1240, then a step 1242 will re-enable this electronic key. This could be done in many different ways, but as a minimum the central clearinghouse computer will have to send some type of data message that will either be manually entered into the electronic key, via its keyboard or keypad, or the electronic key will be allowed to communicate directly with the clearinghouse computer over the Internet, for example. In the latter situation, the electronic key could receive a data message directly from the clearinghouse computer, and once it has been reset or "re-enabled," then the logic flow can return to other CCC routines at step 1246.

It obviously is an inconvenience for the user to have to go through the resetting or re-enabling of his or her electronic key. This creates a distinct incentive to correctly place the dwelling key back into the correct lockbox at the correct time (i.e., at the end of a showing). While this might seem detrimental to the real estate agent in some respect, it is definitely a plus so far as the dwelling owner is concerned, because it will virtually eliminate lost or stolen dwelling keys in short order.

As briefly mentioned above, if instead of a "true" electronic key, a standard SentriLock LLC secure memory card is used to access the lockbox, the same routines can still be implemented for the most part. There would not be any radio communications between the lockbox and the secure memory card, however, there still would be a data exchange when the secure memory card was placed into the lockboxes' card reader receptacle. The card reader on the lockbox would interface to circuits on the secure memory card, as is well known in the art. The variables A, B, C, and D can still be handled by the same routines, and the variables C and D would be memory locations on the secure memory card. The reset disable key routine of FIG. 23 would still take place, although there could be no direct communication over the Internet between the secure memory card and the central clearinghouse computer. Instead, the user would use the typical methodology and hardware for communicating messages between the clearinghouse computer and the secure memory card, like when rejuvenating the secure memory card on a daily basis, for example. This typically would be done by a personal computer or some other device that has a card reader, and also has Internet access to the central clearinghouse computer.

Figure 24:
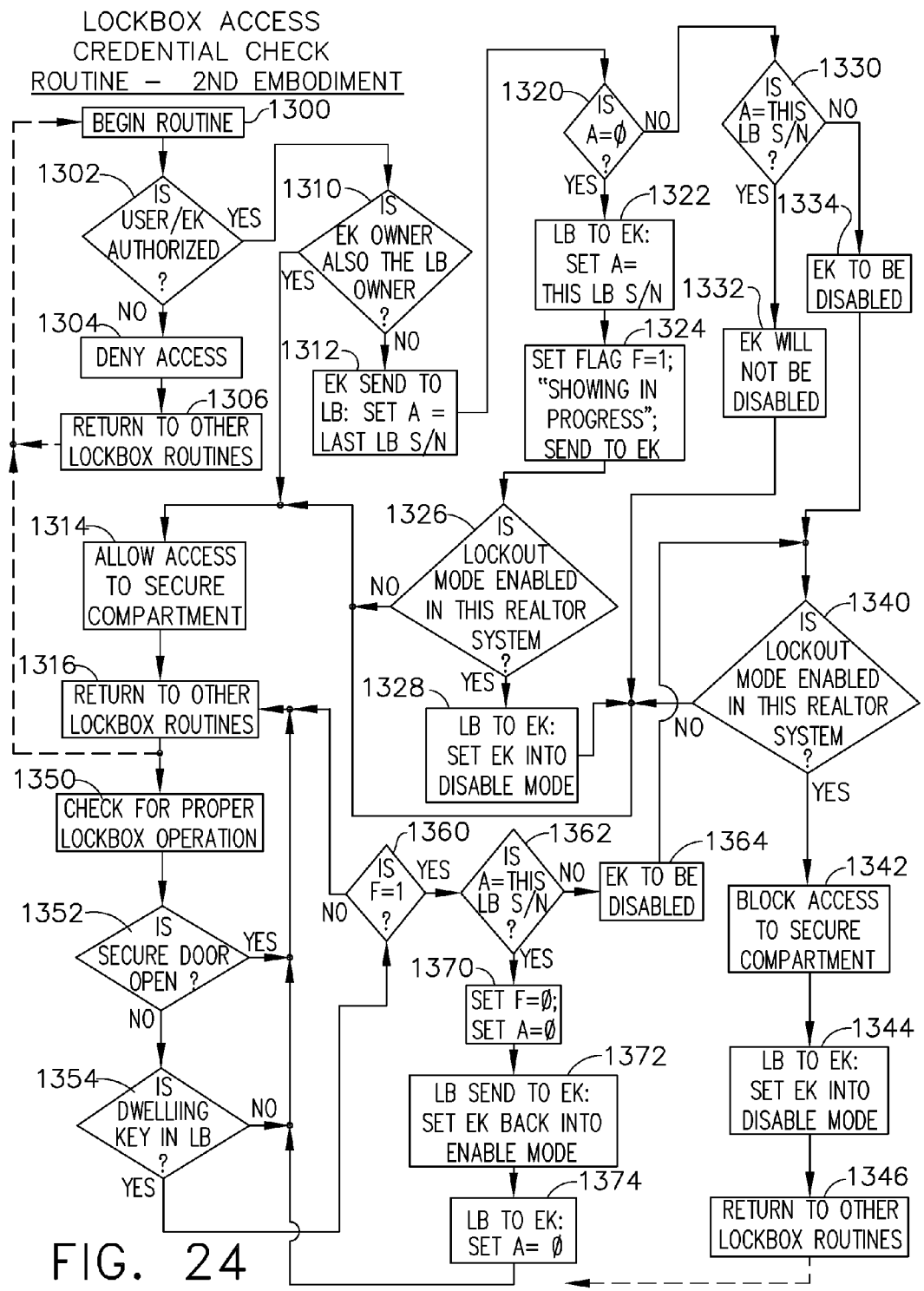
FIG. 24 is a flow chart of some of the steps executed by an electronic lockbox to perform a "Lockbox Access Credential Check" routine, for a second embodiment of logic control.
Figure 25:
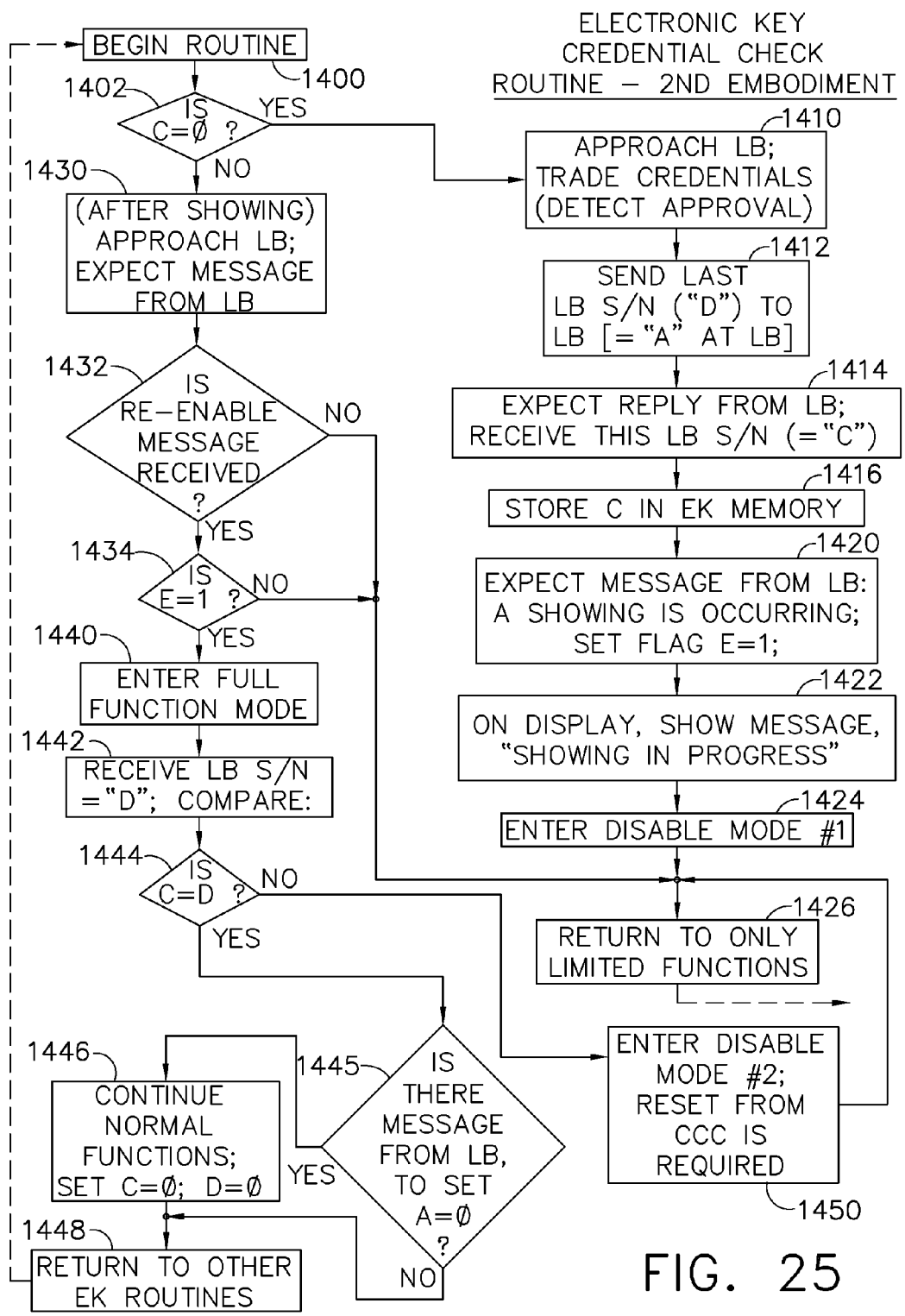
FIG. 25 is a flow chart of some of the steps executed by a portable electronic key to perform an "Electronic Key Credential Check" routine, for a second embodiment of logic control.

There are several other ways of disabling an electronic key for a lockbox system used in real estate situations. FIGS. 24 and 25 show a second embodiment of the logic that could be utilized to implement the electronic key "lockout" (or "disabled") mode. Referring now to FIG. 24 at a step 1300, a lockbox access credential check routine begins for the second embodiment. Some of the steps on FIG. 24 are identical to certain steps that were discussed in the flow chart of FIG. 21. After the routine begins, a decision step 1302 determines whether or not the user and the user's electronic key are properly authorized to access the secure compartment of one of the system's electronic lockboxes. If such user and electronic key combination are not authorized, then access is denied at a step 1304 and the secure compartment door will not be opened. The logic flow then returns to other lockbox routines at a step 1306.

If the answer was YES in step 1302, then a decision step 1310 determines if the owner of the electronic key is also the owner of the lockbox. If so, and the user/electronic key were authorized, then access will be allowed to the secure compartment at a step 1314. After the door has been opened for the secure compartment, the logic flow returns to other lockbox routines at a step 1316.

If the owner of the electronic key is not also the owner of the lockbox, then the logic flow is directed to a step 1312 where the electronic key sends some information to the lockbox. In this situation the electronic key will send the "last lockbox serial number" and that value will set into the variable named "A". As will be seen in the other flow chart of FIG. 25, the last lockbox serial number is a multi-digit number that represents the most recent lockbox that shared a communication with this particular electronic key. However, the last lockbox serial number could be equal to zero, under certain circumstances. And that is the next question that is determined in the control logic, at a decision step 1320.

If A was equal to zero at step 1320, then the lockbox sends a message to the electronic key at a step 1322. This message tells the electronic key to set the value of A to "this lockbox serial number." So at the beginning of step 1322 the value of A was equal to zero, and then at the end of that step, the value of A will be equal to the serial number of this lockbox now being accessed.

After the information exchange of step 1322, a software flag is set to the value one, and this flag is designated "F". This flag means that a showing is in progress at this time, and that information will be important in later steps of this flow chart. A step 1326 now determines whether or not the "lockout mode" has been enabled in this particular realtor system. This logic is more or less equivalent to the logic that was discussed above, in reference to step 1140 on FIG. 21. If the lockout mode is not enabled for this particular real estate board, then the logic flow will travel to step 1314, which allows access to the secure compartment. In this portion of the control logic, the access will be permitted regardless of what the value of A might have been when this particular electronic key first approached this particular lockbox.

After it has been determined that the lockout mode is indeed enabled at decision step 1326, the logic flow is directed to step 1328 in which the lockbox sends a message to the electronic key telling the electronic key to set itself into a disable mode. This is a temporary situation, because it is desirable for the user to be able to use his or her electronic key for showings of other properties, so long as the dwelling key is properly returned to the lockbox of interest, i.e., the lockbox whose serial number was set to the variable A at step 1322. This type of disablement mode of the electronic key is referred to "Disable Mode #1," on FIG. 25. There is a different type of disable mode on FIG. 25, but those modes are controlled by the software in the electronic key, and that circumstance will be discussed in greater detail below.

If A was not equal to zero at step 1320, then a decision step 1330 determines whether or not A contains the serial number for this present lockbox. If so, then the electronic key will not be disabled at a step 1332. The logic flow will progress to step 1314, in which access to the secure compartment will be allowed.

If the value of A at step 1330 is not the same as the present lockbox serial number, then the logic flow is directed to a step 1334, which determines that the electronic key is to be disabled. After that determination has been arrived at, the logic flow is directed to a decision step 1340 which determines whether or not the lockout mode has been enabled for this realtor system. If not, then the logic flow is directed to the step 1314, and access to the secure compartment will be allowed.

If the lockout mode has been enabled for this realtor system, then a step 1342 blocks access to the secure compartment, and the lockbox sends a message to the electronic key at a step 1344, and this message tells the electronic key to go into a disabled mode. After that occurs, the logic flow returns to other lockbox routines at a step 1346.

Similar to the logic of FIG. 21, this flow chart of FIG. 24 also has a procedure that checks for proper operation of the lockbox, starting at a step 1350. A decision step 1352 now determines whether or not the secure compartment door is open. If so, the logic flow quickly returns to other lockbox routines at step 1316. If not, a decision step 1354 determines whether or not the dwelling key is in the lockbox at this time. If not, then the logic flow quickly returns to other lockbox routines at step 1316.

If the dwelling key is in the lockbox at step 1354, then the logic flow is directed to a decision step 1360 that determines whether or not the flag variable F is equal to 1 (i.e., does F=1?). If so, this means that, so far as this lockbox is concerned, a showing has been in progress and probably is about to be completed. For this logic stage to be reached on flow chart of FIG. 24, a user must have previously accessed the secure compartment of this same lockbox, and have had access to the dwelling key. Moreover, this would only occur if the value of A had been set to zero before the beginning of the control logic that started at decision steps 1302, 1310, and 1312. At step 1360, if F is not equal to 1, then the logic flow quickly returns to other lockbox routines at step 1316.

On the other hand, if F is equal to 1 at step 1360, then a decision step 1362 determines whether or not the variable A is equal to this lockbox's serial number. If not, then the electronic key is to be disabled at a step 1364. If using the logic of FIG. 25, discussed below, this will be a somewhat harsher mode of disablement, because for the control logic to have arrived at step 1364, the electronic key must have been used with a different lockbox before approaching this present lockbox, and moreover, the electronic key was not properly "reset" and, therefore, it still was carrying a lockbox serial number for variable A that is different than the present lockbox's serial number. (At this point in the control logic, the value of A would not be equal to zero, because the flag F would also be zero, and the logic flow would divert at decision step 1360, and not reach this step 1362.) This is the mode that "penalizes" the user for forgetting to place the dwelling key back into the secure compartment of the previous lockbox, at an earlier visit to that lockbox. When this occurs, the logic flow is directed to decision step 1340 to determine if the lockout mode has been enabled for this realtor system. If so, then the control logic continues to step 1342 that blocks access to the secure compartment, step 1344 in which the lockbox sends a message to the electronic key telling it to go into a disable mode, and finally returning to other lockbox routines at step 1346.

On the other hand, if the procedures are properly followed and the showing is "normal" with respect to getting the dwelling key back into the proper lockbox, then the answer at decision step 1362 will be YES. In that event, the logic flow is directed to a step 1370 that sets the flag F to zero, and also sets the variable A to zero. After that occurs, the lockbox sends a message to the electronic key telling the electronic key that it should set itself back into an enabled mode of operation, at a step 1372. In the next step 1374, the lockbox sends another message to the electronic key, telling the electronic key to set the value of A equal to zero. This step truly is a critical step in this flow chart; it is where it has been determined by the electronic lockbox that its present encounter with this particular electronic key has been properly concluded, because the secure compartment door is closed and the dwelling key is inside the lockbox secure compartment. In addition, this particular electronic key was not being carried around with a serial number of a different lockbox at the beginning of this showing, and everything is "normal" with respect to how the dwelling key has been handled. Finally, this is the step where the lockbox tells the electronic key to set its variable A to zero, and in that way this electronic key will be prepared for an encounter with a different lockbox. As can be seen from the flow chart, when all this has occurred, the electronic key is also back into its normal mode of operation after being temporarily disabled at step 1364. The control logic returns to other lockbox routines at step 1316.

Referring now FIG. 25, the logic flow of some of the important steps in the electronic key's software for a second embodiment "electronic key credential check" routine, which goes hand in hand with the second embodiment credential check routine of the lockbox, illustrated on FIG. 24. Starting at a step 1400, a decision step 1402 determines whether or not the variable C is equal to zero. If so, the logic flow is directed to a step 1410 in which the user approaches a lockbox, and this electronic lockbox and the electronic key trade credentials with one another through digital data messages. This step 1410 is more or less equivalent to steps 1302 and 1310 on FIG. 24. These steps determine whether or not the user and this particular electronic key are both authorized to access the lockbox now being encountered, and also determine whether or not the electronic key is owned by the same person who owns this present lockbox.

After the credentials have been traded between the electronic devices, and the proper authorizations have been verified to approve this visit to the lockbox by this electronic key, a step 1412 sends a message from the electronic key to the electronic lockbox. This message is the "last lockbox serial number" that was encountered by this electronic key. This "last lockbox" value is set into a variable called "D". When this information reaches the lockbox, it becomes the variable A within the lockbox's processing circuitry, which occurs at step 1312 on FIG. 24.

The next operational step for the electronic key essentially waits for a reply from the lockbox, which occurs at a step 1414. The electronic key is expecting to receive the serial number of this present lockbox, and after that information is received, it is placed into a variable known as "C". In the lockbox logic of FIG. 24, this occurs at step 1322.

Back at the electronic key's control logic on FIG. 25, a step 1416 stores the value of C into the electronic key's memory circuit. After that occurs, a step 1420 expects another message from the lockbox, telling the electronic key that a showing is now occurring. A flag having the variable name "E" is now set to the value 1. This message from the lockbox occurs at step 1324 on FIG. 24.

Once the flag E has been set to 1, a step 1422 will prepare to disable the operation of this electronic key. First a message will be displayed on the electronic key's monitor screen, a message such as "SHOWING IN PROGRESS." After that has occurred, the electronic key will enter a Disable Mode #1, which occurs at a step 1424. After that occurs, the logic flow returns to the electronic key's other functions, but these will only be limited functions, as noted at a step 1426 on FIG. 25.

This first Disable Mode #1 is meant to be only a temporary mode, and it is up to the system designer to decide exactly which functions will be truly disabled in the electronic key. At the same time, it will be understood that Disable Mode #1 should have some harshness to it, and that means that the exchange of data wirelessly between the electronic key and lockboxes will be restricted or completely discontinued during Disable Mode #1. Other functions of the electronic key can also be curtailed, if desired, including the ability to access certain settings that correspond to various options or main functions of how the electronic key can be used with a lockbox system. If something unusual happens, and this electronic key never gets re-enabled, then the user needs to have the ability to have this disabled electronic key communicate (either directly or indirectly) with the central clearinghouse computer, so that the key can be re-enabled, along the lines of the logic flow presented in FIG. 23.

As can be seen from the above, in this second embodiment the electronic key actually is disabled as soon as the lockbox is accessed so the dwelling key can be physically made available to the user. In the first embodiment discussed above in reference to FIG. 22, the actual disablement did not occur until the second encounter between the electronic key and a particular lockbox for the same dwelling site. Both embodiments prevent the electronic key from accessing a different lockbox altogether, its just a matter of exactly how and when the electronic key will be disabled that makes up the significant differences between the first and second embodiments.

Back at decision step 1402, if the value of C was not equal to zero, then this would indicate that a showing has started and probably is now about to end. A step 1430 is reached when the user approaches the lockbox and the electronic key will expect to receive a particular message from that lockbox. This control logic will be reached because the value of C is no longer equal to zero (it was set to the present lockbox's serial number at step 1414); also the "showing occurring now" flag E has been set to 1. In these circumstances the re-enable message is expected by the electronic key, and it essentially waits for that to occur at a decision step 1432. If the message has not been received at this point in time, then the logic flow is directed to the "return to only limited functions," at step 1426.

On the other hand, if the re-enable message is received at the electronic key, then the logic flow from step 1432 will arrive a decision step 1434 to determine whether or not the flag E is equal to 1. If not, then the logic flow is directed back to step 1426, and the electronic key is limited (presently in Disable Mode #1). This is an anomalous situation that usually would not occur, but if it does the electronic key will be maintained in the Disable Mode #1 state.

If the value of E is equal to 1 at step 1434, then the electronic key will now return to its full functioning mode of operation at a step 1440. This might be a temporary situation, because additional logic still must be analyzed. At a step 1442, the electronic key receives the serial number of this present lockbox, and will set that value into a variable known as "D". A decision step 1444 will now compare the values of C and D, and if they do not match, a step 1450 will disable the electronic key in a more harsh mode. On the flow chart of FIG. 25, this is called "Disable Mode #2," and in this mode of disablement, a reset will be required from the clearinghouse computer before the electronic key will be allowed to operate again.

On the other hand, if everything has been proceeding under normal circumstances, the value of C will match the value of D at step 1444, then a decision step 1445 indirectly determines if the proper dwelling key has been placed back into the lockbox.

Decision step 1445 is part of the control logic for the electronic key, and its processing circuit really cannot directly determine whether or not the dwelling key is back in the lockbox's secure compartment, or whether the door of the lockbox's secure compartment is closed. But it can infer that information from a data message that the lockbox sends at step 1374 in the flow chart of FIG. 24. In step 1370, the lockbox tells the electronic key to set variable A to zero; that logic step only occurs if the "proper operation check" logic in steps 1350, 1352, and 1354 have determined that the dwelling key is back into a secure compartment, behind a closed door, of the lockbox. This message that A=0 is the result of this "proper operation" of the lockbox by its current user, and that information will eventually result in the variable C at the electronic key being reset to zero. But first, the lockbox's message must be received and analyzed by the electronic key, which occurs at decision step 1445.

If the answer is NO at decision step 1445, then the logic flow is directed to the "Return to Other EK Routines" step 1448, and the electronic key will keep operating (i.e., it will not be disabled), but its variables C and D will not be reset to zero. However, if the answer is YES at decision step 1445, then the logic flow is directed to a step 1446 allows this electronic key to continue functioning for all normal modes of operation. In step 1446, the values for variables C and D are both set to zero in the electronic key, thereby readying the electronic key for the next lockbox encounter. The logic flow will now return to other electronic key routines at a step 1448.

If the electronic key has been placed into the harsher Disable Mode #2, then the routine illustrated on FIG. 23 must be performed so that the electronic key can be re-enabled. Of course, part of the reset routine is to confirm the credentials of both the user and the electronic key to the central clearinghouse computer. If something is amiss along those lines, then the central clearinghouse computer will not send the required message that will re-enable the electronic key.

The flow charts on FIGS. 21 and 24 show two different embodiments of "locking out" or "disabling" an electronic key, in which the major control decisions are made by the electronic lockbox. The control logic illustrated in FIG. 22 shows an alternative scheme by which the electronic key itself will make the decision as to whether or not it should be locked out or disabled. The FIG. 22 software more or less runs hand in hand with the lockbox flow chart of FIG. 21. The flow chart of FIG. 25 shows the control logic for an electronic key running in a system according to the second embodiment. In this situation, the electronic key does not, by itself, make the decision as to whether or not it should be disabled. Instead, that decision is made by the electronic lockbox, at various stages of the control logic. On the other hand, it could be said that the control logic of FIG. 25 is a guide for a third embodiment, in which the electronic key makes its own determination with respect to whether or not it should be disabled. Of course, certain information must be sent to the electronic key from the lockbox, or it will not be able to make the disablement mode decisions, as per the flow chart of FIG. 25. Naturally, other control logic schemes could be arrived at, without departing from the principles of the technology disclosed herein.

It will be understood that the logical operations described in relation to the flow charts of FIGS. 4-8 and 21-25 can be implemented using sequential logic (such as by using microprocessor technology), or using a logic state machine, or perhaps by discrete logic; it even could be implemented using parallel processors. One preferred embodiment may use a microprocessor or microcontroller (e.g., the processor 16) to execute software instructions that are stored in memory cells within an ASIC. In fact, an entire microprocessor (or microcontroller, for that matter), along with RAM and executable ROM, may be contained within a single ASIC, in one mode of the technology disclosed herein. Of course, other types of circuitry could be used to implement these logical operations depicted in the drawings without departing from the principles of the technology disclosed herein. In any event, some type of processing circuit will be provided, whether it is based on a microprocessor, a logic state machine, by using discrete logic elements to accomplish these tasks, or perhaps by a type of computation device not yet invented; moreover, some type of memory circuit will be provided, whether it is based on typical RAM chips, EEROM chips (including Flash memory), by using discrete logic elements to store data and other operating information, or perhaps by a type of memory device not yet invented.

It will also be understood that the precise logical operations depicted in the flow charts of FIGS. 4-8 and 21-25, and discussed above, could be somewhat modified to perform similar, although not exact, functions without departing from the principles of the technology disclosed herein. The exact nature of some of the decision steps and other commands in these flow charts are directed toward specific future models of lockbox systems (those involving lockboxes sold by SentriLock, LLC, for example) and certainly similar, but somewhat different, steps would be taken for use with other models or brands of lockbox systems in many instances, with the overall inventive results being the same.

As used herein, the term "proximal" can have a meaning of closely positioning one physical object with a second physical object, such that the two objects are perhaps adjacent to one another, although it is not necessarily required that there be no third object positioned therebetween. In the technology disclosed herein, there may be instances in which a "male locating structure" is to be positioned "proximal" to a "female locating structure." In general, this could mean that the two male and female structures are to be physically abutting one another, or this could mean that they are "mated" to one another by way of a particular size and shape that essentially keeps one structure oriented in a predetermined direction and at an X-Y (e.g., horizontal and vertical) position with respect to one another, regardless as to whether the two male and female structures actually touch one another along a continuous surface. Or, two structures of any size and shape (whether male, female, or otherwise in shape) may be located somewhat near one another, regardless if they physically abut one another or not; such a relationship could still be termed "proximal." Moreover, the term "proximal" can also have a meaning that relates strictly to a single object, in which the single object may have two ends, and the "distal end" is the end that is positioned somewhat farther away from a subject point (or area) of reference, and the "proximal end" is the other end, which would be positioned somewhat closer to that same subject point (or area) of reference.

Some additional information about "basic" lockbox embodiments, including advanced features, are more fully described in earlier patent documents by the same inventor, and assigned to SentriLock, Inc. or SentriLock LLC, including: U.S. Pat. No. 7,009,489, issued Mar. 7, 2006, for ELECTRONIC LOCK SYSTEM AND METHOD FOR ITS USE; U.S. Pat. No. 6,989,732, issued Jan. 24, 2006, for ELECTRONIC LOCK SYSTEM AND METHOD FOR ITS USE WITH CARD ONLY MODE; U.S. Pat. No. 7,086,258, issued Aug. 8, 2006, for ELECTRONIC LOCK BOX WITH SINGLE LINEAR ACTUATOR OPERATING TWO DIFFERENT LATCHING MECHANISMS; U.S. Pat. No. 7,420,456, issued Sep. 2, 2008, for ELECTRONIC LOCK BOX WITH MULTIPLE MODES AND SECURITY STATES; U.S. Pat. No. 7,193,503, issued Mar. 20, 2007, for ELECTRONIC LOCK SYSTEM AND METHOD FOR ITS USE WITH A SECURE MEMORY CARD; U.S. Pat. No. 7,999,656, issued on Aug. 16, 2011, for ELECTRONIC LOCK BOX WITH KEY PRESENCE SENSING; U.S. Pat. No. 7,734,068, issued Jun. 8, 2010, for ELECTRONIC LOCK BOX USING A BIOMETRIC IDENTIFICATION DEVICE; U.S. patent application Ser. No. 11/954,695, filed on Dec. 12, 2007 (Publication No. US 2008/0246587), for ELECTRONIC LOCK BOX WITH TRANSPONDER BASED COMMUNICATIONS; U.S. Pat. No. 8,164,419, issued on Apr. 24, 2012, for ELECTRONIC LOCK BOX WITH TIME-RELATED DATA ENCRYPTION BASED ON USER-SELECTED PIN; U.S. Pat. No. 8,151,608, issued on Apr. 10, 2012, for ELECTRONIC LOCK BOX WITH MECHANISM IMMOBILIZER FEATURES; U.S. patent application Ser. No. 12/756,741, filed on Apr. 8, 2010 (Publication No. US 2011/0251876), for ELECTRONIC LOCK BOX SYSTEM WITH INCENTIVIZED FEEDBACK; and U.S. patent application Ser. No. 12/883,628, filed on Sep. 16, 2010 (Publication No. US 2012/0068817), for ELECTRONIC LOCK BOX PROXIMITY ACCESS CONTROL. These patent documents are incorporated by reference herein, in their entirety.

All documents cited in the Background and in the Detailed Description are, in relevant part, incorporated herein by reference; the citation of any document is not to be construed as an admission that it is prior art with respect to the technology disclosed herein.

The foregoing description of a preferred embodiment has been presented for purposes of illustration and description. It is not intended to be exhaustive or to limit the technology disclosed herein to the precise form disclosed, and the technology disclosed herein may be further modified within the spirit and scope of this disclosure. Any examples described or illustrated herein are intended as non-limiting examples, and many modifications or variations of the examples, or of the preferred embodiment(s), are possible in light of the above teachings, without departing from the spirit and scope of the technology disclosed herein. The embodiment(s) was chosen and described in order to illustrate the principles of the technology disclosed herein and its practical application to thereby enable one of ordinary skill in the art to utilize the technology disclosed herein in various embodiments and with various modifications as are suited to particular uses contemplated. This application is therefore intended to cover any variations, uses, or adaptations of the technology disclosed herein using its general principles. Further, this application is intended to cover such departures from the present disclosure as come within known or customary practice in the art to which this technology disclosed herein pertains and which fall within the limits of the appended claims.

What is claimed is:

1. A method for operating an electronic lockbox system, said method comprising:
   (a) providing a plurality of electronic lockboxes and a plurality of electronic keys;
   (b) of said plurality of electronic lockboxes, providing a first electronic lockbox having: a first processing circuit, a first memory circuit, a first short range wireless communications device, a first secure compartment having a first movable opening element that is under the control of said first processing circuit, and a first sensor for detecting whether a predetermined dwelling key security apparatus is present within said first secure compartment;

(c) of said plurality of electronic keys, providing a portable first electronic key having a second processing circuit, a second memory circuit, a data entry device, a display, and a second short range wireless communications device; and (d) initiating a data exchange between said first electronic lockbox and said first electronic key, using said first and second short range wireless communications devices;
  (i) at said first electronic lockbox, receiving a first data message from said first electronic key, said first data message containing at least one of:
    (A) identity information for said first electronic key, and
    (B) personal ID data regarding a specific human user;
  (ii) if a user is attempting to access said first secure compartment, then allowing access if said first electronic key's identity information and said specific user's personal ID data are authorized to access the first secure compartment, so that said predetermined dwelling key security apparatus can be removed from the first secure compartment; and
  (iii) temporarily disabling effective operation of said first electronic key from accessing any other of said plurality of electronic lockboxes except said first electronic lockbox, until said predetermined dwelling key security apparatus is returned to said first secure compartment, as determined by said first sensor.

2. The method of claim 1, wherein said first electronic key comprises one of: (a) a smart phone; and (b) a portable computer with a wireless communication circuit.

3. An electronic lockbox system, said system comprising:
(a) a plurality of electronic lockboxes and a plurality of electronic keys;
(b) of said plurality of electronic lockboxes, a first electronic lockbox having: a first processing circuit, a first memory circuit, a first short range wireless communications device, a first secure compartment having a first movable opening element that is under the control of said first processing circuit, and a first sensor for detecting whether a predetermined dwelling key security apparatus is present within said first secure compartment; and
(c) of said plurality of electronic keys, a portable first electronic key having a second processing circuit, a second memory circuit, a data entry device, a display, and a second short range wireless communications device;
wherein said first and second processing circuits are programmed with computer code to perform functions of:
(d) initiating a data exchange between said first electronic lockbox and said first electronic key, using said first and second short range wireless communications devices;
  (i) at said first electronic lockbox, receiving a first data message from said first electronic key, said first data message containing at least one of:
    (A) identity information for said first electronic key, and
    (B) personal ID data regarding a specific human user;
  (ii) if a user is attempting to access said first secure compartment, then allowing access if said first electronic key's identity information and said specific user's personal ID data are authorized to access the first secure compartment, so that said predetermined dwelling key security apparatus can be removed from the first secure compartment; and
  (iii) temporarily disabling effective operation of said first electronic key from accessing any other of said plurality of electronic lockboxes except said first electronic lockbox, until said predetermined dwelling key security apparatus is returned to said first secure compartment, as determined by said first sensor.

4. The system of claim 3, wherein said first electronic key comprises one of: (a) a smart phone; and (b) a portable computer with a wireless communication circuit.

5. A method for operating an electronic lockbox system, said method comprising:
(a) providing a plurality of electronic lockboxes and a plurality of secure memory cards;
(b) of said plurality of electronic lockboxes, providing a first electronic lockbox having: a first processing circuit, a first memory circuit, a data entry device, a first card reader circuit, a first secure compartment having a first movable opening element that is under the control of said first processing circuit, and a first sensor for detecting whether a predetermined dwelling key security apparatus is present within said first secure compartment;
(c) of said plurality of secure memory cards, providing a portable first secure memory card having a second memory circuit, and a card reader interface;
(d) initiating a data exchange between said first electronic lockbox and said first secure memory card, using said card reader circuit and said card reader interface;
  (i) at said first electronic lockbox, retrieving first data from said first secure memory card, said data containing at least one of:
    (A) identity information for said first electronic key, and
    (B) personal ID data regarding a specific human user;
  (ii) if a user is attempting to access said first secure compartment, then allowing access if said first secure memory card's identity information and said specific user's personal ID data are authorized to access the first secure compartment, so that said predetermined dwelling key security apparatus can be removed from the first secure compartment; and
  (iii) temporarily disabling effective operation of said first secure memory card from accessing any other of said plurality of electronic lockboxes except said first electronic lockbox, until said predetermined dwelling key security apparatus is returned to said first secure compartment, as determined by said sensor.

6. The method of claim 5, wherein said first electronic key comprises one of: (a) a smart phone; and (b) a portable computer with a wireless communication circuit.

7. A method for operating an electronic lockbox system, said method comprising:
(a) providing a plurality of electronic lockboxes and a plurality of electronic keys;
(b) of said plurality of electronic lockboxes, providing a first electronic lockbox having: a first processing circuit, a first memory circuit, a first short range wireless communications device, a first secure compartment having a first movable opening element that is under the control of said first processing circuit, and a first sensor for detecting whether a predetermined dwelling key security apparatus is present within said first secure compartment;

(c) of said plurality of electronic keys, providing a portable first electronic key having a second processing circuit, a second memory circuit, a data entry device, a display, and a second short range wireless communications device; and (d) initiating a data exchange between said first electronic lockbox and said first electronic key, using said first and second short range wireless communications devices;
  (i) at said first electronic lockbox, receiving a first data message from said first electronic key, said first data message containing at least one of:
    (A) identity information for said first electronic key, and
    (B) personal ID data regarding a specific human user;
  (ii) if a user is attempting to access said first secure compartment, then allowing access if said first electronic key's identity information and said specific user's personal ID data are authorized to access the first secure compartment, so that said predetermined dwelling key security apparatus can be removed from the first secure compartment to begin a showing;
  (iii) at said first electronic key, receiving a second data message from said first electronic lockbox that contains first identification information about said first electronic lockbox, and storing said first identification information in said second memory circuit as "opening identification data;"
  (iv) temporarily disabling effective operation of said first electronic key from accessing any other of said plurality of electronic lockboxes except said first electronic lockbox;
  (v) at said first electronic lockbox, determining, by use of said first sensor, if said predetermined dwelling key security apparatus is returned to said first secure compartment to end a showing, and if so, then:
  (vi) at said first electronic key, receiving a third data message from one of said plurality of electronic lockboxes, said third data message containing second identification information about the one of said plurality of electronic lockboxes, and storing said second identification information in said second memory circuit as "closing identification data;" and
  (vii) at said first electronic key, comparing said opening identification data and said closing identification data, and:
    (A) if said opening and closing identification data match, then automatically re-enabling said first electronic key to function in all normal ways, including for accessing the other of said plurality of electronic lockboxes; and
    (B) if said opening and closing identification data do not match, then automatically leaving said first electronic key disabled.

8. The method of claim 7, wherein said first electronic key comprises one of: (a) a smart phone; and (b) a portable computer with a wireless communication circuit.

* * * * *